United States Patent
Portisch et al.

(10) Patent No.: US 11,455,283 B2
(45) Date of Patent: Sep. 27, 2022

(54) CANDIDATE ELEMENT SELECTION USING SIGNIFICANCE METRIC VALUES

(71) Applicant: SAP SE, Walldorf (DE)

(72) Inventors: Jan Portisch, Bruchsal (DE); Ronald Boehle, Dielheim (DE); Volker Saggau, Bensheim (DE); Sandra Bracholdt, Dielheim (DE)

(73) Assignee: SAP SE, Walldorf (DE)

( * ) Notice: Subject to any disclaimer, the term of this patent is extended or adjusted under 35 U.S.C. 154(b) by 86 days.

(21) Appl. No.: 16/848,463

(22) Filed: Apr. 14, 2020

(65) Prior Publication Data
US 2021/0318995 A1    Oct. 14, 2021

(51) Int. Cl.
*G06F 16/00*    (2019.01)
*G06F 16/21*    (2019.01)
*G06Q 10/10*    (2012.01)

(52) U.S. Cl.
CPC ........... *G06F 16/211* (2019.01); *G06Q 10/10* (2013.01)

(58) Field of Classification Search
CPC .............................. G06F 16/211; G06Q 10/10
See application file for complete search history.

(56) References Cited

U.S. PATENT DOCUMENTS

| 9,477,407 | B1* | 10/2016 | Marshak | G06F 3/067 |
|---|---|---|---|---|
| 2007/0050543 | A1* | 3/2007 | Pomerantz | G06F 3/0685 |
| | | | | 711/114 |
| 2013/0151481 | A1* | 6/2013 | Andrasick | G06F 16/951 |
| | | | | 707/692 |
| 2017/0177809 | A1* | 6/2017 | Bull | G16H 10/20 |
| 2018/0075104 | A1* | 3/2018 | Oberbreckling | G06F 16/221 |
| 2020/0372016 | A1* | 11/2020 | Rogynskyy | H04L 67/1095 |
| 2021/0103391 | A1* | 4/2021 | Wolter | G06F 9/52 |

\* cited by examiner

*Primary Examiner* — Tyler J Torgrimson
(74) *Attorney, Agent, or Firm* — Klarquist Sparkman, LLP

(57) ABSTRACT

Techniques and solutions are described for determining a set of elements of a second set that may correspond to a given element of a first set of elements. The elements can be, in specific examples, components of a database system, such as tables (or entities), attributes, or records. Significance metric values are calculated for elements in the first and second sets. The significance metric values can be a number of records in an entity or a number of read or write access operations for an entity or for a record of an entity. A significance metric value for the given element can be used at least in part to select elements of the second set as potential match candidates, based at least in part on significance metric values for elements of the second set. Selecting elements can include selecting elements based on a window of elements of the second set or a range of significance metric values.

31 Claims, 32 Drawing Sheets

Table 1410

| First Name | Last Name | VIN | Color | Make | Model | Year | Cost |
|---|---|---|---|---|---|---|---|
| Sandra | Bracholdt | 7261V6287 | Black | Audi | A6 | 2019 | $61,876 |
| Volker | Saggau | 421VF872A | White | Mercedes | CLS-Class | 2016 | $82,887 |
| Jan | Portisch | KJ726H198 | Red | Porsche | 911 | 2018 | $112,552 |
| Ronald | Boehle | 4439TG1I2 | Black | BMW | M5 | 2019 | $117,999 |

Table 1414

| Name | Fahrzeugidentifikation | Jahr | Automodell | Automarke | Farbe | Kosten | Verschmutzungsindex |
|---|---|---|---|---|---|---|---|
| S. Bracholt | 7261V6287 | 2019 | A6 | Audi | Schwarz | €54,755 | 153 |
| R. Boehle | 4439TG1I2 | 2019 | M5 | BMW | Schwarz | €104,420 | 246 |
| J. Portisch | KJ726H198 | 2018 | 911 | Porsche | Rot | €99,600 | 169 |
| V. Saggau | 421VF872A | 2016 | CLS-Class | Mercedes | Weiss | €73,349 | 142 |

FIG. 14

```
                                                                    ┌─1600
                                                                    ▼
       ┌─1604
List<Entity, Score> l_1; // global variable for dataModel_1
List<Entity, Score> l_2; // global variable for dataModel_2
     ┌─1606
prepare() {
              l_1 = calculateImportance(dataModel_1.getEntities())
              l_2 = calculateImportance(dataModel_2.getEntities()) ─┐
      ┌─1620                                                       └─1612
     │ l_1 = sortDescending(l_1)
     │ l_2 = sortDescending(l_2)
                      └─1622
}
```

FIG. 16

```
                                                                           ┌─1700
                                                                           ▼
                                                  ┌─1718
   ┌─1710                              ┌─1714
List<Entity> blockByRange(double range, Entity entity_1) {
       ┌ double e1_score = l_1.getScore(entity_1);  ┌─1726
       │                                        ┌─1728
  1722─┤ double lowerBound = e1_score + range/2;
       │ double upperBound = e1_score - range/2;
       └ return l_2.getAllEntitiesInScoreRange(lowerBound, upperBound);
                           └─1732
}
```

FIG. 17

```
List<Entity> blockByWindow(int windowSize, Entity entity_1) {
    windowSize = max(3, windowSize); // windowSize must be >= 3
    double e1_position = l_1.position(entity_1);
    double e1_relPosition = e1_position / l_1.size();
    e2_position = round(e1_relPosition * l_2.size());
    int lowerBound = round(e2_position + (windowSize-1)/2);
    int upperBound = round(e2_position - (windowSize-1)/2);
    return l_2.getAllEntitiesInPositionRange(lowerBound, upperBound);
}
```

FIG. 19

| Entity | Score | e1_position | e1_relPosition |
|---|---|---|---|
| E_1_1 |  | 1 | 0.1 |
| E_1_2 |  | 2 | 0.2 |
| E_1_3 |  | 3 | 0.3 |
| E_1_4 |  | 4 | 0.4 |
| E_1_5 |  | 5 | 0.5 |
| E_1_6 |  | 6 | 0.6 |
| E_1_7 |  | 7 | 0.7 |
| E_1_8 |  | 8 | 0.8 |
| E_1_9 |  | 9 | 0.9 |
| E_1_10 |  | 10 | 1.0 |

| Entity | Score | e2_position |
|---|---|---|
| E_2_1 |  | 1 |
| E_2_2 |  | 2 |
| E_2_3 |  | 3 |
| E_2_4 |  | 4 |
| E_2_5 |  | 5 |
| E_2_6 |  | 6 | blockByWindow(3, E_1_5) → {E_2_2, E_2_3, E_2_4}

FIG. 20

CANDIDATE ELEMENT SELECTION USING SIGNIFICANCE METRIC VALUES

FIELD

The present disclosure generally relates to data mapping, schema or data model analysis, or schema alignment. Particular implementations relate to selecting potential match candidates using significance metric values.

BACKGROUND

Enterprise data models and database schemas are often very large and very complex, and may consist of thousands of entities, attributes, and relations among the entities and attributes. Integrating separate data models or database schemas is often difficult because of this complexity. However, not integrating systems may result in data silos, with separate systems unable to effectively or efficiently communicate. This may result in duplicative data, or old or incorrect data across different systems. Matching data models or database schemas is important for integrating systems, but matching is generally a very expensive task that is carried out by expensive domain or schema experts. Computational or semi-automated matching efforts are often natural language dependent, and so are generally not broadly applicable or effective in matching schemas for integration. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for determining a set of elements of a second set that may correspond to a given element of a first set of elements. The elements can be, in specific examples, components of a database system, such as tables (or entities), attributes, or records. Significance metric values are calculated for elements in the first and second sets. The significance metric values can be a number of records in an entity or a number of read or write access operations for an entity or for a record of an entity. A significance metric value for the given element can be used at least in part to select elements of the second set as potential match candidates, based at least in part on significance metric values for elements of the second set. Selecting elements can include selecting elements based on a window of elements of the second set or a range of significance metric values.

A method for executing a blocking request is provided. A first set is received, where the first set includes a first plurality of elements of a first type. A second set is received, where the second set includes a second plurality of elements of the first type. One or more significance metric values are calculated for the first plurality of elements. One or more significance metric values are calculated for the second plurality of elements.

A first blocking request for a first element of the first set is received. Based at least in part on a significance metric value for the first element, a third set of candidate elements of the second plurality of elements is determined as potential match candidates for the first element, based at least in part of significance metric values for the second plurality of elements.

The present disclosure also includes computing systems and tangible, non-transitory computer readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 14 is a diagram illustrating how entities that may serve the same purpose in different database schemas can have different attributes, or attributes that serve the same purpose but with different names, and how common records in such entities may have different attribute values.

FIG. 16 provides example pseudocode for a method of calculating and sorting significance metric values for entities in two data models.

FIG. 17 provides example pseudocode for a method of determining candidates of a second set of elements based on a significance value calculated for an element of a first set of elements.

FIG. 19 provides example pseudocode for a method of determining candidates of a second set of elements using a window, where a center of the window is taken at a relative position of the second set corresponding to the reelevate position of an input element in a first set of elements.

FIG. 20 is a diagram of an example scenario for requesting candidates using a blocking approach corresponding to the pseudocode of FIGS. 16 and 19.

DETAILED DESCRIPTION

Figure 1:
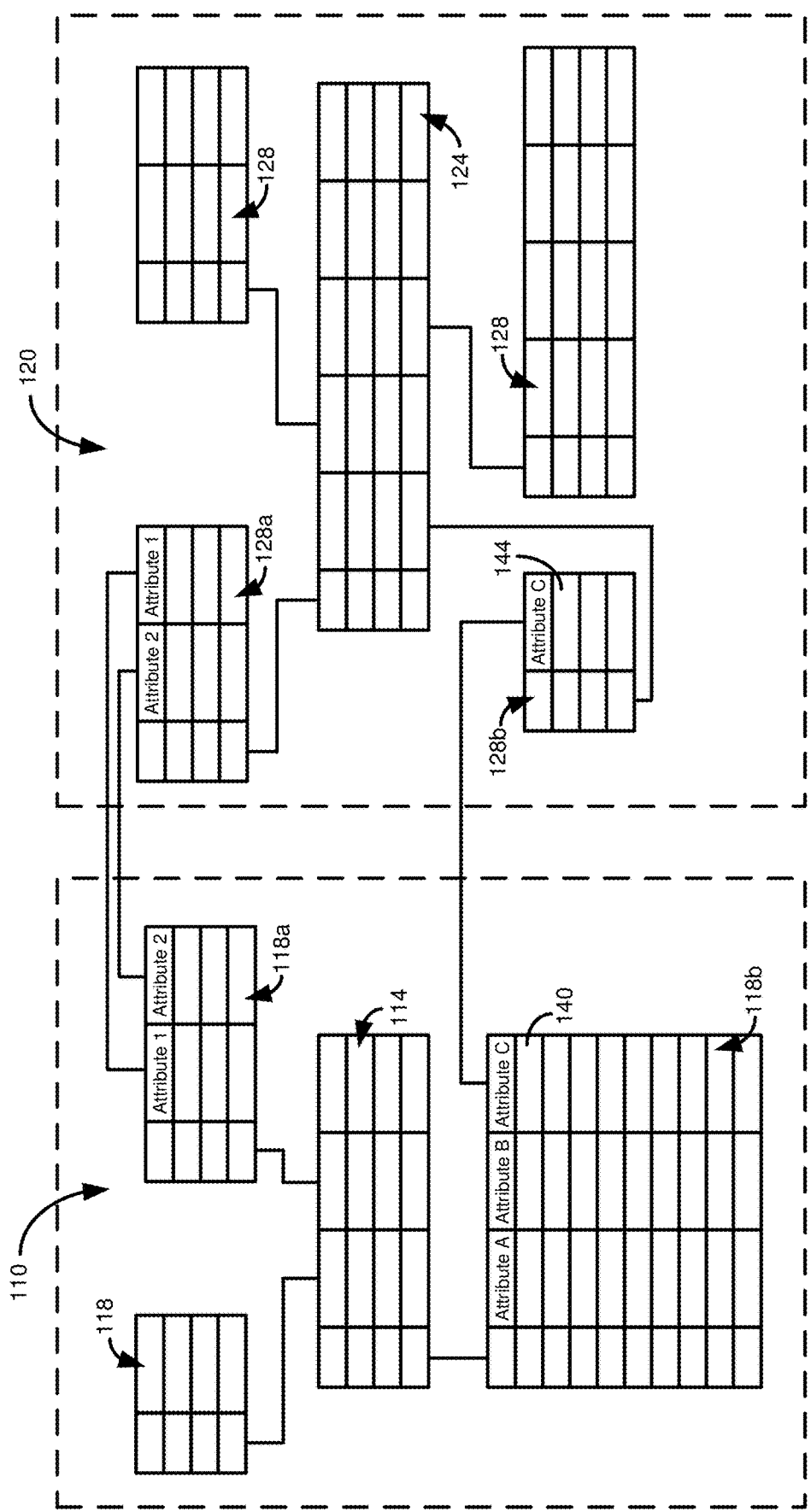
FIG. 1 is a diagram of a data model illustrating how multiple star schemas can be related.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Overview

There are many scenarios where two or more database systems, such as Enterprise Resource Planning (ERP) systems, may work together to effectively or efficiently accomplish a task. For example, ETL (extract, transform, load) processes often migrate or move data from one database to another database, such as a part of system updates, database synchronizing, or data provisioning. Another example is when data from multiple databases is consolidated together into a single source, such as to improve database efficiency or make the data more broadly available (e.g. storing in the cloud). In another example, a collaboration between different people or businesses may lead to a shared database system, which may require consolidation of data from their respective database systems, or database system integration where the separate database systems from the different people or businesses communicate with each other. In all such examples, the databases must typically be aligned or mapped such that data can be accurately translated from one database to another. Generally, aligning or mapping database systems may be accomplished by analyzing the data models or database schemas of the different database systems.

As a more detailed example, an entity may acquire a standard data model rather than update or continue using their current database, including as part of transitioning to a new or updated database software. Data should be inserted into the new database from the customer's current, existing systems. This typically requires mapping the current database to the new database. However, the databases may be complex, and may require multiple consultants and experts to spend significant amounts of time performing the labor-intensive task of mapping the current data model to the new data model. For example, database schema for ERP systems often include thousands of tables, where each table can include many different fields. The tables and fields can be interrelated, and the schema can be even more complex to analyze given that the tables and fields often do not have names that are easily understood by humans Automating or semi-automating the data mapping or schema aligning process makes mapping the data models much easier, less costly, less labor-intensive, faster, and may also improve the quality of the final mapping.

In another detailed example, a customer may have several different data models in use in a database system. The customer may want to generate a consolidated view of data from several of the different data models in the database. Therefore, the different data models typically need to be aligned or mapped so that the data consolidated in the new view may be a meaningful or accurate set of data from the different data models. While not all data may be needed from the different data models, the customer generally must analyze the entire data models to make the correct determinations as to which data is needed from each data model. Similarly, as before, automated or semi-automated data mapping or schema alignment processing may make achieving the consolidated view easier, less costly, less labor-intensive, faster, and may also improve the quality of the final view based on the data model mappings.

Certain disclosed technologies herein provide schema alignment through structural data mapping, which may achieve the data mapping goals described in the provided examples. For example, ETL processes may be effected from one database to another through data mapping achieved through the described structural data mapping and schema alignment. Database views, new database systems, or APIs may be developed for use between different database systems based on data mappings achieved through the structural data mapping analysis provided herein. Schema alignment or structural data mapping may provide a determined mapping between elements of different data models, or may provide a set of meaningful candidates or options for data mapping. Such candidates may be provided to a user to assist in their data mapping, or may be processed by a heuristic or trained machine-learning algorithm to make a mapping determination.

A data model may be an abstract model which may organize elements of data and standardize how they relate to one another and to properties of real-world entities. A data model may be a conceptual data model, broadly defining elements, or a physical data model, specifically defining an implementation structure (e.g., definitions of specific database objects, such as database tables or views, in a specific programming language or database implementation, including definitions of relationships between such specific objects). A data model may be a schema, such as a database schema. A data model or schema may be represented as a graph, as described herein. In some embodiments, data models or data model representations used in the data model mapping technologies described herein may be represented as matching metastructure schemas or models, disclosed in MATCHING METASTRUCTURE FOR DATA MODELING, U.S. patent application Ser. No. 16/399,533, filed Apr. 30, 2019, which is incorporated herein by reference. Additionally, or alternatively, data models or data model representations used in the data model mapping technologies described herein may be clustered data model representations, disclosed in CLUSTERING WITHIN DATABASE DATA MODELS, U.S. patent application Ser. No. 16/399,363, filed Apr. 30, 2019, which is hereby incorporated herein by reference.

Data model mapping may include the process of creating data element mappings between two distinct data models. This process may include data transformation or data mediation between a data source (e.g. source data model or representation) and a destination (e.g. a target data model or representation). Data model mapping may include identification of data relationships, which may be accomplished as part of a data lineage analysis, or identification of hidden, sensitive, or private (e.g. personally identifying information) data. Data mapping may also include consolidation of multiple data models into a single data model, which may include eliminating or reducing duplicative or redundant data (e.g. columns, tables, etc.).

Data mapping may be structural data mapping. Structural data mapping creates mappings based on the structural relationship of elements in the data models. Structural mapping identifies similar or semantically equivalent elements (e.g. tables in a database schema) based on their structural relationship to other elements around them, in each data model. Generally, by analyzing the structure of elements in data models, the structural data mapping process is language/format agnostic. Being language agnostic means that the structural data mapping process does not depend on language constructs in the data models, such as database table names, field or attribute names, or so on. Thus, structural data mapping can map data models using different natural languages (e.g. can map a database schema in English to a database schema in Chinese) or that do not use human-meaningful names (e.g. database tables with computer-generated names such as "tableA456_63"). Accordingly, the disclosed technologies can be used to map between two schema, where the schema may be the same, except for having different identifiers/descriptions, or where elements of the schema, such as objects or object elements having different names or identifiers, different data types, or object elements (e.g., fields) that appear in a different order within a given object. Structural data mapping, as described herein, may provide a data mapping between elements in the mapped data models, or it may provide a set of meaningful candidates or options for mapping, which may then be selected from by a user or another process, such as a machine-learning algorithm trained to select from such structurally-identified candidate sets.

Generally, data mapping endeavors to identify semantically equivalent elements or objects. Semantically equivalent data objects are objects that have the same or approximately the same conceptual data, even if named, stored, or organized differently within the object. For example, a table named "Users" with fields "name," "ID," and "permissions" may be semantically equivalent to a table named "t453_1" with fields "a", "b," "c," and "d."

Schema alignment and data mapping functionality may be provided in database analytics software, database management software, ERP software, or other database-driven software systems. Examples of such tools are: SAP FSDP™, SAP FSDM™, SAP Data Warehouse as a Service (DWaaS) ™, SAP PowerDesigner™, SAP Enterprise Architect™ SAP DataHub™, SAP HANA™, S/4HANA™, C/4 HANA™, HANA Native Data Warehouse™, all by SAP SE of Walldorf, Germany.

Issues can arise in schema matching, whether carried out by humans or by computer programs, is the large number of entities, attributes, and records in typical database systems, particularly enterprise-level databases. In particular, computer programs might be able to provide reasonable alignments between two schemas, but using a large amount of time and computational resources.

Consider a program that includes a method, "similarity," that determines how similar a first entity in a first schema is to a second entity in a second schema. Assume that two schemas are to be matched, and that each schema includes 1,000 entities. Typical schema matching approaches would look at the Cartesian product of both schemas—requiring 1,000,000 comparisons. If each comparison uses 1 second of computing time, then almost 277 (1,000,000/60/60) hours of computing time would be needed, which is more than 11 days.

The present disclosure provides techniques that can be used to reduce the number of comparisons for analyzing a schema, or schema elements. Once candidates are identified using a blocking or candidate selection technique, the identified candidates can be manually analyzed, or analyzed using a comparison algorithm, to determine the best match. For example, taking the above example, assume that rather than taking the Cartesian product of the number of entities in the schema, for any entity in the first schema, rather than having to consider all 1,000 entities in the second schema, the entity could be compared with only the top 10 most likely corresponding entities in the second schema. In this case, only (1000*10) comparisons are needed, requiring a much shorter analysis time of less than three hours. If the matching entity could be found in the top 3 most likely candidates, then the computation time drops to 50 minutes.

Although blocking techniques can allow for schemas or elements thereof to be matched in a faster, more efficient manner, the usefulness of a blocking technique presumes that the "correct" match is in the candidates proposed using the blocking technique. In addition, blocking techniques are generally preferred that are computationally inexpensive, as otherwise less of a performance gain may be realized.

Some blocking techniques have been developed that are based on string comparison. While these techniques can be useful in some circumstances, their utility is usually reduced as the difference in strings used between two schemas becomes more pronounced. For example, if one or both schemas use technical identifiers instead of semantically meaningful identifiers, then it is less likely that two schemas will use the same term (or similar terms) to describe the same entity. Similarly, if two schemas are in different languages, then blocking techniques that use string comparisons are likely to be less useful.

The present disclosure provides a blocking technique that identifies one or more candidates in a target set of elements for an input element, which can be an element of a source set of elements. The blocking technique uses one or more significance metrics, where a significance metric provides a measure of how a given element is used in a system (such as a database system that uses a schema). In the case where entities in a relational database schema are the elements being compared, such as tables, views, or other database artifacts in a physical data model, the significance metrics can include a number of records in a table, the number of read operations for a table, or the number of write operations for a table. Combinations of significance metrics can be used, including linear combinations of significance metrics. Various techniques can be used to determine appropriate weightings for combinations of metrics. Tuning the weightings can make it more likely that the "correct" result is included in candidates provided. In another aspect, multiple significance metrics can be combined into a significance vector. Significance vectors for an input element and a target element can be compared, such as by determining the angle between the vectors using cosine similarity.

Disclosed blocking techniques can be used with one or more types of elements. Elements can include entities in a schema. Elements can also include instances of an entity (e.g., records of table). In a particular implementation, blocking techniques can be first used to align entities in two schemas (e.g., to map one or more entities in a source schema to one or more entities in a target schema). Once the schemas have been aligned, instances (e.g., individual rows in a table) in correlated entities can be analyzed, such as for the purposes of data-deduplication (e.g., when merging two schemas, checking to see whether a row exists in a target table before copying that data from a source table that corresponds to the target table).

Attributes or fields (i.e., columns) of a table can also be used as elements in disclosed blocking techniques. In addition to statistics such as read/write statistics, statistics that can be used for calculating significance metrics for table attributes can include a number of null/non-null values in a given column or analyzing view definitions or queries to determine entities/attributes that are frequently included together in a query.

Results from blocking or matching techniques for one type of element can be used to bootstrap or reinforce blocking or matching for another type of element, provided the elements have some relationship. It may be expected, for example, that entities that are common between two schema would be expected to have common attributes. Thus, identifying candidates for a column using disclosed blocking techniques can also identify, or help refine, candidates that match an entity that includes the input column. In a similar manner, finding candidates, or matches, for entities using disclosed blocking techniques can aid in matching attributes between two sets of elements. Analyzing correspondence between attributes can be particularly useful when two schemas being compared are less similar structurally. For example, a schema for a database that is maintained in row format may be expected to be highly normalized, while a corresponding schema for a database that is maintained in column format may be denormalized. Between these schemas, it is less likely that there will be a one-to-one correspondence between entities, particularly at the level of the physical data model.

Although disclosed technologies are useful in relational database systems, they may also find use in other types of data storage systems, including knowledge graphs (where data is often maintained in a triples store). Generally, the disclosed techniques can be used as long as elements being compared exist in two systems and there are metrics (e.g., number of records or entries, read/write statistics) that are available for use in calculating significance metrics.

In some cases, results can be presented for elements, or collections of elements, other than those directly analyzed using the disclosed techniques. In the case of relational database systems, it is common for end users to be comfortable working with conceptual data models, while the actual database is implemented based on a corresponding physical data model. Typically, however, values that can be used in calculating significance metrics are maintained for elements of the physical data model, but not for the conceptual data model. Provided that a mapping is available between the physical data model and the conceptual data model, blocking and matching techniques can be carried out based on the physical data model. The results can then be translated to the conceptual data model using the mapping.

Disclosed technologies can provide a number of advantages. As described above, by reducing the number of comparisons needed to perform a mapping, blocking can greatly increase the speed of matching two elements, which benefit becomes quite pronounced when large numbers of elements are to be mapped. The use of significance metrics allows candidates to be selected even if two sets being compared are not structurally similar, or are in different languages (or otherwise do not use similar strings to label or describe elements).

The present disclosure begins with a description of database schema, how objects in a schema can be related, and how multiple paths can exist between a pair of schema objects (which can, for example, affect how efficiently processes that use the schema can be carried out), in Examples 2-5. Examples 6-13 describe disclosed technologies that facilitate mapping between such schemas. Examples 14-20 describe blocking, or candidate selection techniques that can be used to facilitate mapping an element of a source element set to an element of a target element set. The blocking techniques of Examples 14-20 can be used with the schema mapping techniques of Examples 6-13 (including for finding anchor points, or using anchor points to improve how significance metrics are calculated), but can also be used with different mapping techniques, or for other purposes.

Example 2—Example Relationships Between Star Schemas

FIG. 1 schematically depicts two star schemas 110, 120. Star schema 110 includes a central fact table 114 and three dimension tables 118. Star schema 120 includes a central fact table 124 and four dimension tables 128. The star schemas 110, 120 may be examples of schemas as described herein for schema alignment. In some embodiments, the two star schemas 110, 120 may be treated as a single schema for mapping to another schema.

In order to obtain data from multiple star schemas, a dimension table that is common to both fact tables is used to bridge the two schemas. In some cases, such bridging can occur if one dimension table is a subset of the other dimension table (e.g., one table contains all the attributes of the other, plus one or more additional attributes). In further cases, bridging can occur as long as at least one attribute is shared, or conformed, between the two star schemas.

For example, in FIG. 1, dimension table 118a is identical to dimension table 128a (other than, potentially, a record ID or other means of identifying tuples that does not convey substantive information). Or, rather than having duplicate tables, dimension table 118a and dimension table 128a can be the same table, but represented as members of multiple star schemas. Each attribute in the dimension tables 118a, 128a can serve as a pathway between facts in fact table 114 and facts in fact table 124. However, each of these pathways is different, in that different attributes are linked together. It can be important which attributes are used to link dimension tables 118a and 128a. For example, operations (e.g., specified by a SQL statement) to implement the pathways may be different. Additionally, some of the pathways may use indexed attributes, while others may not, which can affect the execution speed of a particular pathway.

In the example scenario of FIG. 1, an alternate way of obtaining facts from fact tables 114 and 124 is through the use of attribute 140 of dimension table 118b and attribute 144 of dimension table 128b. However, as shown in FIG. 1, table 118b includes a larger number of tuples than table 118a, which can result in a path involving table 118b having a longer execution time, and requiring more computing resources, than a path involving table 118a.

Example 3—Example Table Relationships Using Primary and Alternate Keys

Figure 2:
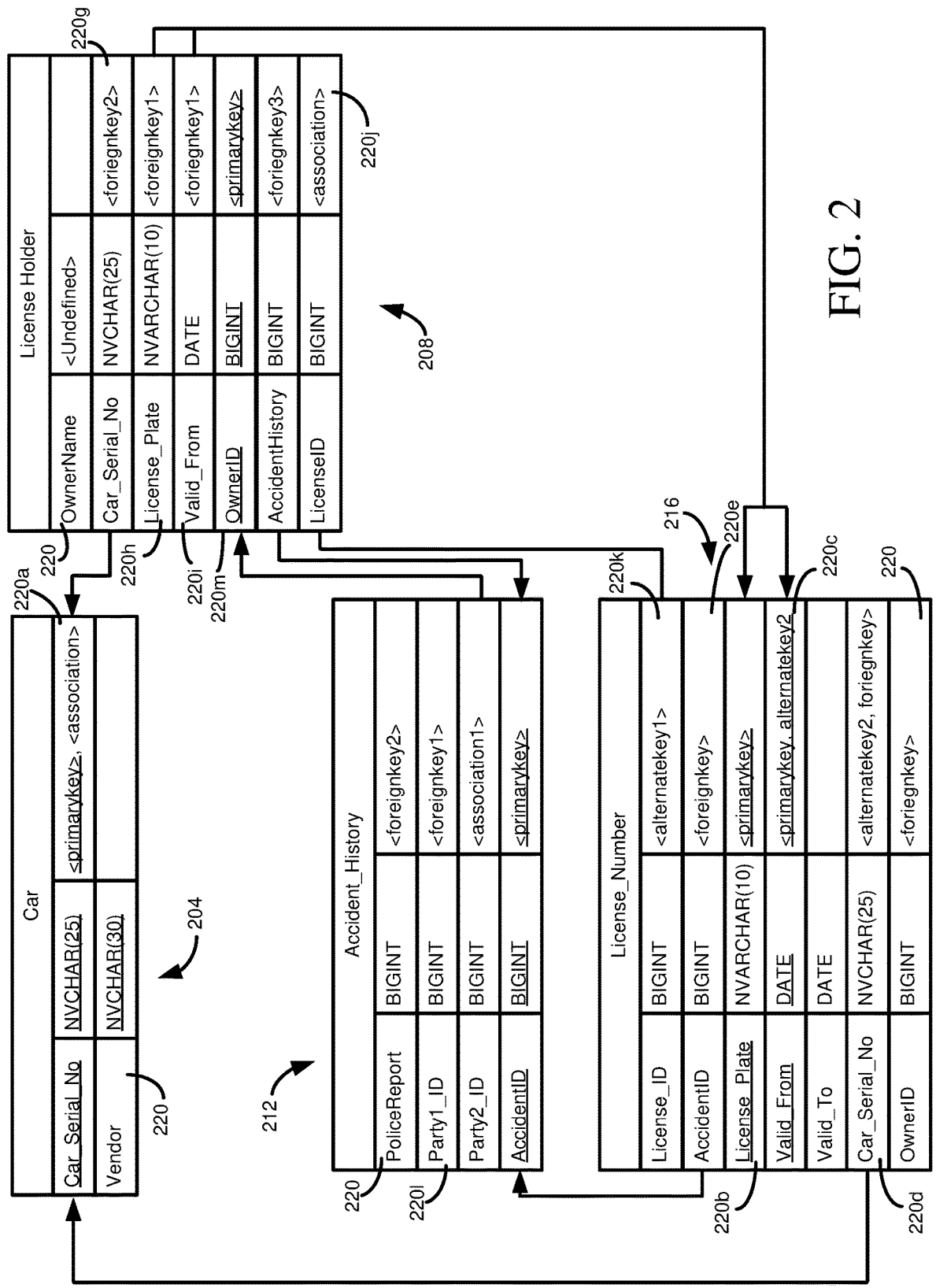
FIG. 2 is a diagram of a data model illustrating how tables can be related by foreign keys or associations, and how multiple pathways between tables can exist.

FIG. 2 schematically depicts how tables can be connected via multiple pathways, and how pathways can be through different table attributes. FIG. 2 illustrates a table 204 representing a car, a table 208 representing a license holder (e.g., a driver having a driver's license), a table 212 providing an accident history, and a table 216 representing a license number (e.g., associated with a license plate). The tables 204, 208, 212, 216 may be examples of elements or structural components for a schema or data model, as described herein for schema alignment.

Each of the tables 204, 208, 212, 216 has a plurality of attributes 220 (although, a table may only have one attribute in some circumstances). For a particular table 204, 208, 212, 216, one or more of the attributes 220 can serve as a primary key—uniquely identifying particular records in the tuple and being designated as the main method of accessing tuples in the table. For example, in the table 204, the Car_Serial_No attribute 220a serves as the primary key. In the table 216, the combination of attributes 220b and 220c together serve as the primary key.

A table can reference records associated with the primary key of another table through the use of a foreign key. For example, the license number table 216 has an attribute 220d for a Car_Serial_No in table 216 that is a foreign key and is associated with the corresponding attribute 220a of table 204. The use of a foreign key can serve various purposes. The foreign key can link particular tuples in different tables. For example, a foreign key value of 8888 for the attribute 220d would be associated with a particular tuple in table 204 having that value for attribute 220a. Foreign keys can also act as constraints, where a record cannot be created having (or altered to have) a foreign key value that does not exist as a primary key value in the referenced table. Foreign keys can also be used to maintain database consistency, where a change to a primary key value can be propagated to a table where the attribute is a foreign key.

A table can have other attributes, or combinations of attributes, that can serve to uniquely identify tuples, but which are not primary keys. Table 216, for instance, has an alternate key that is formed from attribute 220c and attribute 220d. Thus, a unique tuple can be accessed in the table 216 using either the primary key (e.g., being a foreign key in another table) or through an association to the alternate key.

In the scenario of FIG. 2, it can be seen that multiple pathways exist between tables. For example, consider an operation that is to collect data from table 216 and table 208. One pathway is to move from table 216 to table 212 using the foreign key 220e. Then, table 208 can be reached through the foreign key relationship of attribute 2201 of table 212 to the primary key 220m of table 208. Alternatively, table 208 can be reached from table 216 through table 204, since table 216 has an attribute 220d that serves as a foreign key for the primary key 220a of table 204, and attribute 220a is also an associate to the alternate key of attribute 220g of table 208.

In the above scenario, both paths have the same length, but link to different attributes of table 212. The scenario of FIG. 2 is relatively simple, so it can be seen that as the number of tables in a data model increases, the number of possible paths can increase greatly, making determining any path, much less the most efficient path for a particular scenario, complex. In addition, even between two tables, multiple, different pathways can exist. For example, table 208 can access tuples of table 216 through the foreign key attributes 220h, 220i of table 208, accessing primary key attributes 220b, 220c of table 216, or using the association provided by attribute 220j of table 216 which references attribute 220k, an alternate key of table 216. Although the ultimate path is different, table 208 to table 216 are still connected via multiple paths, which are different in that different attributes 220 are connected.

If the tables 204, 208, 212, 216 were represented in a graph, each table may be a node. Paths between tables 204, 208, 212, 216 can be edges, which can be unidirectional or bidirectional. However, different paths between tables form different edges. Again, using the path between tables 208 and table 216 as an example, the path through the foreign key attributes 220h, 220i is a different edge than the path through the association attribute 220j.

Example 4—Example Graph Representation of Database Objects and Graph Traversal

Figure 3A:
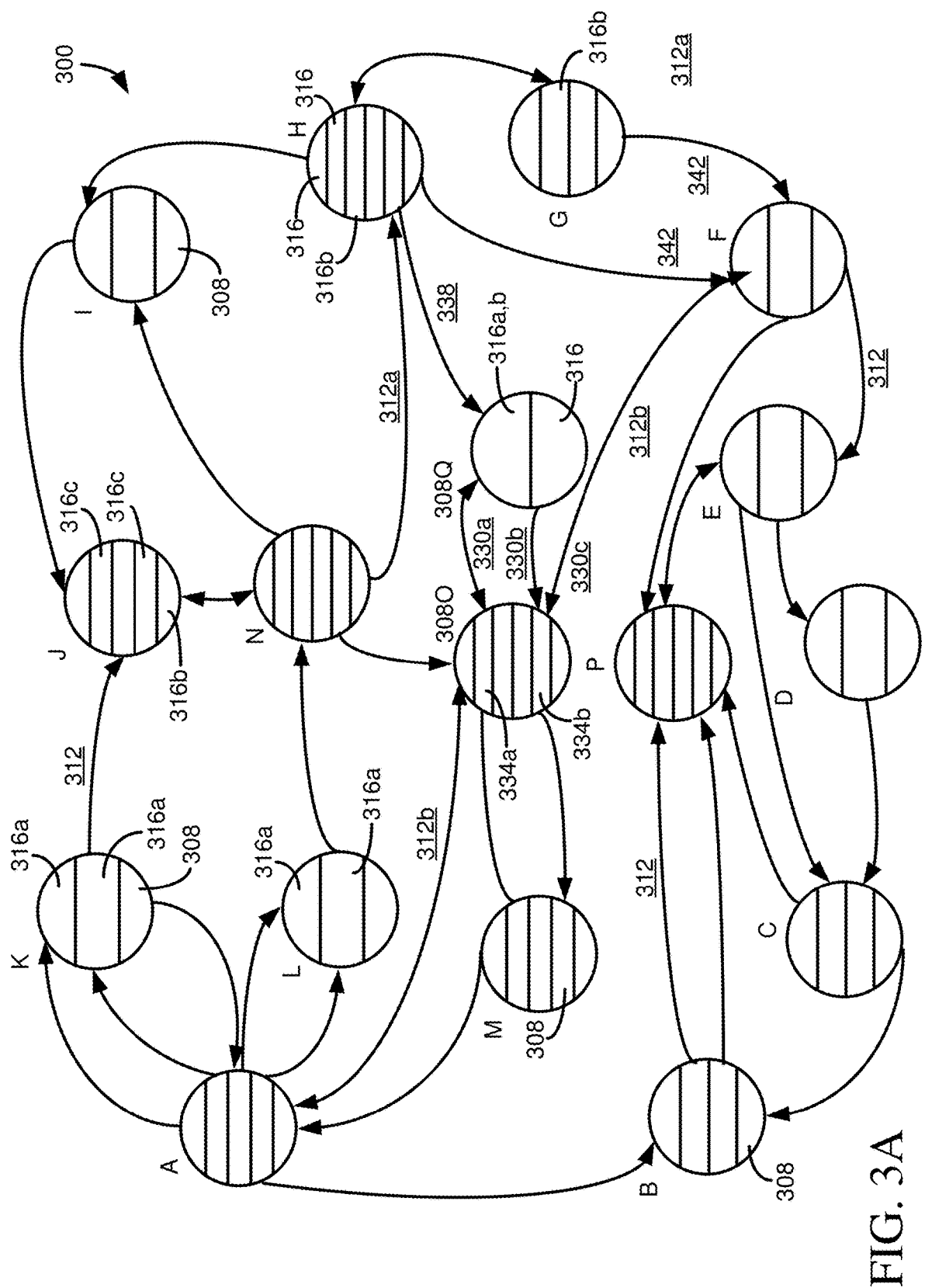
FIG. 3A is a schematic representation of a network of nodes, representing database objects, such as tables, and how multiple pathways can exist between nodes, including through edges connecting to different node attributes.

FIG. 3A illustrates a graph 300 that includes a plurality of nodes 308, where each node 308 is connected to one or more other nodes through one or more edges 312. Edges 312 may be bidirectional or unidirectional. The nodes 308 can represent data sources, such as tables in a relational database. The edges 312 can represent relationships between tables. For example, an edge 312 can represent a primary-foreign key relationship, an association-alternate key relationship, or some other relationship. The graph representation 300 may represent a data model or schema, as described herein, and may be used for schema alignment and data mapping.

Each of the nodes 308 is segmented into multiple sections 316. Each section 316 can represent a different attribute (or column or field) of a table. Some of the sections 316, such as sections 316a, can be unidirectionally connected to one or more attributes of one or more other nodes 308. Other sections, such as sections 316b, can be bidirectionally connected to one or more attributes of one or more other nodes 308 (e.g., an attribute can be both a foreign key or association and a primary key or alternate key). Additional sections 316, such as sections 316c, are not (at least currently) connections to other nodes 308.

In at least some aspects, unidirectional edges, such as edges 312a, can allow a node 308 connected to the tail of an edge to retrieve information from the node connected to the head of the edge. For unidirectional edges 312a, the node 308 connected to the head is typically not able to retrieve information from the node at the tail, at least not through that edge.

For example, a node 308 connected to the head may have a primary key that is an attribute 316 that services as a foreign key for a node connected to the tail of the edge 312a.

The primary key serves to uniquely identify data (e.g., rows, records, or tuples of a relational database table) of the node 308 proximate the head. However, in at least some cases, the primary key of the source node 308 does not uniquely identify data of the target node, the node proximate the tail.

In some cases, the primary key of the source node 308 (which can be a target node that is a starting point for a path) can uniquely identify data of a destination node (which can be a target node that is a destination or ending point for a path), such as when the primary key of the source node is also the primary key or an alternate key of the destination. Additionally, in some aspects, although the foreign key used by a node 308 may not be a primary key, it may be part of a super key (including a candidate key, which can be the primary key), or alternate key, of the node.

The primary key (or other type of key) of a node 308 may include attributes that reference attributes of multiple other nodes. For example, the primary key of a node 308 may include a first attribute from a first referenced node, such as using a foreign key or an association to an alternate key of such node, and a second attribute from a second referenced node, such as a foreign key or an association to an alternate key of such second referenced node.

FIG. 3A illustrates seventeen nodes 308. For large database systems, such as are common for ERP applications, the number of nodes may be orders of magnitude larger. However, even for the comparatively small number of nodes 308 in FIG. 3A, it can be seen that multiple pathways exist between any given node 308. As has been described, even for someone with knowledge of the nodes 308 and their relationships, it can be difficult to determine a route, all routes, or a best route between two nodes, at least if the nodes are not directly connected.

One or more pathways can be identified for obtaining data from at least a first node 308 and at least a second node. Pathways can be identified by representing nodes in a data structure, such as a graph data structure that includes the nodes 308 and connecting edges 312. In some cases, the edges 312 can have one or more weights (e.g., a weight value, a vector of weight values, or a composite or abstract data type that includes one or more values). Weights can represent costs, such as network, memory, or CPU costs that would be incurred, a number of tuples processed, query complexity, or other measures of edge (and therefore path) desirability. In other cases, pathways can be determined without the use of weights.

In particular aspects, a graph traversal method is used to determine one or more paths between two or more specified nodes 308. In some cases, the traversal can determine all paths, while in other cases the traversal method can determine a subset of paths, such as a shortest path (where shortest can refer to a smallest number of nodes traversed or smallest with respect to one or more weights, or a cost function that includes multiple weights). In a particular example, a depth-first search is used to determine paths between two given nodes. In a more particular example, the depth-first search considers a single edge between pairs of nodes in a prospective path, even if multiple edges exist when considered at attribute-level granularity. Once paths are determined, attribute-level edge information can be added to the path information so that such edge information is not lost.

To illustrate how different edges 312 can be used to distinguish paths, in FIG. 3A, a node 3080 is connected to a node 308Q by edge 330a. Edge 330a connects to attribute 334a of node 3080. Attribute 334b is connected to nodes 308Q and (308) F by edges 330b and 330c, respectively. If node 3080 is a terminating or target node in the path (e.g., the starting or ending node), a path through edge 330a would not be considered equivalent to a path through edge 330b, because the edges connect to different attributes of node 3080. Among other things, a request to retrieve or modify data, such as a SQL statement, would typically be constructed differently depending on whether attribute 334a or attribute 334b was being accessed (e.g., SELECT . . . WHERE ATTRIBUTE334A=VALUE versus SELECT . . . WHERE ATTRIBUTE334B=VALUE).

Similarly, if node 3080 was not a terminating node, paths through edges 330a or 330b, 330c would not be considered equivalent, at least in a final path determination, or when operations are generated to define a particular path (e.g., one or more SQL statements). First, other portions of the paths would typically be different. For example, traversing edge 330a would require a path that includes edge 338. Traversing edge 330c would require a path that includes one of edges 342. So, a path through edge 338 may have a different length (e.g., number of nodes) or cost than a path through an edge 342. Second, operations to access data, such as SQL statements, via the paths would be different.

Graph traversal algorithms typically assume that edges 312 between nodes 308 are equivalent. That is, if an edge accesses a first node, that access is equivalent to the access of an edge from any other second node that accesses the first node. Similarly, typical traversal methods assume that two nodes are connected by one edge (which could be unidirectional or bidirectional). In the event these conditions hold true, such typical graph traversal methods can be used, as well as other methods, such as Dijkstra's algorithm or the use of spanning trees (including minimum spanning trees) can be used for path calculations. However, in at least some cases, a traversal method is used that finds more than just the shortest available path, such as all paths, or a subset of all paths that includes more than a single path, including a subset of paths that are noncyclical or which satisfy other constraints (e.g., cost constraints, constraints on which nodes may or may not be in a path). Once paths are determined, attribute-level edge information can be added to the paths.

Pseudocode for a suitable traversal method is:
Start at the first target node (e.g., a starting node for the path);
Get a list of all nodes immediately reachable from the first target node;
Call the depth-first search method recursively for each node of the list;
  If the node is the second target node, mark all nodes in the found path as searched (such as using a flag or Boolean value);
  If the node has the calculated flag set, save the current path, and return to the previous node in the path;
  Otherwise, traverse all nodes connected to the current node;
Remove all nodes that are not part of a saved path; and
Add all possible edges between the nodes.

In some cases, such as using the above pseudocode, a path finding method can determine a set of nodes that are reachable without considering how they are reachable. That is, a first connection to a node through a first edge to a first attribute is considered to be equivalent to a second connection to the node through a second edge to a second attribute. Once the set of reachable nodes has been determined, the edges between the nodes can be added. A visual depiction of the graph can be provided to a user, and the user may visualize how a given path may involve connections to different attributes of a particular table.

Figure 3B:
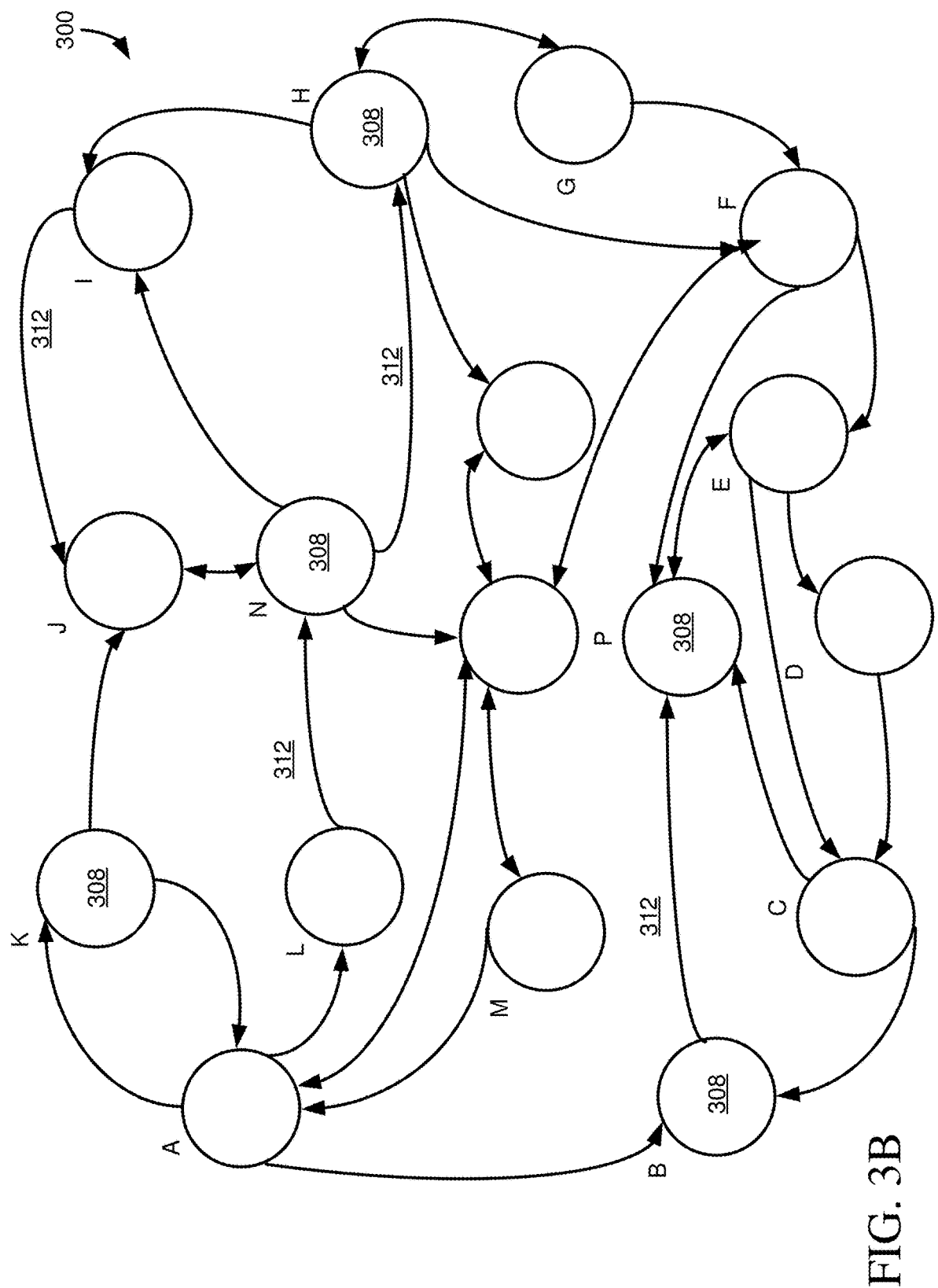
FIG. 3B illustrates the network of nodes of FIG. 3A, where a single edge connects related nodes and differences in connected attributes are not considered.

FIG. 3B illustrates the graph of 300 showing edges 312 between nodes 308, where it is not considered to which attribute(s) an edge connects, and multiple edges between nodes are reduced to a single edge. The above pseudocode can be used to determine paths between nodes. When the paths are to be displayed to a user, the individual edges between attributes can be added in to provide information as shown in FIG. 3A. The user can then determine which of the available paths are more suitable for their purposes, including considering which paths involve the fewest number of nodes, which paths may be more efficient, and paths that may include nodes that have information that may be of interest for a particular purpose (e.g., will be retrieved in a query that traverses the path).

In other aspects, a path determination method can distinguish between different edges to a particular node. For example, assume a node A has a first edge to a first attribute of a node B and a second edge to second attribute of node B. A path from node A to node B through the first edge can be considered different than a path from node A to node B through the second edge.

In some cases, a user can supply path constraints. For example, a user can specify nodes that must be on a path or that must not be on a path. Required nodes can be in the form of a white list prior to an initial path determination, or can be provided by a user (and added to a white list) after an initial path termination. Similarly, prohibited nodes can be provided in the form of a black list prior to initial path determination, or can be provided to a user (and added to a black list) after initial path determination. After an initial path has been determined, nodes can be indicated as required or prohibited in response to user input provided using a display of a current graph of nodes and their interconnections.

When a user selects one or more nodes to be required or prohibited, the paths between nodes can be recalculated and an updated graph, typically with fewer paths, and potentially fewer nodes, can be displayed to a user. The user can interactively designate nodes to be required or prohibited to reduce the number of paths displayed. The user can select a final path, which can result in the generation of operations, such as SQL statements, to implement the chosen path.

In typical traversal methods, nodes are not visited multiple times. However, in some aspects, a traversal method can visit a node multiple times. Visiting a node multiple times can be allowed, in some cases, when multiple edges exist to the node. Visiting a node multiple times can be allowed, in further cases, when a node is required to be on a path.

Consider a set of nodes A, B, C, M, and Z. Assume node A is connected to node B, node B is connected to node C, node C is connected to nodes M and Z, and node M is connected to node Z. If multiple visits to a node are not allowed, and node M is a required node, no path exists from node A to node Z, because the only way to node Z is through node C, and node C must be reached to visit node M. However, if multiple visits to a node are allowed, and node M is a required node, a path does exist from node A to node Z, although it involves node C being visited twice—from node B to node C and from node M to node C. In further aspects, a node can be visited multiple times so long as the visits occur through different attributes. For instance, in the above example, multiple visits to node C may be allowed if the edge from B to C connects to a first attribute of node C and the edge from M to C connects to a second attribute of node C.

As mentioned, in some cases, intermediate nodes can be specified as being required for a valid path or being excluded from a valid path. In one example, when a node is specified as being required, candidate paths are evaluated. When a candidate path is determined to connect a first target and a second target node (i.e., the endpoints of the path), it is determined whether the path includes all intermediate nodes that are required for a valid path (e.g., all nodes on a white list). If it does, the path is selected as a possible path and saved. If not, the path is discarded. However, sufficient path information can be saved (e.g., a flag is set) such that the same path is not reevaluated for a particular path determination instance.

In another example, when a particular node is specified as being prohibited for a valid path, calculation of a particular path stops as soon as a node is encountered that is on the list of prohibited nodes, or black list. That is, the path finding method does not iterate over nodes on the black list. In this way, no paths indicated as valid will include a prohibited node. In other aspects, black listed nodes are just removed from the set of available nodes.

Example 5—Example User Interface Screens

FIGS. 4-7 present example user interface screens according to an example embodiment of the disclosed technologies. The example user interface screens can allow a user to visualize paths between nodes, obtain path information (for example, nodes visited, node attributes accessed, and example operations for the path, such as SQL statements to implement the path).

Figure 4:
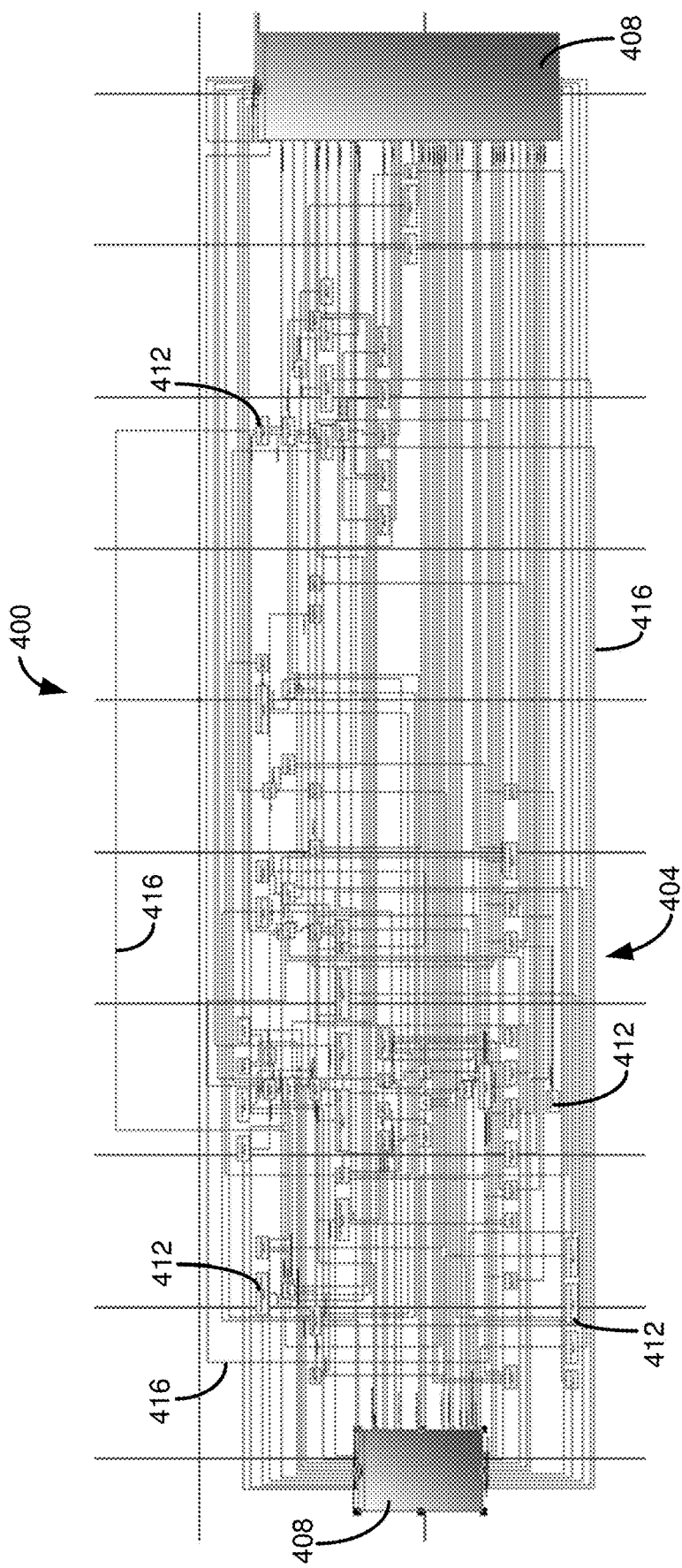
FIG. 4 is an example user interface screen illustrating multiple paths between two target nodes.

FIG. 4 illustrates a user interface screen 400 that illustrates a graph 404 of target tables 408 (e.g., tables having one or more attributes from which data is to be retrieved) and connecting tables 412. Connections 416 link pairs of target tables 408, connecting tables 412, or combinations thereof. The graph 404 can include 80 tables from which connections 416 and pathways can be formed.

Each connection 416 typically indicates a unique edge in a path between the target tables 408 (e.g., between particular sets of one or more attributes of the tables connected by the edge). In some aspects, if a user selects a connection 416, the corresponding path or paths associated with the connection is highlighted. For example, the selected path might be enlarged, displayed in a different color, displayed in a different line width or pattern, highlighted, or otherwise visually distinguished from connections 416 of other paths. Selecting a path may also present operations, such as SQL statements, implementing the path. In some cases, a user may copy and paste the operations, or designate that the operations be used in a particular application.

A user may also select tables 412 or connections 416 to be placed on a list of required tables or connections or a list of prohibited tables or connections. For example, a user may perform a pointing action, such as right-clicking, on a node or connection to display a list of options, which can include adding the node or connection to a list of required nodes or connections or a list of prohibited nodes or connections. Or, user interface elements can be displayed to allow a user to tag tables 412 or connections 416 as being required or prohibited. In some cases, each time a table 412 or connection 416 is indicated as required or prohibited, paths in the graph 404 can be recalculated and displayed. In other cases, a user may make various annotations to the graph 404, and can manually indicate (e.g., by selecting a "recalculate" icon) that recalculation should be performed. In still further embodiments, a user can add required or prohibited nodes to a table, and the information in the table can be used to recalculate paths in the graph 400, including when indicated by a user.

Figure 5:
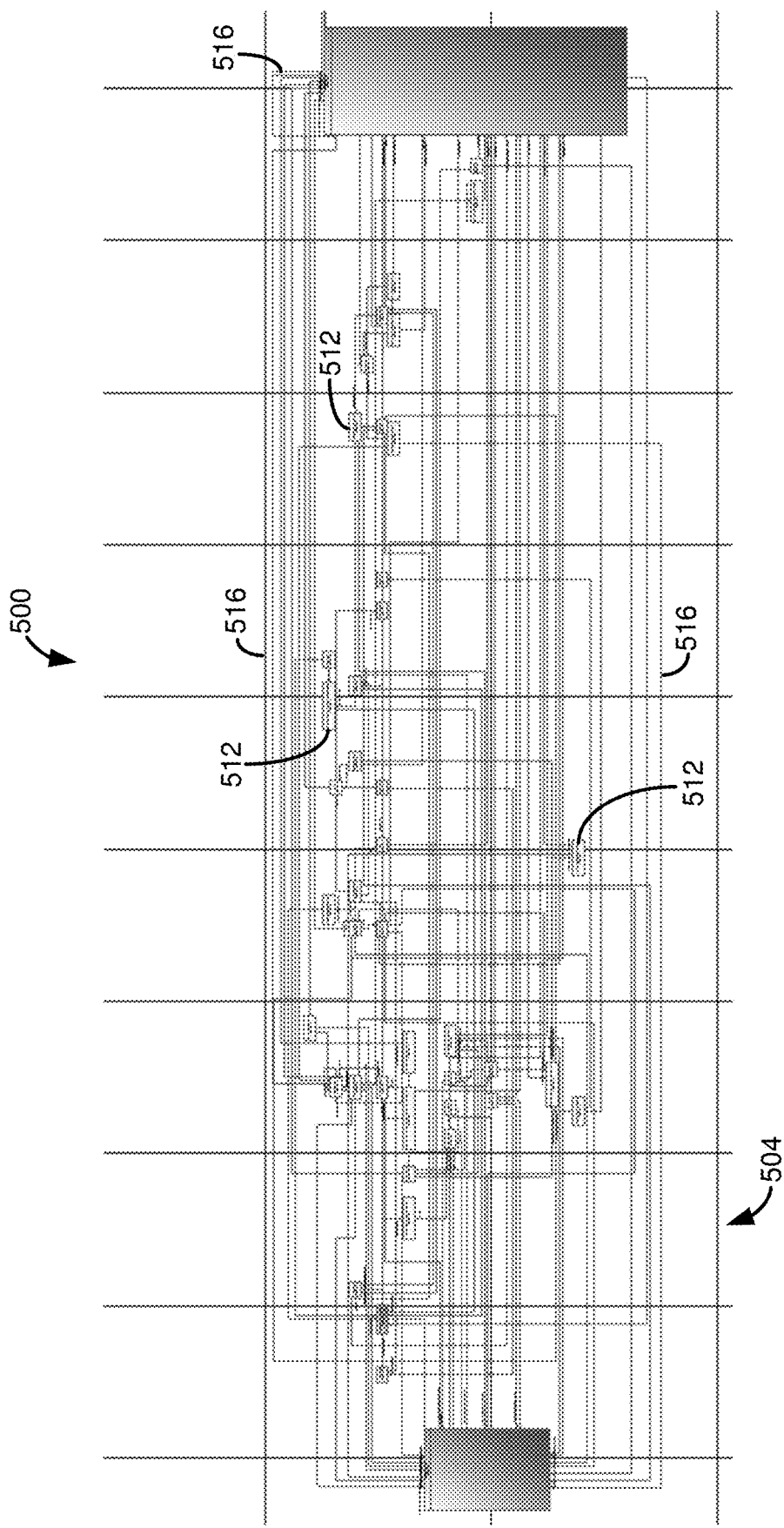
FIG. 5 is an example user interface screen illustrating how paths can be reduced between the target nodes of FIG. 4 by specifying a particular node as required for a path to be valid.

FIG. 5 illustrates a user interface screen 500 having a graph 504 that can be similar to the user interface screen 400 of FIG. 4. However, in FIG. 5, a single table has been added to a list of required tables. It can be seen that the number of connections 516, and consequently pathways, has been greatly reduced compared with FIG. 4. For example, while the graph 404 can have 80 tables, the graph 504 can have 44 tables 512—a reduction of almost half merely by marking a single table as required.

Figure 6:
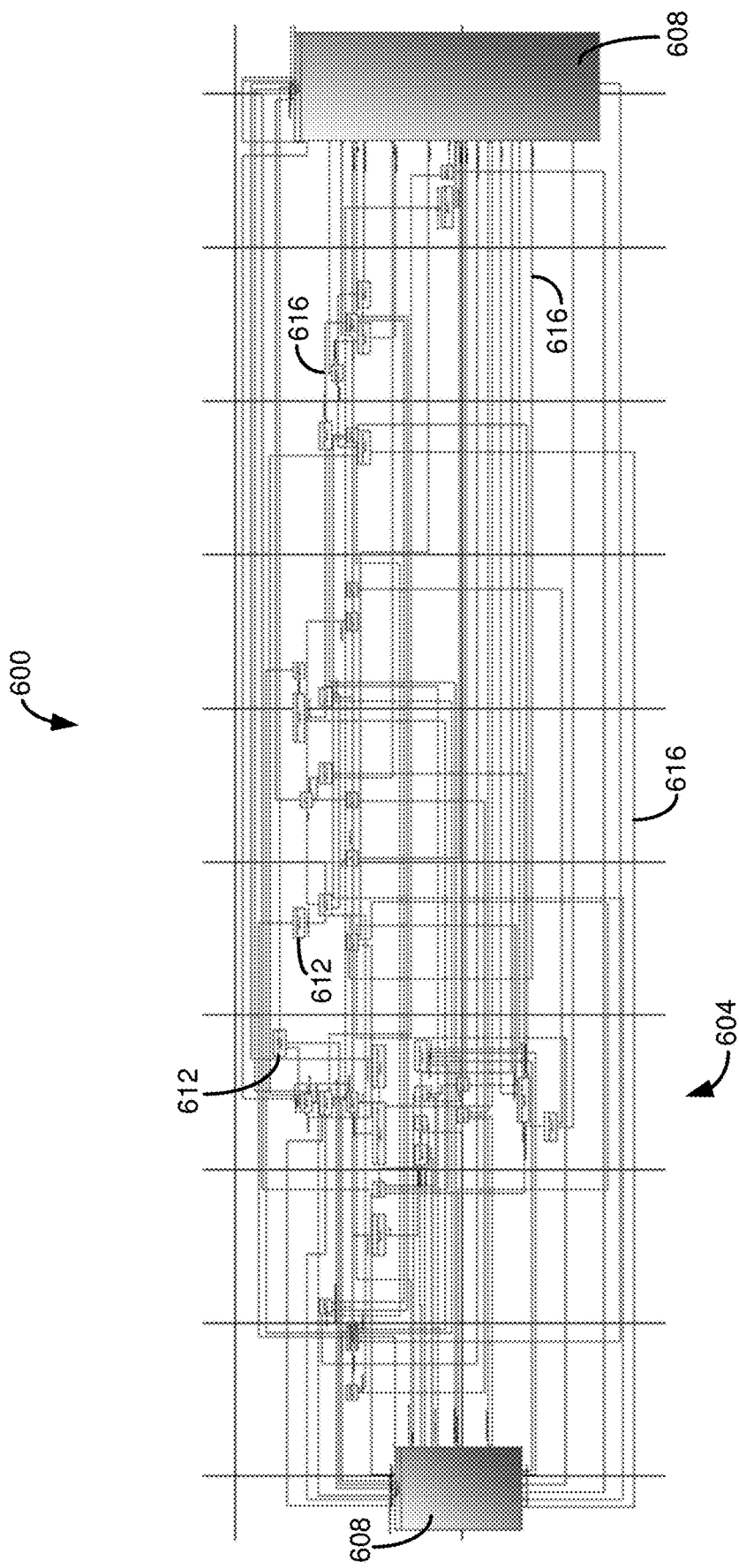
FIG. 6 is an example user interface screen illustrating how paths can be reduced between the target nodes of FIG. 4 by specifying a particular node as prohibited for a path to be valid.

Similarly, FIG. 6 illustrates a user interface screen 600, which can be similar to the user interface screen 400 of FIG. 4, having a graph 604. In the screen 600, a single table was added to a list of prohibited tables. Again, the number of connections 616 and intermediate tables 612, and consequently pathways, between target tables 608 has been greatly reduced compared with FIG. 4. For example, while the graph 404 can have 80 tables, the graph 604 can have 42 tables—a reduction of almost half merely by marking a single table as prohibited.

Figure 7:
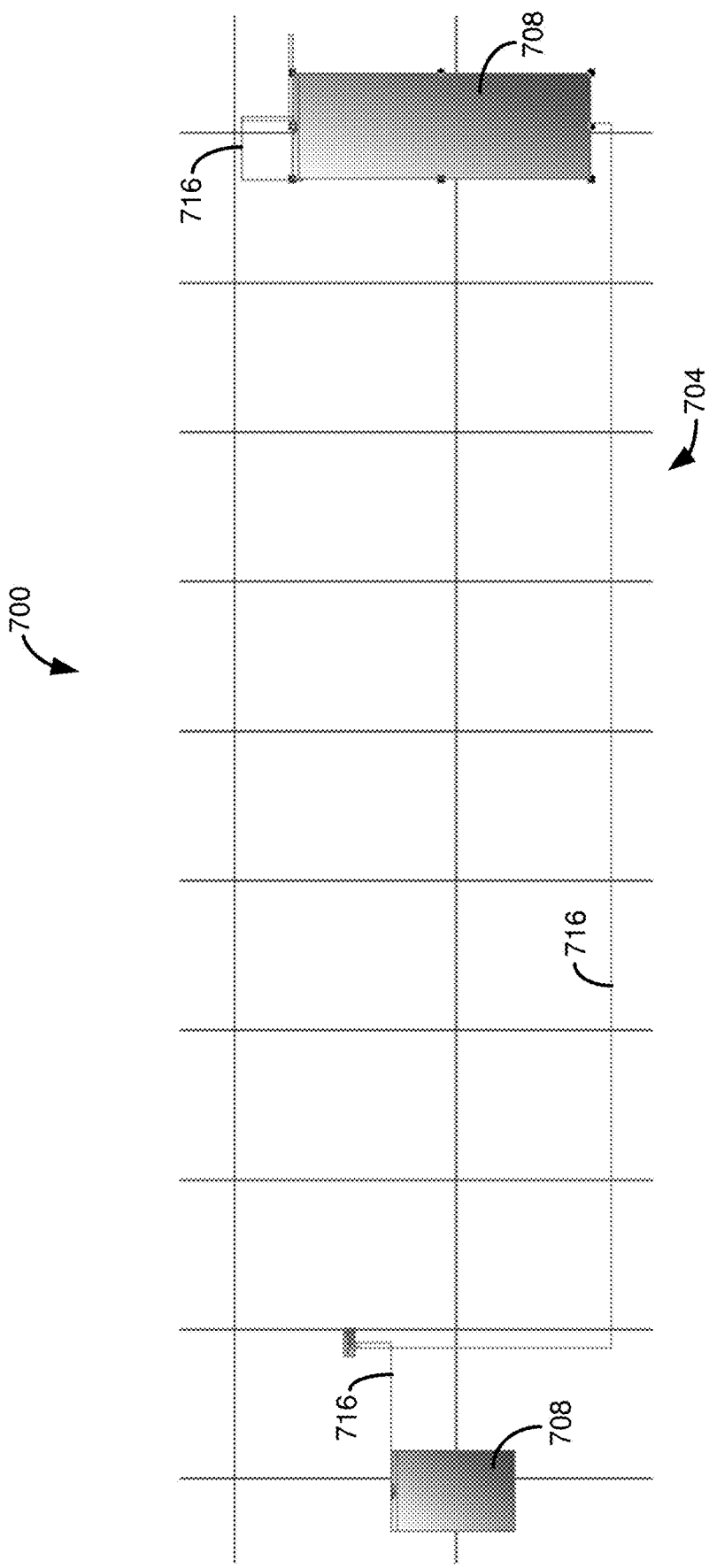
FIG. 7 is an example user interface screen illustrating how a user can eliminate paths from the paths of FIG. 4 in order to obtain a desired path.

FIG. 7 illustrates a user screen 700 that can be similar to the user interface screen 400 of FIG. 4. The screen 700 includes connections 716 for a single, selected path between target tables 708 of a graph 704. As described, an application providing, or associated with, the screen 700 can generate operations, such as SQL statements, to implement the selected pathway.

Example 6—Schema Alignment Architecture

Figure 8A:
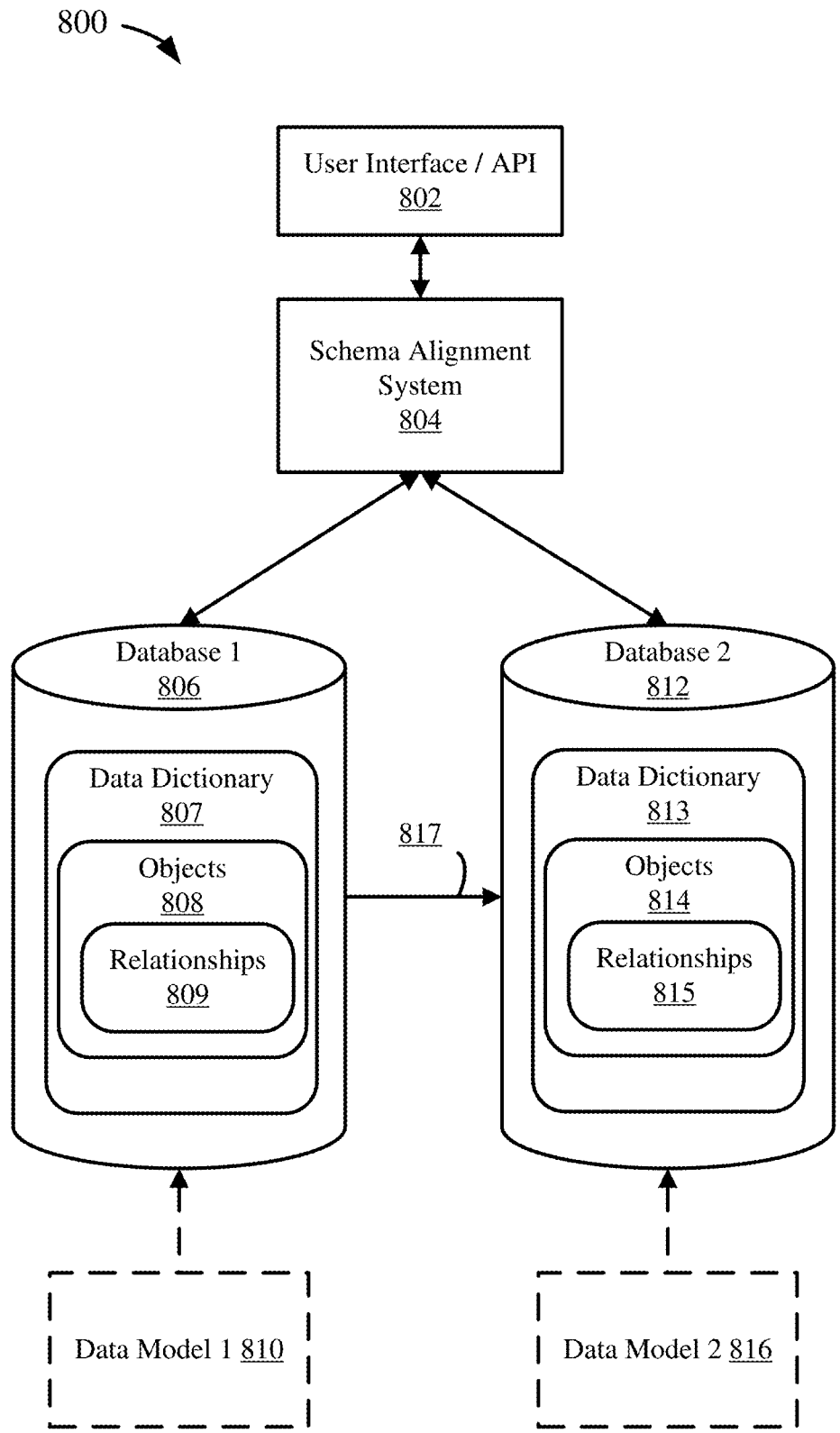
FIG. 8A is an architecture diagram depicting a system for data mapping between databases.

FIG. 8A is an architecture diagram depicting a system 800 for data mapping between databases. A first data model 810 may be implemented as database 1 806. Database 1 806 may be stored on a server or be distributed across multiple servers or virtual servers. Database 1 806 may have a data dictionary 807, which can include definitions (e.g., schema) for one or more data objects 808 (e.g., database tables or views), which definitions can define one or more relationships 809 between the data objects, including between schema elements of the data objects (such as relationships between a field of a first table and a field of a second table, such as a foreign key relationship or an association). Although not shown, the database 1 806 can include additional features, including instances of the object schemas included in the data dictionary 807, such as tables having the schema, where the tables can store data for particular records. While the data dictionary 807 is shown at the database 1 806, a data dictionary 807 can be stored at other locations, such as at a middleware layer that communicates with the database 1. Or, information corresponding to the data model 1 810 can be stored other than in a data dictionary (e.g. 807), but used in the disclosed technologies, so long as it corresponds to the data model.

The data dictionary 807 may have a schema defining database 1 806, which may include definitions for the objects 808 and relationships 809. Generally, the schema in the data dictionary 807 is an implementation representation of data model 1 810. The data dictionary 807 may also have one or more other representations of database 1 806, such as one or more graph representations of database 1, as described herein. In other embodiments, a graph representation of database 1 806 may be stored in database 1 but not in the data dictionary 807, or in another system which may be in association with database 1.

The data objects 808 may be structural components of database 1 806, such as tables (as described herein), views, or stored procedures. The data objects 808 may be linked to each other by the relationships 809. For example, a first table may be linked to a second table by a relationship. The relationship may be implemented as a foreign key field (e.g. column) in the first table defined as pointing to or linking to the second table (e.g. a given row in the second table based on the value in the foreign key field). In a graph representation of database 1 806, as described herein, such tables may be nodes and the relationships may be edges between the nodes. As used in the present disclosure, a graph may refer to a graph data structure that can be used to hold vertices and edges, or another representation of objects (e.g., tables or review) and how the objects are interrelated or connected, but need not be stored as a graph data structure.

A second data model 816 may be implemented in database 2 812, similarly to data model 1 810 and database 1 806. Database 2 812 may be stored on a server or be distributed across multiple servers or virtual servers. Database 2 812 may have a data dictionary 813, which can include definitions (e.g., schema) for one or more data objects 814 (e.g., database tables or views), which definitions can define one or more relationships 815 between the data objects, as described above. The data model 2 816, database 2 812, data objects 814, and data dictionary 813 can be implemented analogously to the components of the database 1 806.

The data dictionary 813 may have a schema defining database 2 812, which may include definitions for the objects 814 and relationships 815. Generally, the schema in the data dictionary 813 is an implementation of the data model 2 816. The data dictionary 813 may also have one or more other representations of database 2 812, such as one or more graph representations of database 2, as described herein. In other embodiments, a graph representation of database 2 812 may be stored in database 2 but not in the data dictionary 813, or in another system which may be in association with database 2.

The data objects 814 may be structural components of database 2 812, such as tables (as described herein), views, or stored procedures. The data objects 814 may be linked to each other by the relationships 815. For example, a first table may be linked to a second table by a relationship. The relationship may be implemented as a foreign key field (e.g. column) in the first table defined as pointing to or linking to the second table (e.g. a given row in the second table based on the value in the foreign key field). In a graph representation of database 2 812, as described herein, such tables may be nodes and the relationships may be edges between the nodes.

A schema alignment system 804 may provide data mapping or schema mapping functionality to map 817 a source database or data model, such as database 1 806, to a target database or data model, such as database 2 812. Generally, the schema alignment system 804 maps 817 source database 1 806 to target database 2 812 by identifying data objects 808 in database 1 and data objects 814 in database 2 that are semantically equivalent. Semantically equivalent objects may be objects that store (or are configured to store) the same or approximately the same data, or perform the same or approximately the same functionality, in whole or in part. The schema alignment system 804 may access the databases 806, 812 (or otherwise access information describing their respective data models 810, 816) to analyze them as part of the data mapping 817, which may include obtaining their schemas from their data dictionaries 807, 813 or other representations of their data models 810, 816, such as graph representations (which can be provided, or can be generated as part of the disclosed technologies, such as generating a graph representation from the data dictionaries 807, 813, or another description of the data models 810, 816). In some embodiments, the schema alignment system 804 may access one or more files representing one or both of the data models 810, 816, in place of accessing the databases 806, 812. For example, data model 1 810 may be stored as one or more UML diagram files, which may be used by the schema alignment system, or may be converted to a graph representation which may then be used by the schema alignment system 804. The schema alignment system 804 may be a stand-alone system or software program, or may be a schema alignment module as described herein.

The schema alignment system 804 may have a user interface/API 802. The user interface 802 may provide a user with a display of identified mappings between database 1 806 and database 2 812, such as a visualization of the database schemas and their alignment or mapping. The user interface/API 802 may allow a user to select a data object (e.g. out of 808) to map to one or more objects in another data model. The user interface/API 802 may allow a user to receive or display a set of options for mapping a target data object. The user interface/API 802 may allow a user to select an option for mapping, change mappings, suggest mappings, or identify anchor points for use in mapping, as described herein. The user interface/API 802 may allow another program or process to access the data mapping functionality of the schema alignment system 804, such as to obtain a set of possible mappings in database 2 812 for a target data object in database 1 806.

Example 7—Object Mappings

FIGS. 8B-E are diagrams depicting example object mappings between data models.

Figure 8B:
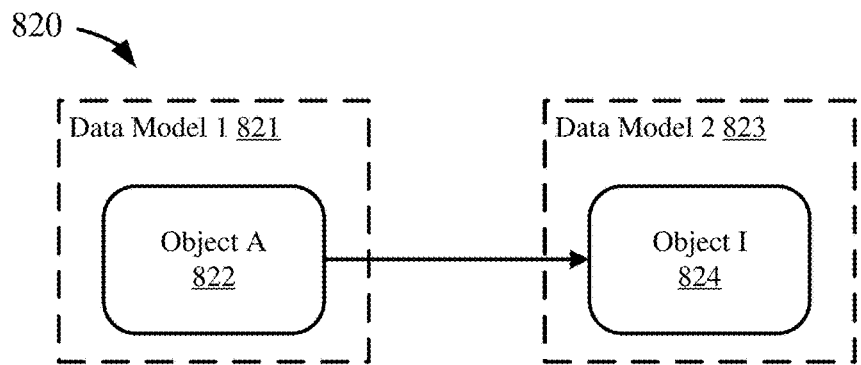
FIGS. 8B-E are diagrams depicting example object mappings between data models.

FIG. 8B illustrates an example 820 of a complete mapping. Generally, a complete mapping is a one-to-one mapping between two data objects. For this example 820, Object A 822, in data model 1 821, is mapped to Object I 824, in data model 2 823. Thus, because the mapping from Object A 822 to Object I 824 is only between those two objects, it is a complete mapping.

Figure 8C:
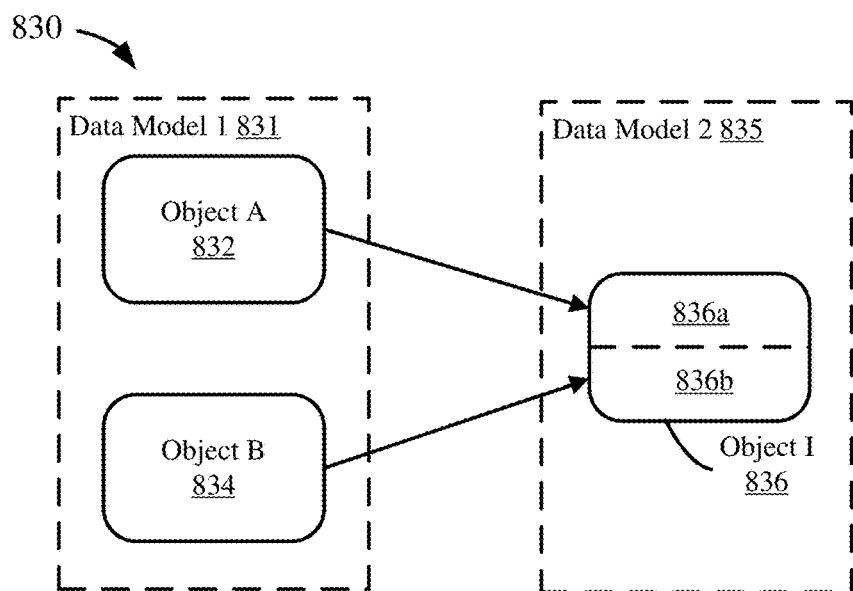

FIG. 8C illustrates an example 830 of an assembling mapping. Generally, an assembling mapping is a many-to-one mapping between three or more data objects, such as data maintained in multiple source tables being maintained at a single (or, in any event, smaller number) of tables in a target system. An assembling mapping may assemble two or more source objects, which together map to a single target object. For this example 830, Object A 832 and Object B 834, both in data model 1 831, are mapped to Object I 836, in data model 2 835. Object A 832 may be mapped to a portion or subset of Object I 836a, while Object B 834 may be mapped to another portion or subset of Object I 836b. The portions 836a, 836b may be non-overlapping or may overlap in part. Thus, the mapping from Object A 832 and Object B 834 to Object I 836 is an assembling mapping because Objects A and B are both used (assembled) to map to Object I.

Figure 8D:
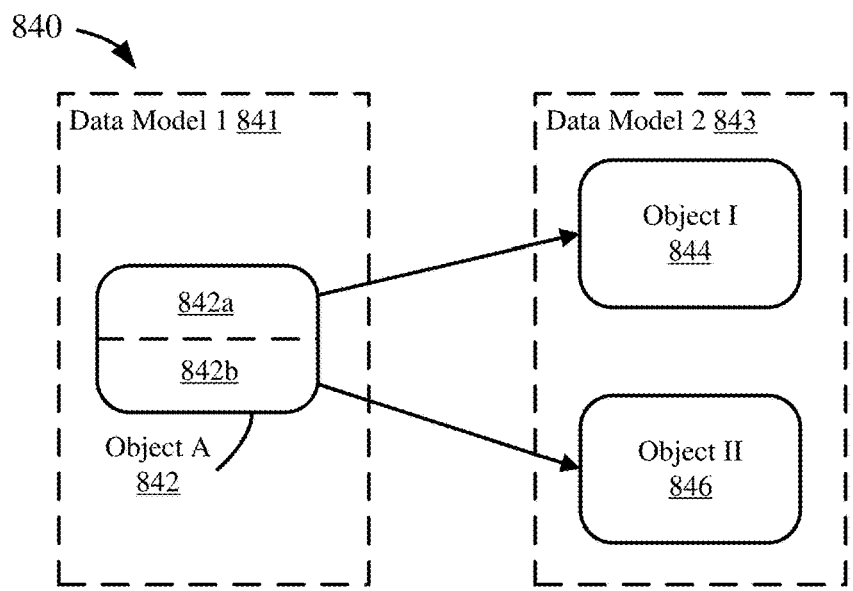

FIG. 8D illustrates an example 840 of a division mapping. Generally, a division mapping is a one-to-many mapping between three or more data objects. A division mapping may divide a single source object to map it to two or more target objects. Data that is maintained in a single table at a source database system may, for instance, be maintained in multiple tables in a target database system). For this example 840, Object A 842, in data model 1 841, may be mapped to both Object I 844 and Object II 846, both in data model 2 843. A portion or subset of Object A 842a may be mapped to Object I 844, while another portion or subset of Object A 842b may be mapped to Object II 846. The portions 842a, 842b may be non-overlapping or may overlap in part. Thus, the mapping from Object A 842 to Object I 844 and Object II 846 is a division mapping because Object A is divided to map to separate objects, Object I and Object II.

In some cases, an assembling mapping or a division mapping may be a duplicative mapping. For example, two objects may map to a single object because they are all three similar, rather than because both source objects are necessary to form a complete mapping to the target object.

Figure 8E:
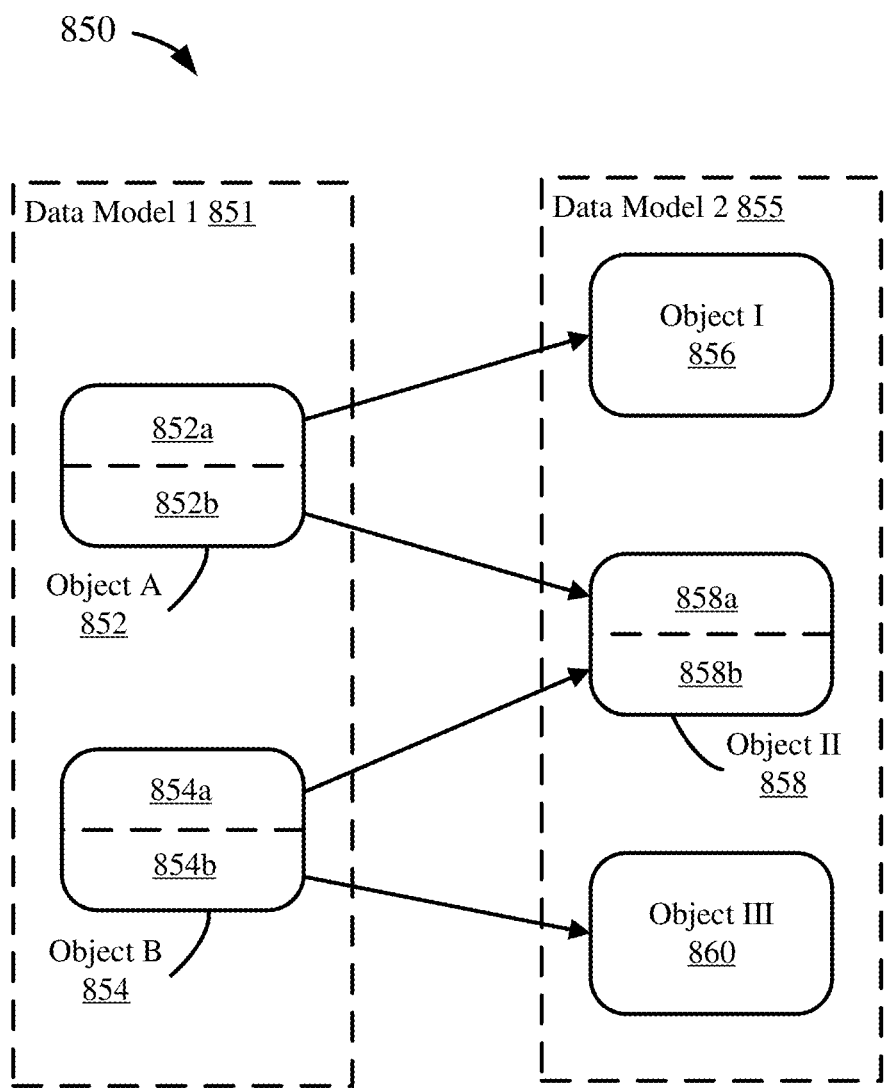

FIG. 8E illustrates an example 850 of a complex or combination mapping. Generally, assembling and division mappings may be combined when mapping one data model to another. For example, data model 1 851 may have Object A 852 and Object B 854 which may be mapped to Object I 856, Object II 858, and Object III 860 in data model 2 855. A division mapping may map a portion of Object A 852a to Object I 856 and another portion of Object A 852b to Object II 858. A division mapping may also map a portion of Object B 854a to Object II 858 and another portion of Object B 854b to Object III 860. Thus, an assembling mapping of Object A 852 and Object B 854 may be used to map to Object II 858. More specifically, a portion of Object A 852b may be mapped to a portion of Object II 858a, while a portion of Object B 854a is mapped to another portion of Object II 858b. The assembling of Object A 852 and Object B 854 may only be a portion 852b, 854a of each object. Thus, different mappings may be used in conjunction or together to form more complex mappings that may more accurately map data model 1 851 to data model 2 855.

Example 8—Anchor Points

Data mapping between databases may use one or more anchor points. Generally, an anchor point is a known mapping, such as a complete mapping, between an object in a source data model and an object in a target data model. Thus, an anchor point may include an identifier for an object in a first representation and an identifier for the mapped object in the second representation. An anchor point may also include identifiers for the respective data representations.

In some cases, an anchor point may be a multi-mapping anchor point between more than two objects. For example, an assembling mapping or a division mapping may be an anchor point.

In some cases, an anchor point may be determined by a human, or may be human-reviewed and confirmed. In other cases, an anchor point may be determined by a computing system, such as through a heuristic or machine-learning algorithm. Such a mapping may also be human reviewed as well. A computer-generated mapping for an anchor point may also have an associated confidence value, which may need to meet a given threshold to qualify as (e.g. be used as) an anchor point.

Example 9—Schema Alignment Process

Figure 9A:
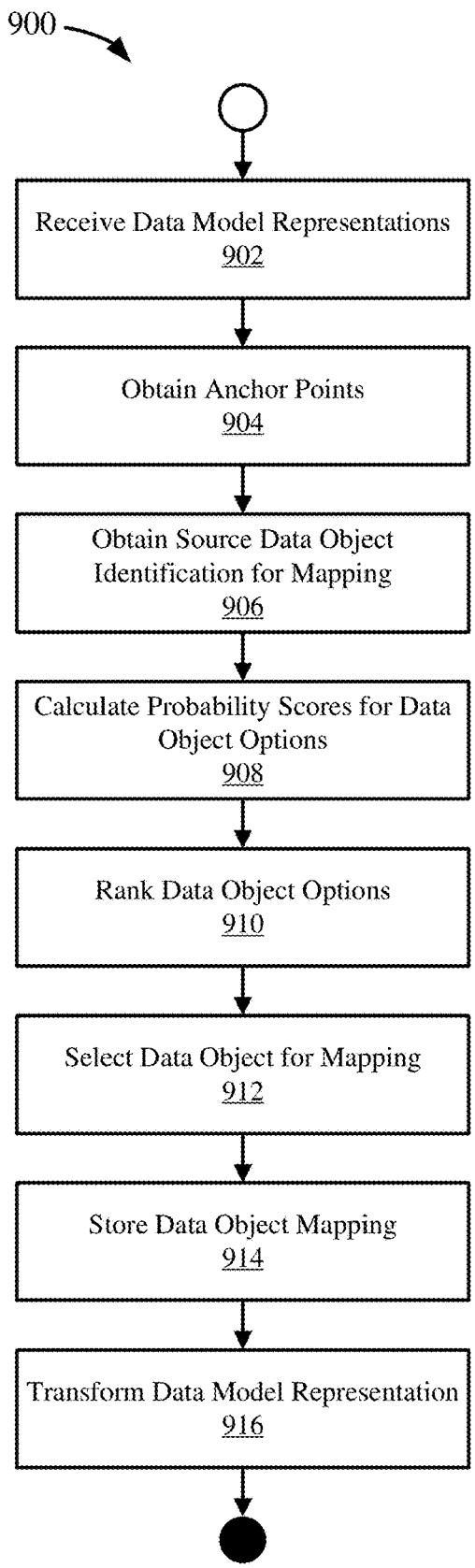
FIG. 9A is a flowchart illustrating a process for data object mapping.

FIG. 9A is a flowchart illustrating a process 900 for data object mapping. The process 900 generally maps a data object in a source data model representation (or in some cases, multiple data objects from the source data model) to one or more data objects in a target data model representation. The process 900 may be performed iteratively to map all data objects in the source representation to data objects in the target representation. Performing the process 900 iteratively may include mapping a first data object in the source presentation, and then selecting the next source data object for mapping (e.g. at step 906) and repeating the remaining steps to map that object, and so on.

Data model representations are received at 902. Generally, two data model representations are received, a source representation and a target representation. Receiving the data model representations at 902 may include receiving identifiers for the data model representations, which may be used to access the data model representations. A location value may be provided along with a data model identifier, in some cases. In other embodiments, receiving the data model representations at 902 may include receiving indicators to access a database to obtain the data model representations. In other embodiments, the data model representations themselves may be received at 902. For example, graph representations of the data models may be received (or otherwise obtained) at 902.

One or more anchor points for the source and target representations may be obtained at 904. The anchor points may be obtained from a user via a user interface. Alternatively, or additionally, the anchor points may be obtained from data storage of previously identified anchor points, such as from a mapping file or mapping database. In some embodiments, anchor points may be obtained at 904 from a computing system, which may use a heuristic or machine-learning algorithm, to determine anchor points between the data representations. In some cases, multiple anchor points may be obtained from different sources at 904. For example, an anchor point may be provided by a user through a user interface, while an additional anchor point, that was previously identified, may be obtained from a mapping file. In some embodiments, one or more anchor points obtained at 904 may be mappings previously determined through this process 900. For example, such previously determined mappings may also have a confidence value, which may qualify them as anchor points if they satisfy (e.g. exceed) a threshold.

An identification of a source data object for mapping may be obtained at 906. The source data object identified at 906 may be the object for mapping from the source representation to the target representation. Generally, an identifier for the source data object to map is obtained at 906. Obtaining the source data object at 906 may be accomplished through a user interface, such as by a user. Alternatively, or additionally, a source data object may be obtained at 906 programmatically, such as by selecting the next data object in the source representation not mapped (or selecting the next object to map based on one or more criteria or an algorithm or set of selection rules).

Probability scores may be calculated at 908 for the data object options for mapping to the source data object identified at 906. Generally, the data object options, to which the source data object may be mapped, are all data objects in the target representation. In some cases, the data object options in the target representation may not include anchor points, or, in other cases, already mapped data objects (or both). A probability score may indicate the probability or likelihood that a given data object in the target representation should be mapped to the identified source data object. A structural score algorithm may be used to calculate the probability scores for the data object options. Such a structural algorithm may analyze the placement of the data object options in the target representation with respect to the anchor points, compared to the source data object's placement in the source representation with respect to the anchor points. Specifically, process 920 shown in FIG. 9B may be used to calculate the probability scores at 908.

The data object options may be ranked at 910 based on their probability scores. Ranking may include generating a list of the data object options and sorting the data object options. In some cases, further processing on the ranked data object options may be performed at 910. For example, only options with a probability score meeting a given threshold may be kept on the list while any options not meeting the threshold may be removed. In other cases, only the options with the best probability score may be kept while others are removed, or options with the two best probability scores are kept (and so on). Other ranking rules may be applied as well at 910. Ranking can include selecting a single candidate, when only one exists, or selecting a single most probable candidate from multiple potential candidates.

A data object is selected at 912 for mapping to the source data object identified at 906. Generally, the data object selected at 912 is selected from the ranked data object options from 910. In some cases, multiple data objects may be selected from the data object options to create a more complex mapping, such as a division mapping, as described herein. Selecting the data object at 912 may include providing the ranked data object options to a user, such as through a user interface, and receiving a selection from the user. In some embodiments, selecting the data object at 912 may be accomplished programmatically, such as by selecting based on criteria or rules. For example, the data object with the best probability score may be selected.

In other embodiments, selecting the data object at 912 may include analyzing the ranked data object options using a heuristic or machine-learning algorithm to select the data object option for mapping. In such cases, the entire set of ranked data object options may be provided to the algorithm, or a subset of the ranked data object options (e.g. the first 10,000 options, the options with the best three scores, etc.). Analyzing the data object options for selection may include providing the ranked set of data object options to a heuristic or machine-learning algorithm, such as calling a function for the analysis and providing the ranked data object options as arguments to the function, or making an API call to another system or service for selecting the data object option from the ranked data object options. In some embodiments, a machine-learning algorithm may be effective at selecting data object options for mapping when provided a smaller set of options, such as may be determined here or at step 910, with scores, such as the probability scores calculated at 908. In these embodiments, the current process 900 may provide an improved set of options to another analytical process or algorithm which may perform better in selecting based on the set of options and scores generated through this process. In this way, this process 900 for schema alignment may be integrated with other machine-learning or heuristic (e.g., natural language) processes to improve performance by obtaining better data mapping selections.

The selected target data object for the mapping may, along with its source data object counterpart, be used as an anchor point for future data mapping between the source and target representations. In other cases, the mapped objects are not used as anchor points, or may be used as anchor points if a mapping confidence value satisfies a threshold. When multiple anchor points are used, the anchor points can be used to assign a confidence value to a mapping, including weighting anchor points differently. That is, for example, for a second object to be mapped, the second object can be mapped using the first anchor point, the second (calculated) anchor point, or both anchor points (as will be further described). In the case that the first and second anchor points are individually evaluated, further mappings can be tracked, and optionally ranked or assigned confidence values, based on the source of the anchor point (e.g., calculated or user-defined) or based on agreement (or not) between mappings produced by the different anchor points. Further, in some cases, multiple mappings can be determined from a given graph, using a different node as a starting point, to help reduce the risk that an order in which anchor points are determined may affect a final outcome).

The data object mapping selected at 912 may be stored at 914. Storing may include writing the data mapping to a memory or other data storage, such as in a database or data mapping file. The stored data mapping may include identifiers for the source data object and the selected target data object (or objects), and may further include identifiers for the source data model or representation and the target data model or representation. In some embodiments, the data mapping may be stored in the respective data model representations, such as by setting a field in the source data object to the identifier for the mapped target data object (and vice versa). In other embodiments, the mapping may be stored as a metadata object in a metadata schema including the source data model and the target data model.

A data model representation may be transformed at 916. Transforming a data model representation may include adding one or more links between data objects such that the target mapped object has the same distances from the anchor points as its mapped source data object, or vice versa. Thus, the updated representation may be altered to have additional similar paths (e.g. links, edges, or relationships) between data objects as the other representation, without having its existing paths removed or changed.

In some embodiments, a data representation may be transformed at 916 based on the mapping selected at 912. A complete mapping may not invoke a data model transformation. An assembling mapping may invoke transformation of the source data representation, while a division mapping may invoke transformation of the target data representation. Generally, the transformation process at 916 aligns the two data representations based on the newly identified mapping from step 912. The transformation at 916 generally adds links or edges so that the two data representations have similar links or edges.

Transforming the target representation at 916 may improve the quality of the probability scores or results (e.g. ranked data object options) generated by the process 900 in later iterations of the process. By transforming the target representation based on the mappings, the structure of the target representation more closely resembles the structure of the source representation after each iteration of the process 900, which generally makes generating the probability scores based on a comparison of the structures in each representation more accurate, and thus provide improved scores and mapping or alignment results.

In general, the source and target representations may be temporary copies of the representations for use during the schema alignment process 900. This allows the target representation to be freely transformed at 916 without altering or otherwise losing the representation of the data model or database as it is actually implemented. However, in some cases, a target or source data model can be transformed to match the other data model.

Example 10—Probability Scores Process

Figure 9B:
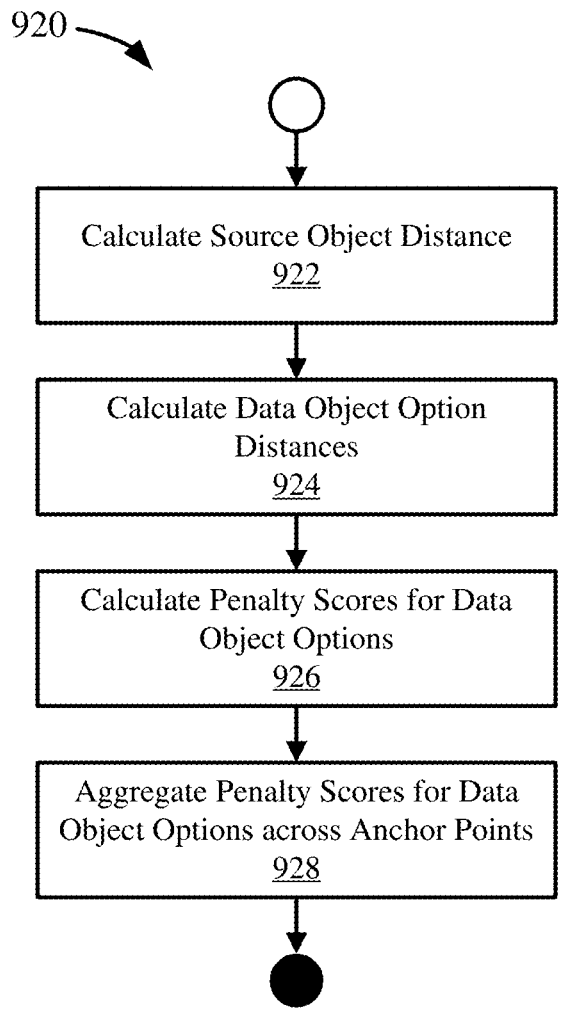
FIG. 9B is a flowchart illustrating a process for calculating mapping scores used in mapping data objects.

FIG. 9B is a flowchart illustrating a process 920 for calculating mapping scores used in mapping data objects. The process 920 may identify target data objects that are semantically equivalent to a source data object based on a structural analysis of the data objects in their respective schemas. The process 920 may be included in the process 900 when calculating probability scores at 908.

A source object distance may be calculated at 922 for a source data object in a source representation, such as may be identified in process 900 at step 906. The source object distance may be the shortest distance, or number of links (e.g. edges or relationships between nodes or objects) between the source data object and an anchor point. For example, a source data object that is directly linked to an anchor point has a distance of 1 from that anchor point. If the source data object is connected to the anchor point through another data object, the source data object has a distance of 2 from that anchor point. Calculating a source object distance at 922 may include calculating separate distance values between the source data object and each anchor point. Thus, a set of distance $\{D_{Ti}\}$ may be calculated for each anchor point i for the source data object, where $D_{Ti}$ is a given distance.

Data object option distances may be calculated at 924 for data object options in a target representation. A data object option distance may be the shortest distance between a data object option and an anchor point, similar to the source object distance. Calculating a data object option distance at 924 may include calculating separate distance values between the data object option and each anchor point. Further, data object option distances may be calculated for each data object option in the target representation. Thus, a set of a set of distances $\{\{D_{Ai}\}_j\}$ DMA may be calculated for each anchor point i and each data object option j, where $D_{Aij}$ is a distance between a given data object option j and a given anchor point i.

Calculating distances based on a multi-mapping anchor point may be accomplished by averaging the distance to each of the multi-mapped anchor points in the data representation.

Penalty scores may be calculated for the data object options at 926. Calculating a penalty score may be accomplished at least in part based on the calculated source data object distance and the data object option distance to a given anchor point. Generally, separate penalty scores are calculated for each anchor point for a given data object option, and penalty scores are calculated for each data object option. Thus, each data object option j may have a set of penalty scores $\{P_{ij}\}$ based on each anchor point i. The penalty scores may be calculated, based on a given anchor point, by subtracting the source data object distance from the data object option distance, and adding a normalization factor. Calculating the penalty scores may be described as follows:

$$P_{ij} = D_{Ai} - D_{Ti} + c \quad \text{(equation 1)}$$

where c is a normalization factor that is obtained as follows:

$$c = \begin{cases} 0, & \text{if } \forall j\, P_{ij} > 0 \\ |x|; x = \min_j(P_{ij}), & \text{else} \end{cases} \quad \text{(equation 2)}$$

The penalty scores for each data object option may be aggregated at 928. Generally, the set of penalty scores for the anchor points are aggregated together for a given data object option. Thus, each data object option may have a single score once the scores for the different anchor points are aggregated, which may be used to analyze the likelihood or probability that the data object option is a semantically equivalent mapping for the source data object. The penalty scores may be aggregated by averaging the penalty scores for different anchor points for a given data object. Averaging the penalty scores may be described as follows:

$$P_j = \frac{\sum_{i=1}^{|i|} P_{i_j}}{|i|} \quad \text{(equation 3)}$$

The aggregated scores calculated at 928 may be the probability scores as used in process 900 shown in FIG. 9A.

Example 11—Schema Alignment with One Anchor Point

FIGS. 10A-D are diagrams depicting an example process 1000 for mapping a data object from a source data model to a target data model using one anchor point.

Figure 10A:
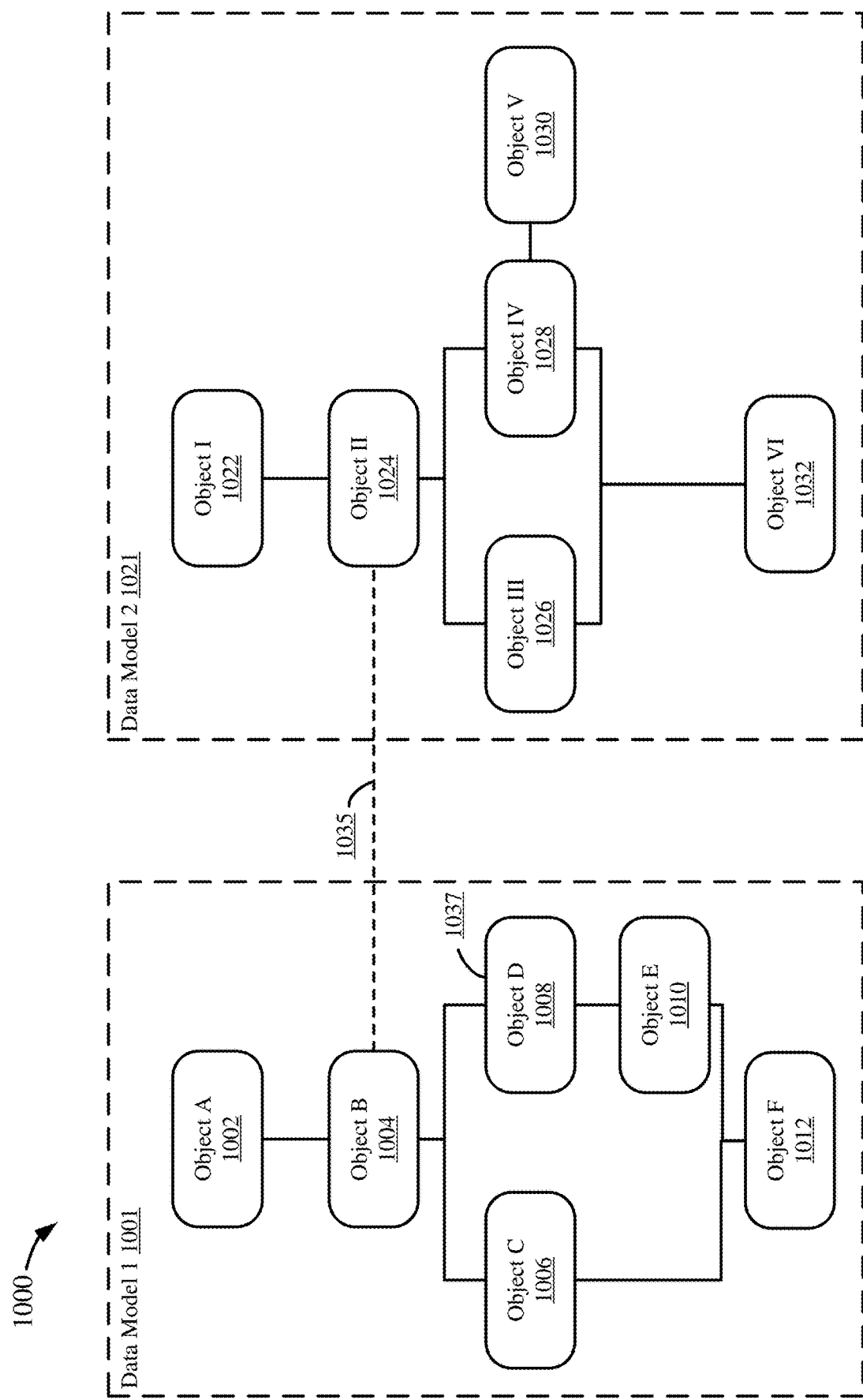
FIGS. 10A-D are diagrams depicting an example process for mapping a data object using one anchor point.

FIG. 10A illustrates the beginning of the example 1000 for data mapping, such as steps 902, 904, and 906 in process 900 shown in FIG. 9A. Data model 1 1001 may be a source data model or schema having data object A 1002, data object B 1004, data object C 1006, data object D 1008, data object E 1010, and data object F 1012, arranged as depicted. The data objects 1002, 1004, 1006, 1008, 1010, 1012 may be nodes in a representation, such as a graph representation, of data model 1 1001, and may represent underlying structural components of data model 1, such as database tables.

Similar to data model 1 1001, data model 2 1021 may be a target data model or schema having data object I 1022, data object II 1024, data object III 1026, data object IV 1028, data object V 1030, and data object VI 1032, arranged as depicted. The data objects 1022, 1024, 1026, 1028, 1030, 1032 may be nodes in a representation, such as a graph representation, of data model 2 1021, and may represent underlying structural components of data model 2, such as database tables.

For this example 1000, data model 1 1001 is being mapped to data model 2 1021 using a single anchor point 1035. Generally, data model 1 1001 and data model 2 1021 will be analyzed in the same representational format, such as a graph representation, but each may be analyzed in different formats, if so provided.

The anchor point 1035 has been identified, as described herein, between source object B 1004 and target object II 1024. Object D 1008 has been identified as the data object for mapping 1037 in the source data model 1 1001 to the target data model 2 1021.

Figure 10B:
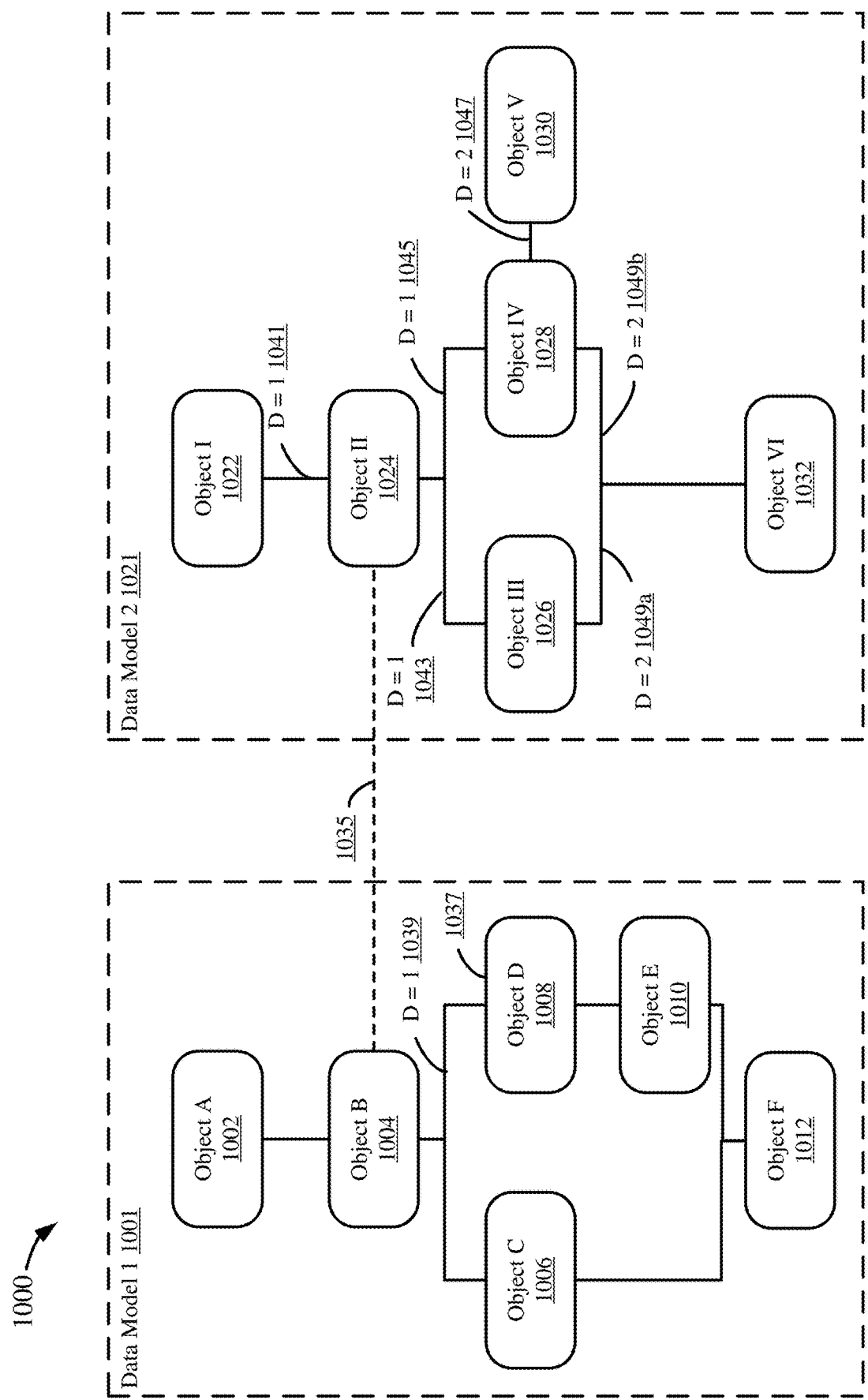

FIG. 10B continues the example 1000 for data mapping, illustrating the performance of such steps as 922 and 924 in process 920 shown in FIG. 9B. A source data object distance 1039 is calculated for the mapping data object 1037. The source data object distance 1039 is calculated as 1 (D=1) because the mapping data object 1037 is one link from the source data object, object B 1004, that is part of the anchor point 1035.

Distances are also calculated for the data object options in the target data model 2 1021. The data object options are all the data objects 1022, 1024, 1026, 1028, 1030, 1032 in the target data model 2 1021 except the data object, object II 1024, that is part of the anchor point 1035. In some embodiments, the anchor point data object II 1024 may be treated as a data object option as well. For example, a distance may be calculated for the anchor point from the several data object options to itself as an anchor point and any other anchor points, and penalty scores may be calculated based on these distances, and thus the anchor point may be ranked as an option along with the other data object options.

An object I distance 1041 is calculated as 1. An object III distance 1043 is calculated as 1. An object IV distance 1045 is calculated as 1. An object V distance 1047 is calculated as 2 because the anchor point object 1024 is two links away from object V 1030 (one link to object IV 1028 and one link to object II 1024). An object VI distance 1049*a-b* is calculated as 2, similar to object V 1030. There are two paths from object VI 1032 to the anchor point object 1024, one through object III 1026 with a distance 1049*a* of 2 and another through object IV 1028 with a distance 1049*b* of 2. Generally, the shortest distance is the distance used when calculating a data object's distance to an anchor point. In this example 1000 for object VI 1032, both distances 1049*a*, 1049*b* are the same and so which distance value is used does not matter.

Figure 10C:
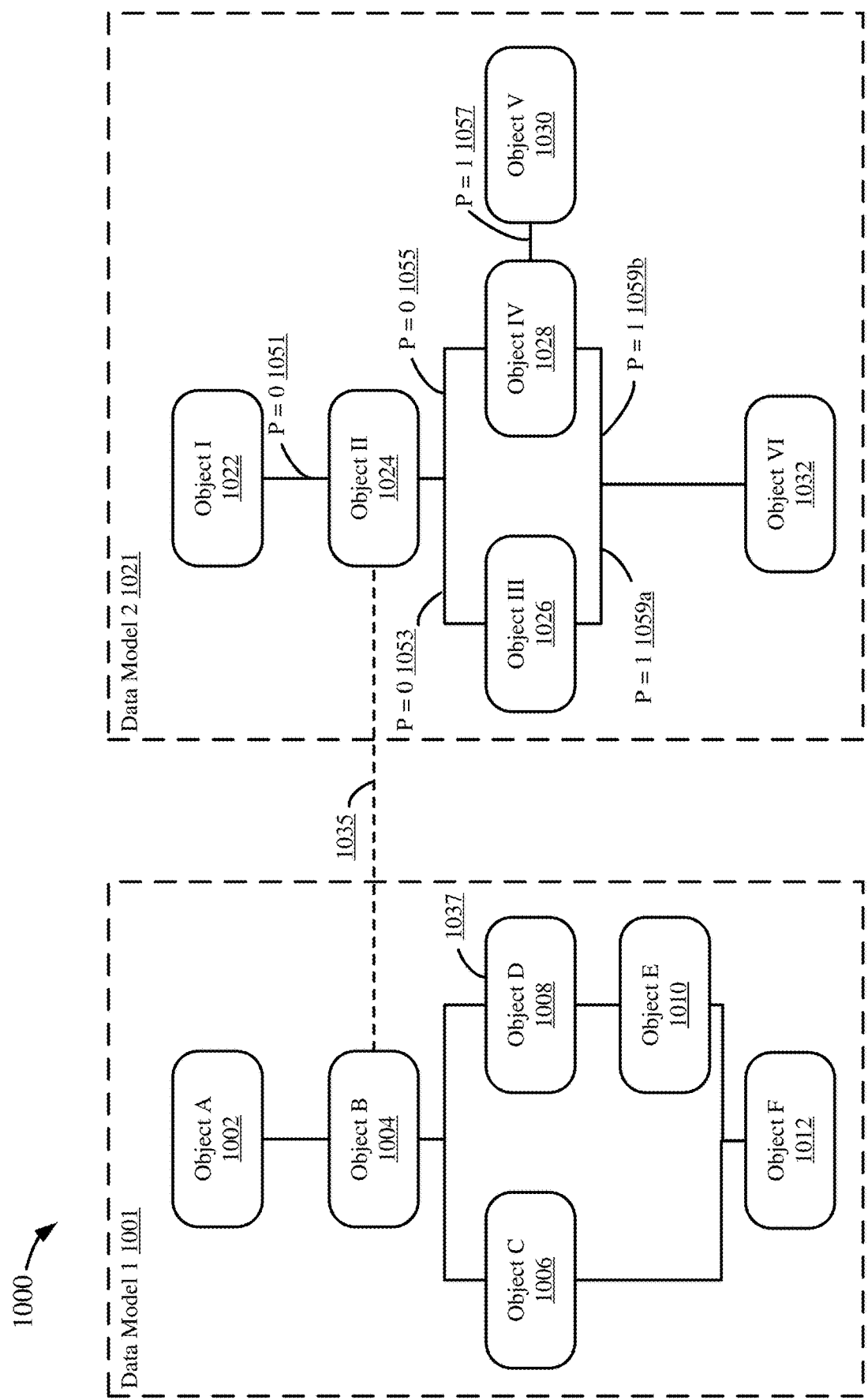

FIG. 10C continues the example 1000 for data mapping, illustrating such steps as 926 in process 920 shown in FIG. 9B. Penalty scores may be calculated for the data object options 1022, 1024, 1026, 1028, 1030, 1032 in the target data model 2 1021. The penalty scores may be calculated based on the distances 1039, 1041, 1043, 1045, 1047, 1049*a-b* previously determined and shown in FIG. 10B. The penalty scores may be calculated as described herein, by taking the applicable data object option distance 1041, 1043, 1045, 1047, 1049*a-b* and subtracting the source data object distance 1039, and adding a normalization factor (which is zero for this example 1000).

An object I penalty score 1051 is calculated as 0, based on the object I distance 1041 minus the source data object distance 1039, or 1−1=0. An object III penalty score 1053 is calculated as 0, based on the object III distance 1043 minus the source data object distance 1039, or 1−1=0. An object IV penalty score 1055 is calculated as 0, based on the object IV distance 1043 minus the source data object distance 1039, or 1−1=0. An object V penalty score 1057 is calculated as 1, based on the object V distance 1047 minus the source data object distance 1039, or 1−2=1. An object VI penalty score 1059*a-b* is calculated as 1, based on the object VI distance 1049*a* minus the source data object distance 1039, or 2−1=1 (or still 2−1=1 for the alternate distance 1049*b*).

The penalty scores 1051, 1053, 1055, 1057, 1059*a-b* are not aggregated in this example 1000 because there is only one anchor point 1035, and so only one penalty score is calculated for each data object option 1022, 1024, 1026, 1028, 1030, 1032.

Thus, object I 1022, object III 1026, and object IV 1028 have penalty scores of 0, while object V 1030 and object VI 1032 have penalty scores of 1. The objects may be sorted or ranked based on these penalty scores 1051, 1053, 1055, 1057, 1059*a-b*, and may be provided for selection of a data object option for mapping to the source mapping object 1037, as described herein. The penalty scores 1051, 1053, 1055, 1057, 1059*a-b* may be used as ranking values themselves, or they may be converted into a final ranking number, such as converting the scores to all be above zero (e.g. starting their rankings at 1). At least in general, objects with the lowest penalty score are more highly ranked (e.g. better candidates for mapping) than objects with higher penalty scores.

Figure 10D:
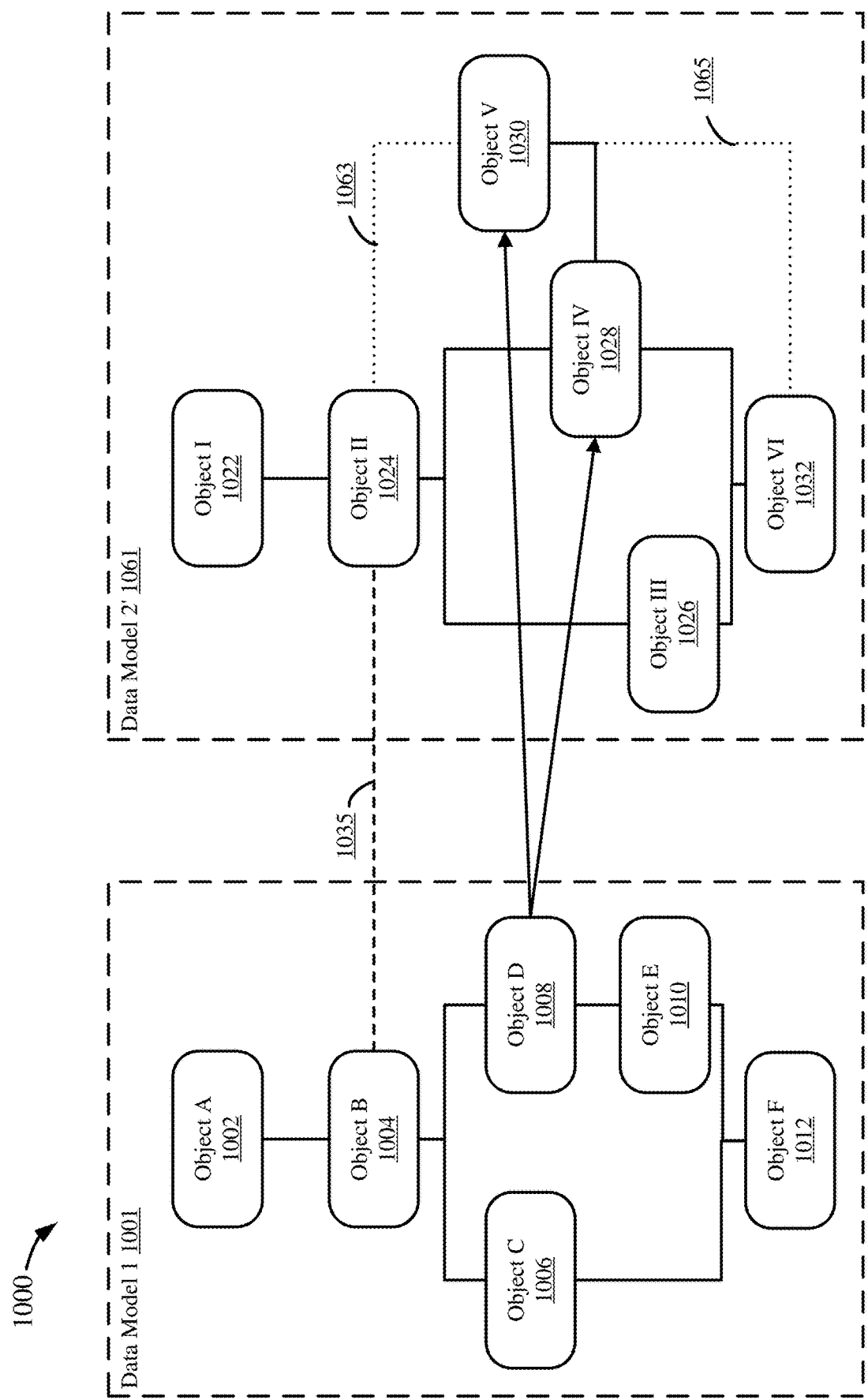

FIG. 10D ends the example 1000 for data mapping, illustrating such steps as 912 and 916 in process 900 shown in FIG. 9A. For this example, object D 1008 is mapped to object IV 1028 and object V 1030 in the target data model 2 1021, based on a selection made from the data object options and their penalty scores as shown in FIGS. 10A-C. The mapping selection may be made by a user, by one or more rules in a rule set for the data object options, or by another process, such as a heuristic or machine-learning algorithm.

Data model 2 1021 may be transformed to data model 2' 1061 based on the determined mapping for object D 1008. Transforming the data model 2 1021 may include creating additional links or relationships between data objects or nodes that match or mirror links in the other data model, data model 1 1001. Creating a link may include adding to a data object an additional link field or value to a link field with the identifier for the linked data object, and vice versa so the link is bidirectional (but, for example, could be between different elements of the data objects, such as having unidirectional links between two different pairs of attributes in a pair of mapped tables).

A link 1063 may be created between object II 1024 and object V 1030. This new link 1063 makes newly-napped object V 1030 the same distance (1) from the anchor point object 1024 as its mapped object D 1008 is from its anchor point object 1004.

A link 1065 may also be created between object VI 1032 and object V 1030. This new link 1065 gives newly-mapped object IV 1028 a same distance (2) from object VI 1032 as its mapped object D 1008 is from object F 1012.

Based on the new links 1063, 1065, data model 2' 1061 more closely resembles, or is more closely aligned with, data model 1 1001. Further data mapping, such as mapping object C 1006 may be more accurate based on the transformed data model 2' 1061.

Example 12—Schema Alignment with Two Anchor Points

FIGS. 11A-D are diagrams depicting an example process 1100 for mapping a data object from a source data model to a target data model using two anchor points. The process 1100 could represent further processing of the process 1000 of Example 11, once additional anchor points have been obtained. Although the process 1100 is described with respect to two anchor points, the process 1100 can be carried out for a larger number of anchor points.

Figure 11A:
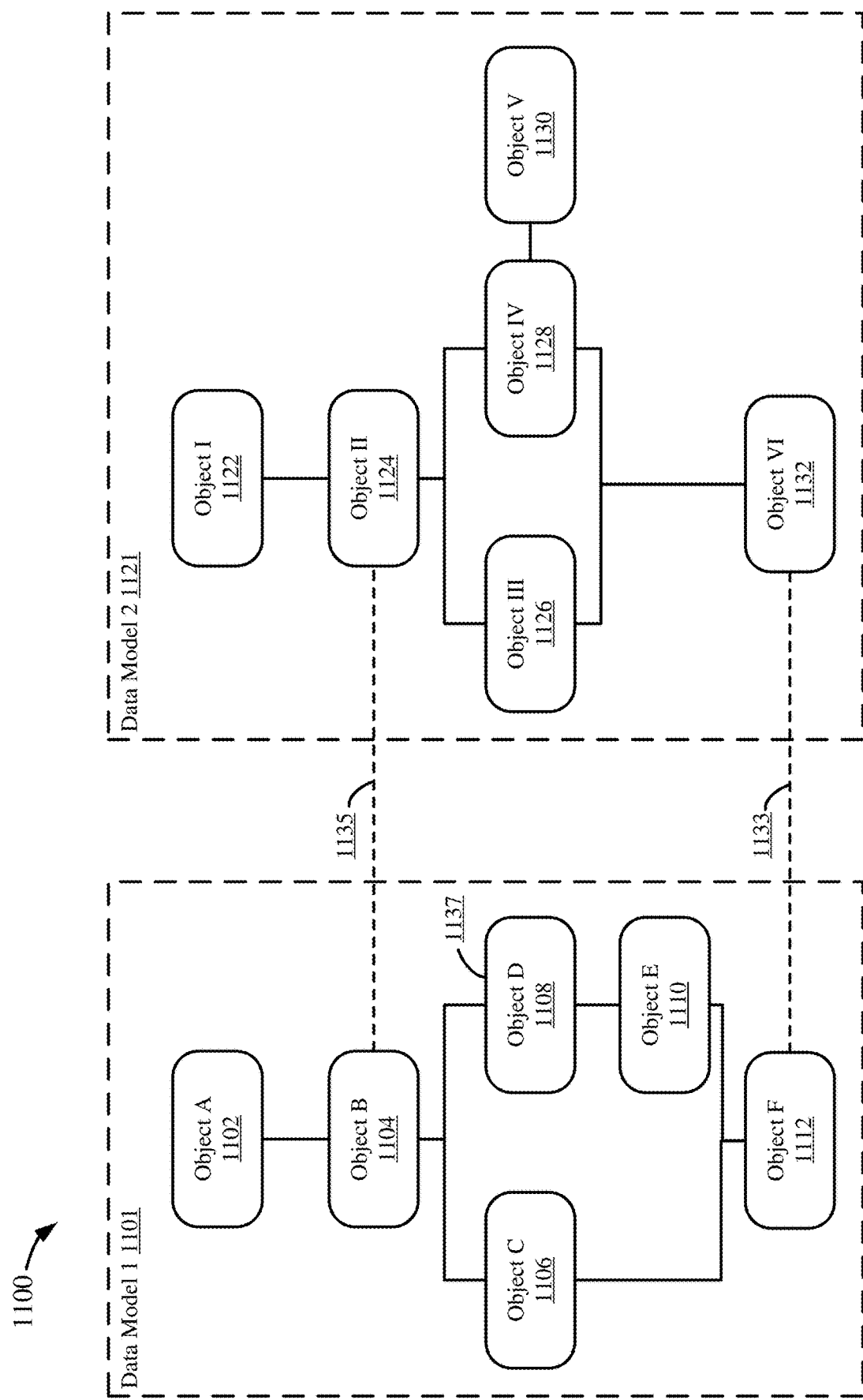
FIGS. 11A-D are diagrams depicting an example process for mapping a data object using two anchor points.

FIG. 11A illustrates the beginning of the example 1100 for data mapping, such as the performance of steps 902, 904, and 906 in process 900 shown in FIG. 9A. Data model 1 1101 may be a source data model or schema having data object A 1102, data object B 1104, data object C 1106, data object D 1108, data object E 1110, and data object F 1112, arranged as depicted. The data objects 1102, 1104, 1106, 1108, 1110, 1112 may be nodes in a representation, such as a graph representation, of data model 1 1101, and may represent underlying structural components of data model 1, such as database tables.

Similar to data model 1 1101, data model 2 1121 may be a target data model or schema having data object I 1122, data object II 1124, data object III 1126, data object IV 1128, data object V 1130, and data object VI 1132, arranged as depicted. The data objects 1122, 1124, 1126, 1128, 1130, 1132 may be nodes in a representation, such as a graph representation, of data model 2 1121, and may represent underlying structural components of data model 2, such as database tables.

For this example, 1100, data model 1 1101 is being mapped to data model 2 1121 using two anchor points 1135, 1133. Generally, data model 1 1101 and data model 2 1121 will be analyzed in the same representational format, such as a graph representation, but each may be analyzed in different formats, if so provided.

The first anchor point 1135 has been identified, as described herein, between source object B 1104 and target object II 1124. The second anchor point 1133 has been identified, as described herein, between source object F 1112 and target object VI 1132. Object D 1108 has been identified as the data object for mapping 1137 in the source data model 1 1101 to the target data model 2 1121.

Figure 11B:
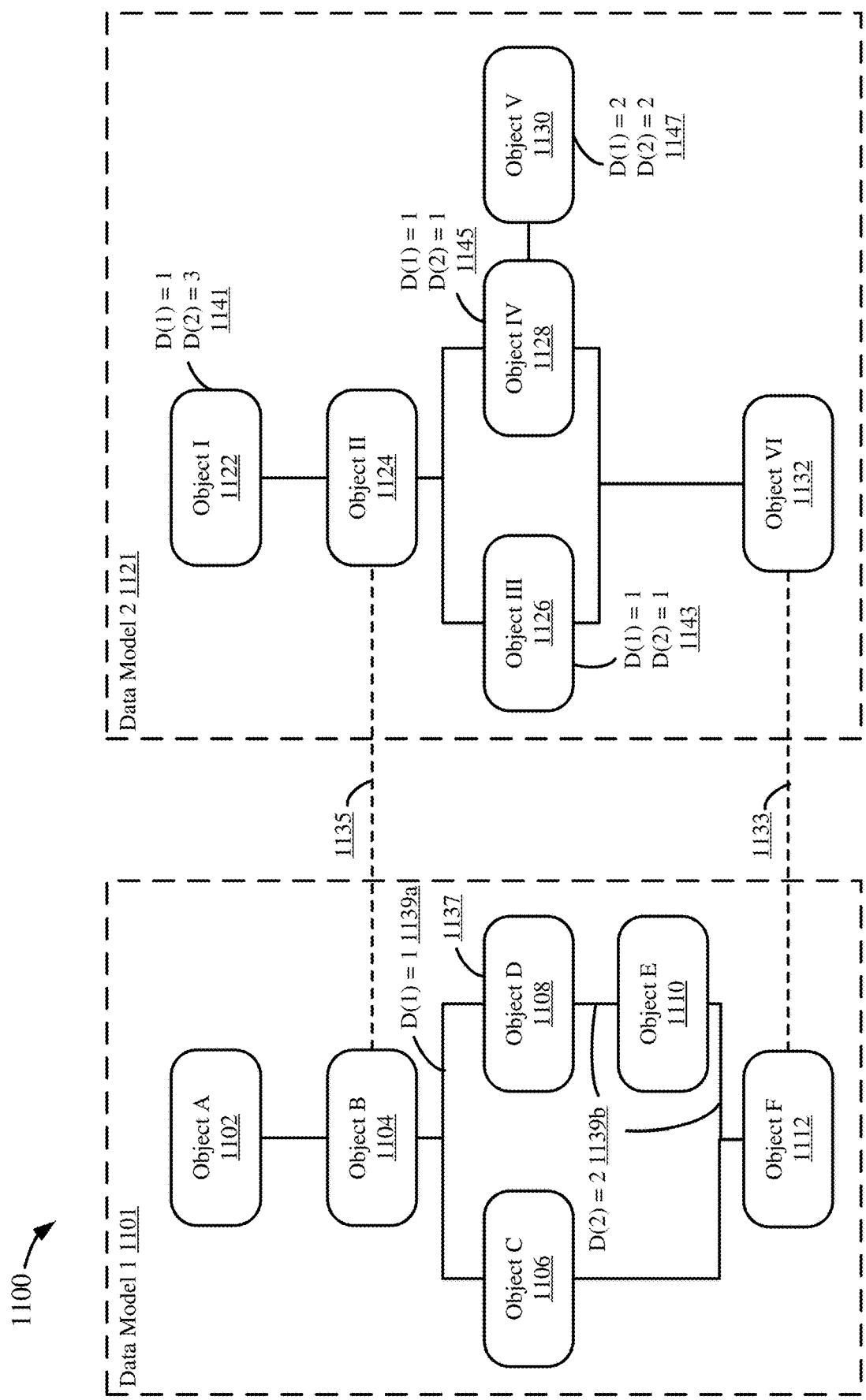

FIG. 11B continues the example 1100 for data mapping, illustrating the performance of such steps 922 and 924 in process 920 shown in FIG. 9B. A first source data object distance 1139a is calculated for the mapping data object 1137 to the first anchor point 1135. The first source data object distance 1139a is calculated as 1 (D(1)=1) because the mapping data object 1137 is one link from the source data object, object B 1104, that is part of the first anchor point 1135.

A second source data object distance 1139b is calculated for the mapping data object 1137 to the second anchor point 1133. The second source data object distance 1139b is calculated as 2 (D(2)=2) because the mapping data object 1137 is two links from the source data object, object F 1112, that is part of the second anchor point 1133.

Distances are also calculated for the data object options in the target data model 2 1121 for both of the anchor points 1135, 1133. The data object options are all the data objects 1122, 1124, 1126, 1128, 1130 in the target data model 2 1121 except the data objects, object II 1124 and object VI 1132, that are part of the anchor points 1135, 1133. In some embodiments, the anchor point data objects 1124, 1132 may be treated as data object options as well. Object I distances 1141 are calculated as 1 to the first anchor point 1135 (D(1)=1) and as 3 to the second anchor point 1133 (D(2)=3). Object III distances 1143 are calculated as 1 to the first anchor point 1135 (D(1)=1) and as 1 to the second anchor point 1133 (D(2)=1). Object IV distances 1145 are calculated as 1 to the first anchor point 1135 (D(1)=1) and as 1 to the second anchor point 1133 (D(2)=1). Object V distances 1147 are calculated as 2 to the first anchor point 1135 (D(1)=2), because the anchor point object 1124 is two links away from object V (one link to object IV 1128 and one link to object II 1124), and as 2 to the second anchor point 1133 (D(2)=2), for similar reasons. Generally, the shortest distance is the distance used when calculating a data object's distance to an anchor point.

Figure 11C:
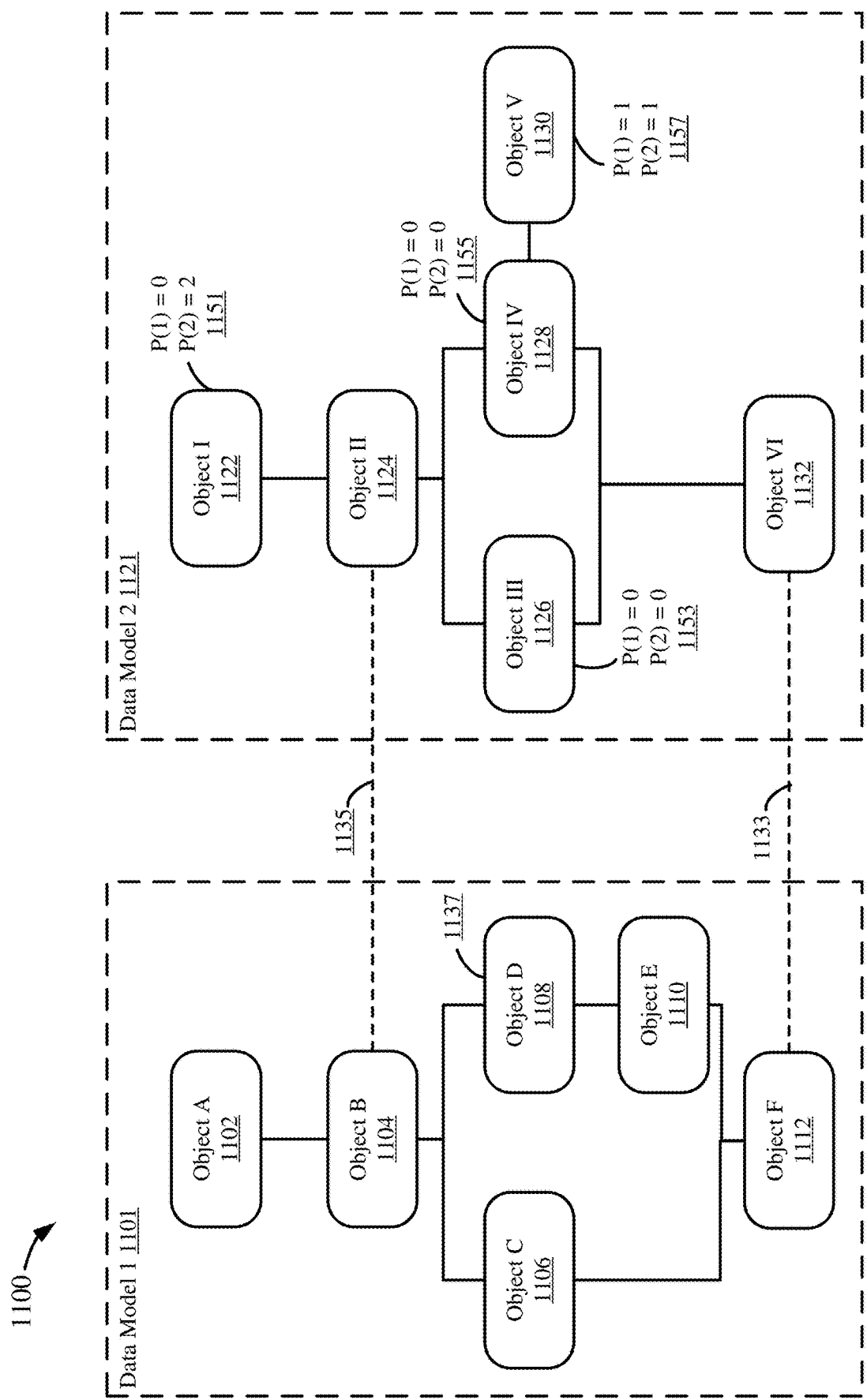

FIG. 11C continues the example 1100 for data mapping, illustrating such steps as 926 in process 920 shown in FIG. 9B. Penalty scores may be calculated for the data object options 1122, 1124, 1126, 1128, 1130 in the target data model 2 1121. The penalty scores may be calculated based on the distances 1139a-b, 1141, 1143, 1145, 1147, 1049 previously determined and shown in FIG. 10B. The penalty scores may be calculated as described herein, by taking the applicable data object option distance 1141, 1143, 1145, 1147 and subtracting the source data object distance 1139a-b, and adding a normalization factor (which is zero for this example 1100). A normalization factor may be used for large data models, where distances, and hence penalty scores, may be large. In such cases, a normalization factor may be useful to ensure that the penalty scores remain within a specific or known range, such as zero to one. A normalization factor may also be useful when comparing the results of schema alignment amongst may different data models, which may be very different and vary in size. In such cases, the normalization factor may be useful to make the results (e.g. penalty scores) comparable.

Object I penalty scores 1151 are calculated as 0 for the first anchor point 1135, based on the object I distance 1141 for the first anchor point minus the first source data object distance 1139a (1−1=0), and as 2 for the second anchor point 1133, based on the object I distance 1141 for the second anchor point minus the second source data object distance 1139b (3−1=2). Object III penalty scores 1153 are calculated as 0 for the first anchor point 1135, based on the object III distance 1143 for the first anchor point minus the first source data object distance 1139a (1−1=0), and as 0 for the second anchor point 1133, based on the object III distance 1143 for the second anchor point minus the second source data object distance 1139b (1−1=0). Object IV penalty scores 1155 are calculated as 0 for the first anchor point 1135, based on the object IV distance 1145 for the first anchor point minus the first source data object distance 1139a (1−1=0), and as 0 for the second anchor point 1133, based on the object IV distance 1145 for the second anchor point minus the second source data object distance 1139b (1−1=0). Object V penalty scores 1157 are calculated as 1 for the first anchor point 1135, based on the object V distance 1147 for the first anchor point minus the first source data object distance 1139a (2−1=1), and as 1 for the second anchor point 1133, based on the object V distance 1147 for the second anchor point minus the second source data object distance 1139b (2−1=1).

Figure 11D:
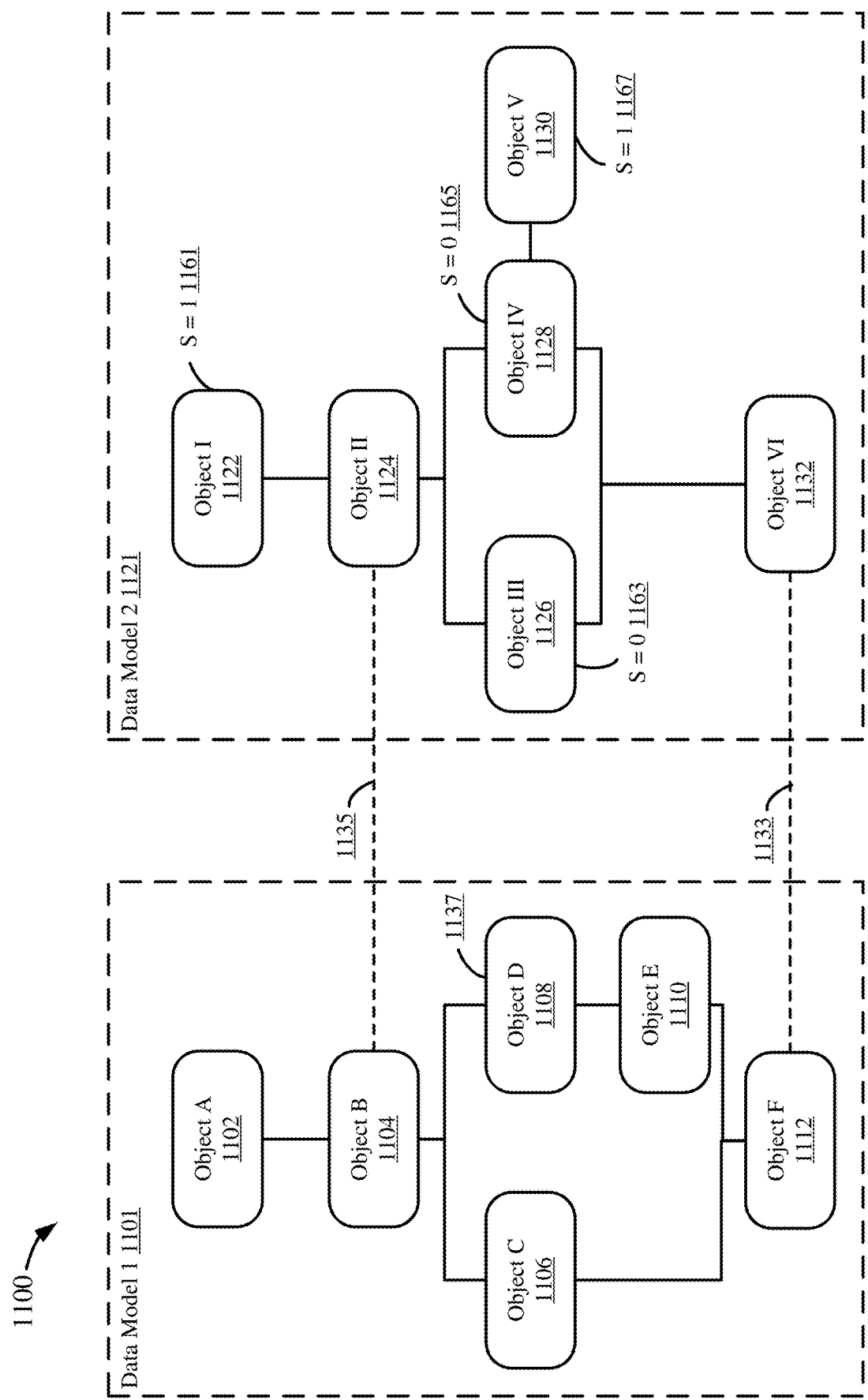

FIG. 11D ends the example 1000 for data mapping, illustrating steps such as 928 in process 920 shown in FIG. 9B. The penalty scores 1151, 1153, 1155, 1157 may be aggregated to form a single score (e.g. probability score) for the data object options 1122, 1126, 1128, 1130 in the target data model 2 1121. The penalty scores 1151, 1153, 1155, 1157 are aggregated for each data object option 1122, 1126, 1128, 1130, and generally not across different data objects. The penalty scores 1151, 1153, 1155, 1157 may be aggregated by averaging the penalty scores for a given data object option, as described herein, or by another aggregate algorithm or equation, such as a weighted average.

An object I score 1161 may be calculated as 1, based on the object I penalty scores 1151 of 0 and 2 averaged together ((0+2)/2=1). An object III score 1163 may be calculated as 0, based on the object III penalty scores 1153 of 0 and 0 averaged together ((0+0)/2=0). An object IV score 1165 may be calculated as 0, based on the object IV penalty scores 1155 of 0 and 0 averaged together ((0+0)/2=0). An object V score 1167 may be calculated as 1, based on the object V penalty scores 1157 of 1 and 1 averaged together ((1+1)/2=1).

Thus, object III 1126 and object IV 1128 have aggregated scores of 0 (e.g. final scores), while object I 1122 and object V 1130 have aggregated scores of 1 (e.g. final scores). The objects may be sorted or ranked based on these aggregated scores 1161, 1163, 1165, 1167, and may be provided for selection of a data object option for mapping to the source mapping object 1137, as described herein. The aggregated scores 1161, 1163, 1165, 1167 may be used as ranking values themselves, or they may be converted into a final ranking number, such as converting the scores to all be above zero (e.g. starting their rankings at 1).

Example 13—Schema Alignment Module Environments

Figure 12A:
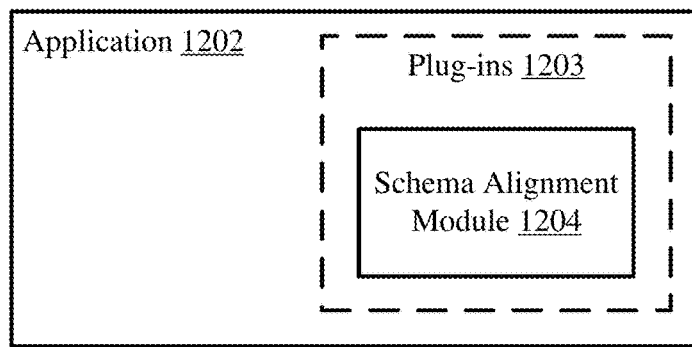
FIG. 12A is a schematic diagram depicting an application environment for a schema alignment module.

FIG. 12A is a schematic diagram depicting an application environment for a schema alignment module 1204, which may provide data model mapping and schema alignment functionality as described herein. An application 1202, such as a software application running in a computing environment, may have one or more plug-ins 1203 (or add-ins or other software extensions to programs) that add functionality to, or otherwise enhance, the application. The schema alignment module 1204 may be integrated with the application 1202; for example, the schema alignment module may be integrated as a plug-in. The schema alignment module 1204 may add functionality to the application 1202 for data model mapping and schema alignment, which may be displayed in a user interface or otherwise provided to a user. For example, the application 1202 may be a database or data modeling application, or a database management application, and the schema alignment module 1204 may be integrated with the database or data management application to provide data model mapping and schema alignment functionality.

Figure 12B:
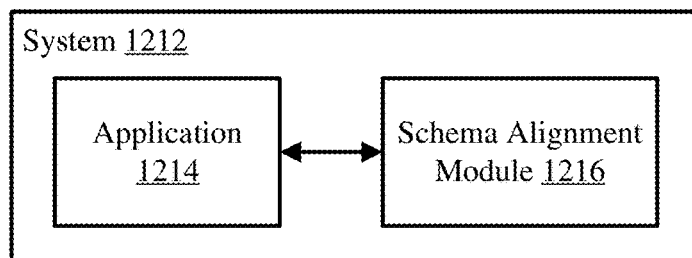
FIG. 12B is a schematic diagram depicting a system environment for a schema alignment module.

FIG. 12B is a schematic diagram depicting a system environment for a schema alignment module 1216, which may provide data model mapping and schema alignment functionality as described herein. The schema alignment module 1216 may be integrated with a computer system 1212. The computer system 1212 may include an operating system, or otherwise be a software platform, and the schema alignment module 1216 may be an application or service running in the operating system or platform, or the schema alignment module may be integrated within the operating system or platform as a service or functionality provided through the operating system or platform. The system 1212 may be a server or other networked computer or file system. Additionally, or alternatively, the schema alignment module 1216 may communicate with and provide data model mapping and schema alignment functionality, as described herein, to one or more applications 1214, such as database, data modeling, or database management applications, in the system 1212.

Figure 12C:
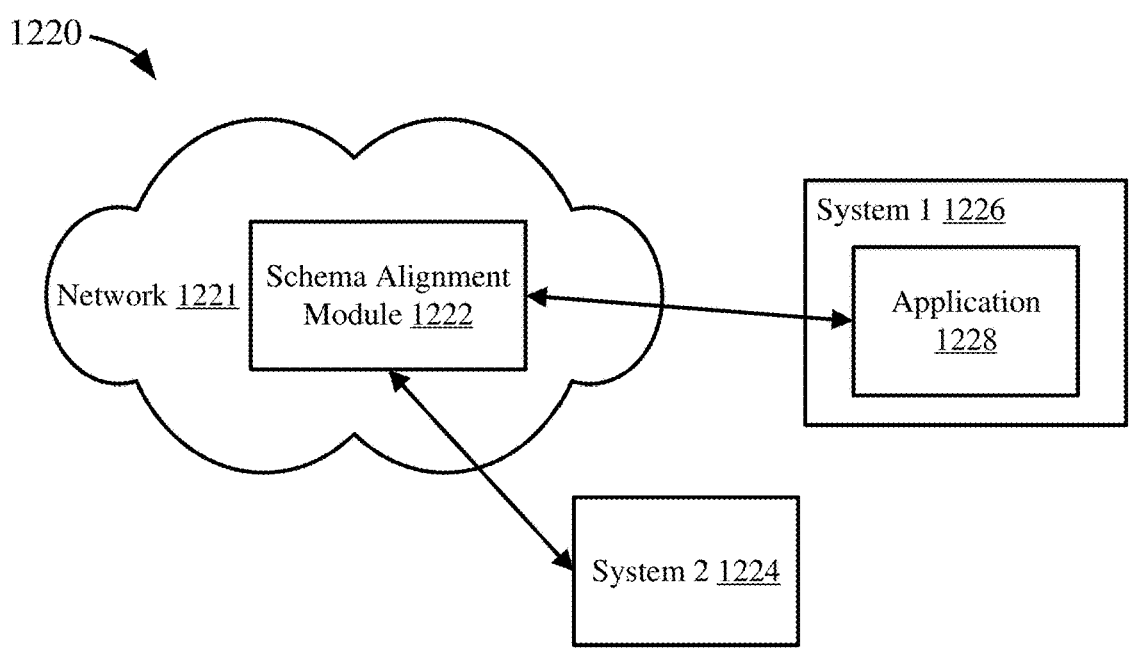
FIG. 12C is a schematic diagram depicting a network environment for a schema alignment module.

FIG. 12C is a schematic diagram depicting a network environment 1220 for a schema alignment module 1222, which may provide data model mapping and schema alignment functionality as described herein. The schema alignment module 1222 may be available on a network 1221, or integrated with a system (such as from FIG. 12B) on a network. Such a network 1221 may be a cloud network or a local network. The schema alignment module 1222 may be available as a service to other systems on the network 1221 or that have access to the network (e.g., may be on-demand software or SaaS). For example, system 2 1224 may be part of, or have access to, the network 1221, and so can utilize data model mapping and schema alignment functionality from the schema alignment module 1222. Additionally, system 1 1226, which may be part of or have access to the network 1221, may have one or more applications, such as application 1228, that may utilize data model mapping and schema alignment functionality from the schema alignment module 1222.

In these ways, the schema alignment module 1204, 1216, 1222 may be integrated into an application, a system, or a network, to provide data model mapping and schema alignment functionality as described herein.

Example 14—Example Conceptual and Physical Data Model Components

Figure 13:
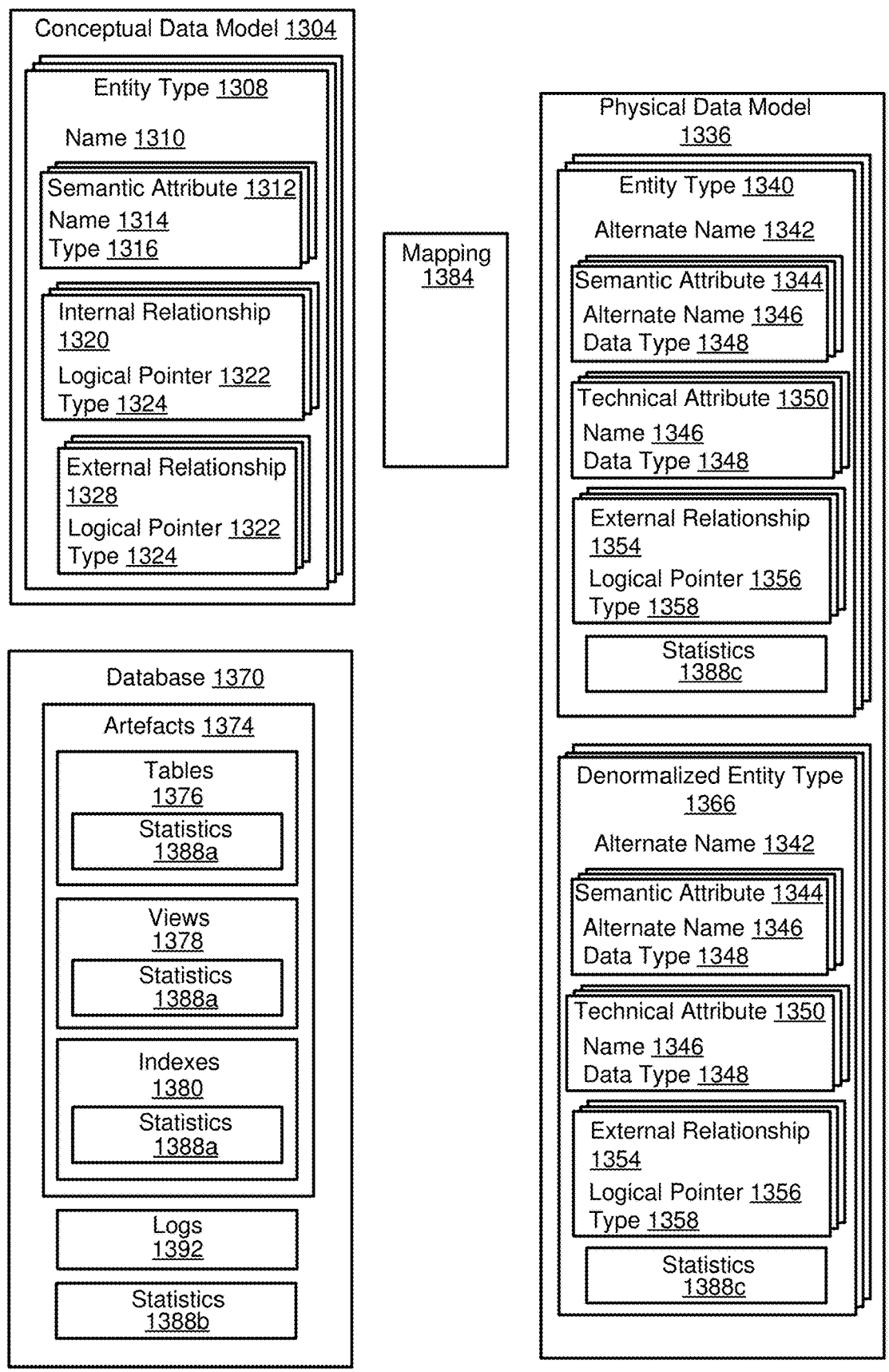
FIG. 13 is a diagram illustrating components of a conceptual data model and how they can have corresponding components in a physical data model or in a database system.

FIG. 13 illustrates components typically used in database design. A conceptual data model 1304 can include a plurality of entity types 1308 (e.g., for customers, materials, invoices, employees, etc.). Each entity type 1308 is associated with a name 1310, which in the conceptual data model 1304 is typically a semantically meaningful, easy to understand name. Each entity type 1308 includes one or more, and typically a plurality, of semantic attributes 1312. Semantic attributes 1312 include a name 1314, which is normally a semantically meaningful, easy to understand name, and a type 1316. The type 1316 can be a general type, such as number, character, date, or currency, and may or may not correspond to a data type that is used in a database table that corresponds to a given entity type 1308.

A given entity type 1308 can optionally be associated with one or more internal relationships 1320 or one or more external relationships 1328. As used herein, an internal relationship 1320 refers to a relationship between two entity types 1308 where the relationship is not present in a physical data model representation of a given entity type, or in corresponding database artifacts. Example internal relationships 1320 include inheritance, header/item relationships, and one-to-one cardinality relationships. In at least some examples, entity types 1308 having internal relationships 1320 are denormalized in generating an entity type in a physical data model or a table in a database.

An internal relationship 1320 is associated with one or more logical pointers 1322 to related entity types 1308 (or, in some cases, other types of schema elements of a conceptual data model 1304). An internal relationship 1320 may also be associated with a type 1324, which can identify a given internal relationship as an inheritance relationship, a header/item relationship, etc.

As used herein, an external relationship 1328 refers to a relationship between two entity types 1308 where the entity types remain distinct in a physical data model/are represented by different database artifacts. Typically, entity types 1308 related by external relationships 1328 are more semantically different than entity types related by internal relationships 1320. Examples of external relationships 1328 include foreign key relationships (or joins) and associations. Like internal relationships 1320, external relationships 1328 include one or more logical pointers 1322 to related entity types 1308 and optionally include a type 1324 for the relationship (e.g., foreign key or association).

The conceptual data model 1304 have a corresponding physical data model 1336. The physical data model 1336 can have entity types 1340 that correspond to a single entity type 1308 of the conceptual data model 1304. In many cases, a name 1342 for the entity type 1340 is an alternate name that is less semantically meaningful than the name 1310 of the corresponding entity type 1308 in the conceptual data model 1304. For example, in some database systems, names 1342 may assigned only a limited number of characters, such as four characters. Thus, in many cases it can be difficult to understand what data in an entity type 1340 represents just from the name 1342.

An entity type 1340 includes one or more (typically a plurality of) semantic attributes 1344, which correspond to the semantic attributes 1312 of the corresponding entity type 1308. However, as with the name 1342, a name 1346 for a semantic attribute 1344 is typically less obviously meaningful than the name 1314 of the corresponding semantic attribute 1312. As the physical data model 1336 is typically useable to generate database artifacts, the semantic attributes 1344 can be associated with a data type 1348. The data type 1348 can be a data type that is useable in a software environment used to implement a database, such as being a string having a defined maximum number of characters, an integer, a specific date format, a decimal value having a defined number of digits before and after a decimal point, etc.

An entity type 1340 can also include technical attributes 1350. Technical attributes 1350 can be useful in implementing a database system, but may not relate to a property of an analog world item that is modelled by a corresponding entity type 1308. Examples of technical attributes 1350 can include fields used for data governance purposes, such as identifying a source system or particular users or processes that are authorized to change data in a particular entity type 1340, or a timestamp indicating a date that a record for the entity type was last modified. The technical attributes 1350 can include names 1346 and data types 1348

An entity type 1340 can be associated with one or more external relationships 1354. The external relationships 1354 can include one or more logical pointers 1356 and a type 1358. The external relationships 1354, logical pointers 1356, and type 1358 can be at least generally similar to the external relationships 1328, logical pointers 1322, and types 1324 of the conceptual data model 1304. However, the values (or data type or other implementation details) of the logical pointers 1322 or types 1324 can be different for the entity type 1340 than for an entity type 1308 of the conceptual data model 1304. For example, a value assigned to a logical pointer 1322 of an entity type 1340 can be a name 1342 or a name 1346 rather than a name 1310 or a name 1314.

The physical data model 1336 can include modified entity types, shown in FIG. 13 as denormalized entity types 1366. In particular implementations, a denormalized entity type 1366 combines multiple entity types 1308 of the conceptual data model 1304. For example, a denormalized entity type 1366 can include some or all of the entities 1308 connected by internal relationships 1320.

A denormalized entity type 1366 can otherwise be similar to an entity type 1340, including a name 1342, semantic attributes 1344, technical attributes 1350, or external relationships 1354. The semantic attributes 1344 and external relationships 1354 can correspond to the semantic attributes 1312 and external relationships 1328 of the constituent entity types 1308 of an entity type 1340.

The conceptual data model 1304 can also be used to produce artifacts 1374 in a database system 1370. In some cases, the artifacts 1374 can be produced directly from the conceptual data model 1304. In other cases, the artifacts 1374 can be produced from a physical data model 1336 that was produced from a conceptual data model 1304. As shown, the artifacts include tables 1376, views 1378, and indexes 1380. Although not shown, the tables 1376, views 1378, and indexes 1380 can be related, and in some cases defined with respect to one another. For example, two or more tables 1376 can be related via foreign keys or associations. Views 1378 can be defined with respect to one or more tables 1376 or views. Indexes 1380 can be defined with respect to tables 1376 or views 1378.

A conceptual data model 1304 can be related to one or more physical data models 1336. In some cases, the relationship between a conceptual data model 1304 and a physical data model 1336 can be stored in a manner that allows one data model to be generated from the other, or at least for a given component of the data model (e.g., an entity or attribute). The relationship between a conceptual data model 1304 and a physical data model 1336 can be stored in a mapping 1384. A mapping 1384 can be implemented as a data structure, including a mapping table that creates an association between data model components that can be used by a computer. In some cases, the mapping 1384 can be manually created, such as by a user entering mapping information into a mapping table. In other cases, generation of the mapping 1384 can be automated, at least in part. In a particular example, the mapping techniques described in Examples 2-13 can be used to generate the mapping. In another example, the mapping techniques disclosed in U.S. patent application Ser. No. 16/780,481, filed Feb. 3, 2020, and entitled "AUTOMATIC CONVERSION OF DATA MODELS USING DATA MODEL ANNOTATIONS" (and incorporated by reference herein) can be used to automatically generate a physical data model 1136 from a suitably annotated conceptual data model 1304.

One or both of the database 1370 or the physical data model 1336 can include sources of statistics 1388 (shown as sources 1388a-1388c). The statistics 1388 can include metrics related to the properties of entity types 1340, 1366 of the physical data model and the corresponding data artifacts 1374. The statistics 1388 can include values for how large a database system is (e.g. how many records, attributes, unique attribute values, non-null attribute values). The statistics 1388 can also include information regarding how often data artifacts 1374 (and thus their corresponding entity types 1340, 1366 of the physical data model 1336) were accessed, as well as what type of access (e.g. read versus write) was made. Read or write statistics can be maintained on the basis of individual artifacts 1374 (e.g., how often a table 1376 was read from or written to) or can be maintained on a more granular basis, such as tracking read or write operations for particular records of particular tables 1376 (which, in turn could be used to calculate statistics for the artifacts 1374 that contain such elements).

The statistics 1388 can be maintained in one or more locations, such as having statistics 1388a stored on an artifact by artifact basis (which can include data for an entire artifact, as well as portions thereof, such as row access statistics), statistics 1388b stored for the database 1370 (but which also may be maintained on an artifact-by-artifact basis, or by elements of artifacts), or statistics 1388c stored in association with entity types 1340, 1366 of the physical data model 1336.

Statistics 1388 can be maintained in, or at least derived in part, from data maintained in one or more logs 1386 maintained by the database system 1370. For example, the database system 1370 can include logs 1392 that are used to provide ACID properties for the database, and can include logs such as transaction logs, commit logs, undo logs, or redo logs. Logs 1392 can also include logs that track queries that have been executed on the database 1370, and can be used, for example, to identify data artifacts (e.g., tables) or elements thereof (e.g., attributes or rows) that are accessed together.

Note that while in some cases statistics 1388 can be stored, in other cases information useable to calculate significance metric values, which can be the same as stored statistics, can be calculated on demand. For example, the number of records in a database table can be determined using SQL commands, such as "SELECT COUNT (*) FROM myTable;", where "myTable" is the table of interest. As will be further described, in some cases significance metric values are normalized based on the properties of a database system. For example, access statistics for a table might be normalized using the total number of tables on a database system or the total number of records in the database system. Typically, a database system will maintain information regarding tables in the system, such as in a table that stores information regarding tables in the database system. Assuming that the "tables" table stores such information, the number of tables in a database system can be obtained using the SQL statement "SELECT COUNT(*) FROM tables;".

Example 15—Example Corresponding Entities in Different Schemas

FIG. 14 illustrates how two systems can maintain at least a portion of the same data, but using a different schema. FIG. 14 illustrates a first table 1410 that corresponds to an entity in a first schema and a table 1414 that corresponds to the same entity in a second schema (for example, the entities may store data for the same analog-world object or data use for similar purposes). The first table 1410 has attributes 1420, shown as attributes 1420a-1420h. The second table 1414 has attributes 1424, shown as attributes 1424a-1424h.

It can be seen that the table 1414 contains most of the information in table 1420. However, the attributes 1424 have different names than the attributes 1410. In addition, other than the "name" attribute 1424a, the names of the attributes 1424 are not simple string variants of the corresponding attributes 1420 from table 1410, given that table 1410 is from an English-language database and table 1420 is from a database maintained in German. Thus, both selecting table 1414 as the corresponding entity for table 1410 from the entities in both schemas, and matching the attributes 1420 to the attributes 1424 may not be significantly facilitated using string comparison techniques, including blocking or candidate selection techniques that are string-based.

In this specific example, it can be seen that two attributes 1420a, 1420b of the table 1410 correspond to a single attribute 1424a of the table 1414. In addition, the information maintained in attribute 1424a is maintained in a slightly different format (initial of first name and full last name) than the information in the attributes 1420a, 1420b (full first name and full last name). Thus, while one task in comparing two database systems may be comparing entities to determine that table 1414 corresponds to table 1410 and then mapping attributes 1420 to attributes 1424, another task may be to determine whether the table 1414 includes records that correspond to records in the table 1410. A comparison task might, for example, result in identifying the row 1434 of table 1414 as corresponding to row 1432 of table 1410. Disclosed blocking techniques can be used in determining that tables 1410, 1414 correspond to one another, as well as determining attributes 1420, 1424 that correspond to one another, and whether individual records (or entity instances) correspond between two schemas (or systems that implement the schemas, such as actual tables in two database systems being compared).

Example 16—Example Schema Integration Process

Figure 15:
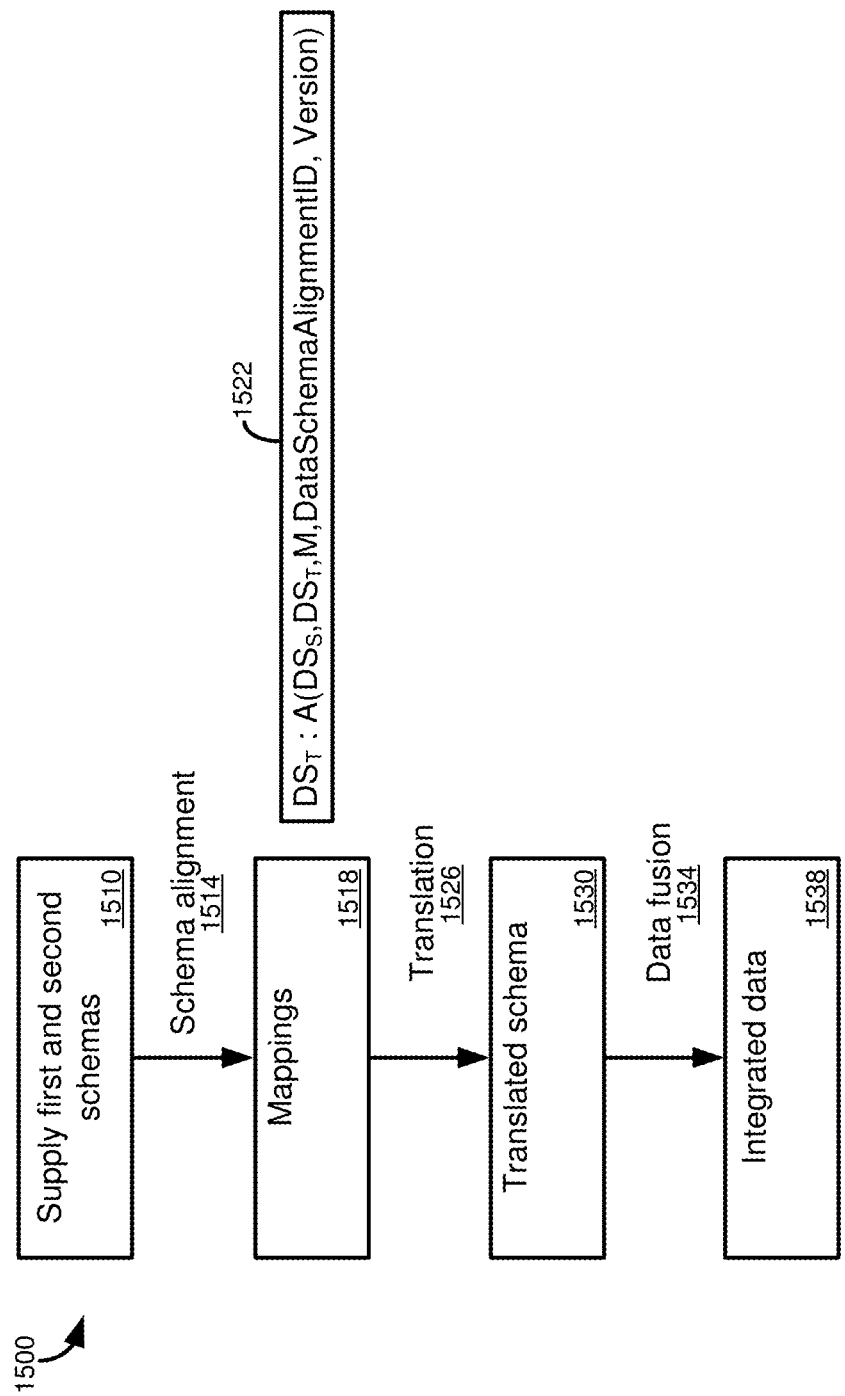
FIG. 15 illustrates a process for integrating data from two schemas.

FIG. 15 illustrates a general process 1500 for aligning two schema. The schema can be, for example, conceptual data models or physical data models. The two schema can be for two different database systems, or two versions of a single database system. In some cases, the present disclose provides entities (or attributes or records) as examples of how disclosed candidate selection techniques can be implemented. However, the techniques can be applied in an analogous manner to other types of elements. Generally, two sets of elements can be compared provided that the elements are of the same type, the elements serve the same general purpose in their respective sets, the use or importance of the elements is expected to be generally equivalent between sets, and measures are available provide a basis for comparing such use or importance.

First and second schemas are provided at 1510. A schema typically provides information regarding entities in the schema, relationships between the entities, and components (e.g., attributes) of the entities. A schema alignment process 1514 is carried out to produce a set of mappings 1518. The mappings 1518 can be part of a schema alignment 1522, which is a setting of mappings, M, between a source (or first) data schema, $DS_S$, and, a target data schema, $DS_T$). A given schema alignment 1522, and the mappings therein, are typically associated with a schema alignment version identifier. Providing a schema alignment version identifier can be useful, as one or both of the schemas being compared may change over time, and, even when the schemas are the same, the alignment results may change depending on how the alignment is carried out, including any blocking technique used.

Once the mapping 1518 has been carried out, data in the source schema can be translated into the format of the target schema using a translation process 1526 to provide a translated schema 1530. When data is transferred into the target schema, conflicts can arise, including duplicate records (e.g., records having the same key, where the rest of the data for the records can be the same or can be different). A data fusion or reconciliation process 1534 can be executed to provide integrated data 1538.

Disclosed techniques can generally find use in one or both of the schema alignment process 1514 or the data fusion process 1534. However, disclosed techniques are not required to be used with all of the steps of the process 1500. For example, a schema alignment process 1514 can be carried out using disclosed techniques without subsequently producing a translated schema 1530 or integrated data 1538.

Example 17—Example Candidate Selection Techniques Using Significance Metrics

Disclosed technologies provide blocking, or candidate selection, techniques that can be used to match an element of a first set of one or more elements to a second set of one or more elements. If the elements of two sets are related, such as representing the same entity type, attribute, or entity instance, the elements might be expected to have similar properties in each set. The present disclosure uses properties that can be referred to as similarity metrics, or importance metrics, that can be used to gauge the relative importance of an element within the set.

Using the example of database tables, if a table is particularly important in a particular process, that might be reflected in the table having many records. Or the importance might be reflected in the table being frequently read from or written to. When trying to find the counterpart element in another schema, it might be expected that the counterpart element would have a similar importance in its schema. So, assuming a first table in a first schema has many records and many reads, it may be more likely that a table in the second schema having a similar number of records and a similar number of reads would correspond to the first schema than a table in the second schema having few records and which is infrequently accessed.

Significance metrics can be for a single metric type. For example, a number of records, a number of reads, or a number of writes could be separate significance metrics. Significance metrics can also be included in combination in disclosed techniques. A composite significance metric might include a weighted combination of the number of records in an entity, a number of read operations on the entity, and a number of write operations on the entity.

When comparing two database systems, it is possible that the database systems may have different workloads, sizes, or other differences. Thus, it can be useful to consider significance metrics relative to a total value of the metrics on a given system, such as by using a normalized value for the metric (e.g., normalizing the metric such that the value is between 0 and 1). As an example, a first database system may be very large, and may include 100,000 records for a given table out of 1,000,000,000 records maintained in the system. Another database system may be smaller, and, for the equivalent table, may include 1,000 records out of 10,000,000 maintained on that system. When normalized, both systems would provide the same significance metric (i.e., 0.001) for their respective, equivalent tables. Any suitable normalization function can be used, such as standard score, students t-statistic, studentized residual, standardized moment, coefficient of variation, or min-max feature scaling.

When combinations of significance metrics are used, whether or not they are normalized, the combinations can include linear combinations, such as calculating an aggregated significance metric, $S_{agg}$. In a particular example, $S_{agg}$ can be calculated as:

$$S_{agg} = x*nr_n + y*nar_n + z*naw_n \text{ where } |x+y+z|=1$$

where $r_n$ is the number of records, $n_{ar}$ is the number of read access operations, and $n_{aw}$ is the number of write access operations, and x, y, and z are weighting coefficients.

The values of weighting coefficients can be selected in any desired manner. In some cases, assumptions can be made as to which individual significance metrics are most likely to be the same between two schemas being compared, and thus can change depending on how the schemas are used. It could be, for example, that number of write operations might be more relevant for a first target schema, while a number of records might be more relevant for a second target schema. The coefficients can be refined, including manually based on observations, or using statistical methods, such as a regression function. In a particular example, the regression function is the LASSO regression.

Weighting factors can also be set, or modified, based on known correlations between schemas, including correlations found using matching techniques that use disclosed blocking technologies. That is, if table A1 of a first schema is known to correlate with table A2 of a second schema, then the weighting factors can be adjusted to provide significant metric values for tables A1 and A2 that are closely related. Analyzing a series of such correlated tables can help provide weightings that may be particularly useful for tables whose correlations are not known.

FIG. 16 provides pseudocode 1600 for an example method of calculating significance metrics for first and second schemas. Two lists 1604, 1606 are defined, which store entities and their calculated significance metrics. The lists 1604, 1606 are populated by calls 1610, 1612 to a calculateImportance function, where the arguments for each call are the entities in the data model and the results are assigned to (i.e., stored in) the lists 1604, 1606. Any suitable calculateImportance function can be used, such a calculating the number of records in each entity, the number of write operations for each entity, the number of read operations for each entity, or combinations thereof. A calculateImportance function can include normalizing values for a set of elements.

Once the lists 1604, 1606 have been populated with values for the entities in their respective schemas, the lists can be sorted (either ascending or descending, provided that both lists are sorted in the same manner), as shown at lines 1620, 1622. However, some blocking techniques, such as a block by range technique that will be described, do not require sorted lists, and thus the sorting step can be omitted if not needed.

The sorted lists of significance metrics can be used to find candidates of one schema that may match a given entity of another schema. Generally, the position of an entity for which candidates are to be found in a list, or a significance value for that entity, can be used to identify candidates in the other schema. The present disclosure describes two specific techniques that can be used to find candidates. In a block by range approach, entities in a schema that have a significance metric within a defined range of values of the entity for which candidates are to be found are selected. In a block by window approach, a set (or maximum) number of candidates are returned, regardless of how close their significance vales may be to the entity to be matched. However, combinations of these approaches, modified versions of these approaches, or other approaches can be used. For example, a set number of candidates can be selected to be returned so long as their significance values are not more than a defined amount different from that of the input entity. Or, in a window-based approach, rather than taking an equal number of candidates on either side of an element of the target schema having the closest ignorance value to the input entity, entities with the closest scores can be selected, even if that results in a skewed window.

FIG. 17 presents pseudocode 1700 for a blockByRange method. The pseudocode 1700 returns a list 1710 of entities satisfying the blocking criteria, in this case entities in the target schema having a significance metric value within a defined range 1714 of significance value for an input entity 1718 in the source schema. The significance value for the input entity is obtained at 1722. Lower and upper bounds for the range are calculated at 1726, 1728 by dividing the range 1714 by two and adding the result to, or subtracting the result from, the significance vale obtained at 1722. At 1732, all entities are returned that fall within the upper and lower bounds.

Note that various changes could be made to the pseudocode 1700. For example, the range need not be evenly split between values above and below the value of the significance metric, and the range could even be solely above or solely below such value (which can be particularly useful for entities having significance values that place them particularly high or low on a list of entities sorted by significance value). The pseudocode 1700 can also be modified to specify whether results that are equal to one or both of the upper or lower bound are included in the results, or only results above the lower bound or below the lower bound. Rather than specifying a numerical value, the range could specify that results should be returned if they are within a set percentage (e.g., 10%) of the significance metric value for the input entity.

Figure 18:
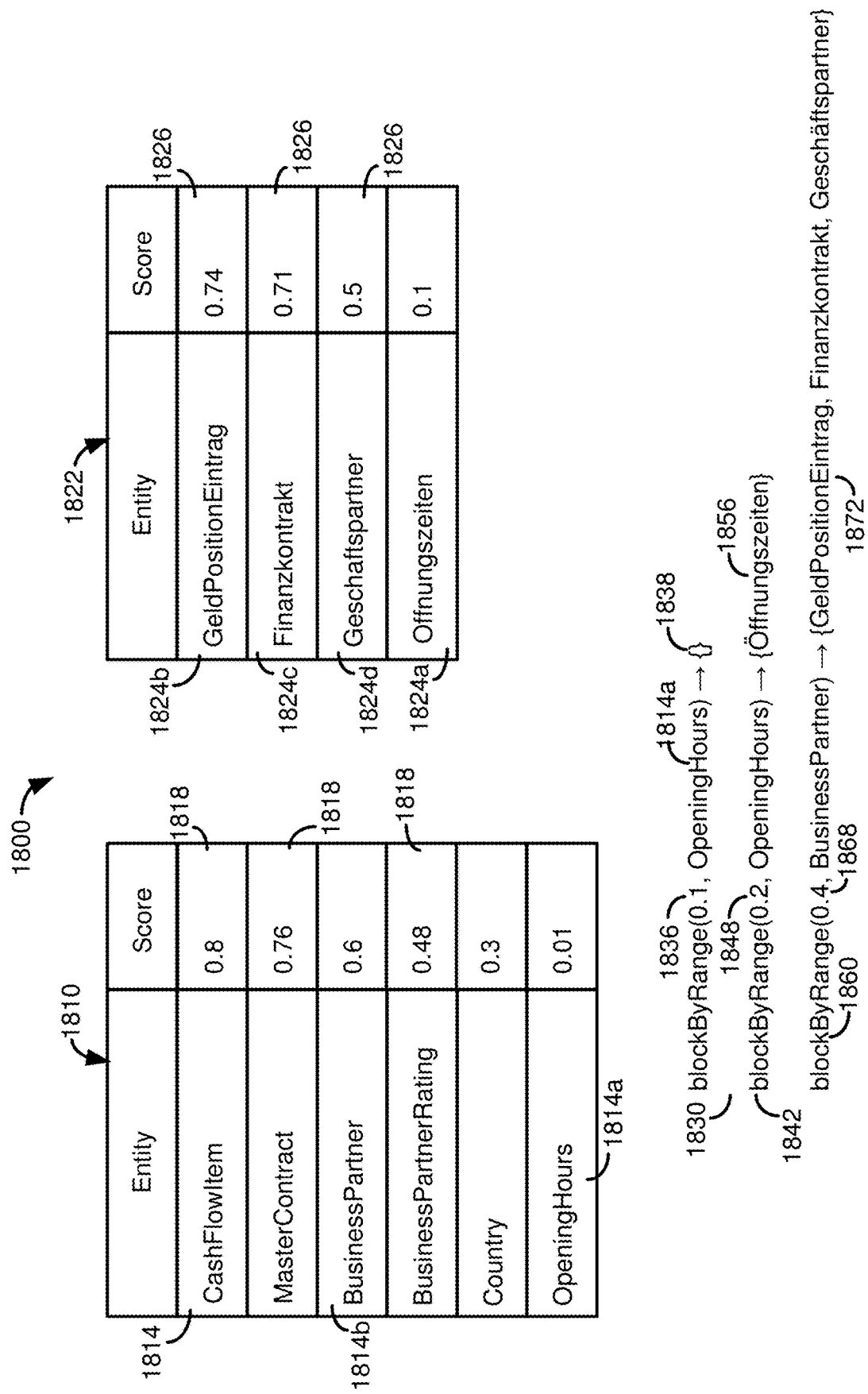
FIG. 18 is a diagram of an example scenario for requesting candidates using a blocking approach corresponding to the pseudocode of FIGS. 16 and 17.

FIG. 18 provides an example scenario 1800 demonstrating how the block by range method can be used to identify candidates of a second, target schema that may match a given (input) entity of a first, source schema. The scenario 1800 includes a list 1810 of entities 1814 in the first schema and their respective significance metric values 1818. The scenario 1800 also includes a list 1822 of entities 1824 (shown as entities 1824a-1824d) in the second schema and their respective significance metric values 1826.

A first candidate request 1830 is for candidates that may match the "OpeningHours" entity 1814a, and specifies a range 1836 of 0.1. According the pseudocode 1700, the range is divided in half and added to, and subtracted from, the significance metric value of the entity 1834. Given that the significance metric value for the entity 1814a is 0.01, an upper bound of 0.015 is defined and a lower bound of 0.005 is defined. The list 1822 is searched for entities having a significance value within those upper and lower bounds. It can be seen that no entities fall within these criteria, and thus an empty result set 1838 is returned.

A second candidate request 1842 also uses the entity 1814a as the input entity, but the range 1848 is specified as 0.2, which provides an upper bound of 0.11 and a lower bound of −0.09. It can be seen that entity 1852 has a significance metric of 0.1, which is within the upper and lower bounds, and that this is the only entity matching the search criteria. Thus, the entity 1824a is returned in a result set 1856.

A third candidate request 1860 uses the entity 1814b as the input entity, and specifies a range 1868 of 0.4, thus providing an upper bound of 0.8 and a lower bound of 0.4. Analyzing the list 1822, it can be seen that entities 1824b, 1824c, 1824d are included in a result set 1872.

The block by range algorithm can be useful, as it can return many candidates, if they exist, which are close in range to the significance metric value of the input entity. However, if no limit is placed on the number of results that are returned, few, or no, results can be returned, such as in the first candidate request 1830, or a large number of candidates may be returned, which may not adequately reduce the schema alignment processing time. Ideally, a value for the range should be selected that is sufficiently small to return a reasonable number of candidates, provided that the "true" match is a candidate returned in the result set.

FIG. 19 provides pseudocode 1900 for a blockByWindow method. The blockByWindow algorithm uses lists of entities sorted by significance values, where the significance values can be determined using the pseudocode 1600 of FIG. 16. The pseudocode 1900 returns a list 1910 of candidates for an input entity 1914 using a specified window size 1918. As shown at line 1922, in some cases, the pseudocode 1900 can specify a minimum window size (3, as shown), where the minimum window size is used if the specified window size 1918 is less than the minimum size. When the window size of three is used, the entity of the target schema having the significance value closest to the input entity will be selected as a candidate, as will the entities immediately above and below the that entity of the target schema in the sorted list of entities.

At line 1922, the pseudocode 1900 determines the position of the input entity in the sorted list of entities for the source schema. At line 1926, the pseudocode 1900 determines the relative position of the input entity in the sorted list by dividing the position of the input entity in the list by the size of the list (i.e., the number of entities in the list, which may be the number of entities in the source schema). At line 1930, the pseudocode 1900 finds the corresponding relative position in the target schema by taking the (rounded)

value of the product of the relative position of the first entity and the size of the second list of sorted entities in the target schema.

The entity at the corresponding relative position in the second list defines the center of the window. Upper and lower bounds of the window are determined at 1934, 1936 by calculating the (rounded) value of half of the window size and adding that to, or subtracting that from, the position serving as the center of the window. At 1940, a result set is returned that includes all of the entities within the upper and lower bounds, which therefore also returns the entity serving as the center of the window.

FIG. 20 provides an example scenario 2000 demonstrating how the block by window method can be used to identify candidates of a second, target schema that may match a given (input) entity of a first, source schema. The scenario 2000 includes a sorted list 2010 of entities 2014 in the first schema, their position 2022 in the list and their relative position 2026 in the list. The list 2010 can include significance metric values (individual values are not shown) 2018. However, in this implementation of the block by window method, the significance metric values need only be used to sort the list 2010.

The scenario 2000 also includes a list 2030 of entities 2034 in the second schema and their position 2036 in the list. As with the list 2010, the list 2030 can include significance metric values 2038 (individual values not shown). However, the list 2030 need not include the significant metric values 2038, as they are not used in this implementation of the block by window method, other than for sorting the list 2030.

FIG. 20 shows an example call 2040 to a block by window algorithm that specifies a window size 2044 and an input entity 2048. The algorithm determines that the input entity 2048 has a position of 5 and a relative position of 0.5. The center of the window in the list 2030 is calculated by multiplying the relative position, 0.5, by the number of entities in the list 2030, 6, to determine that position 3, entity 2052, of the list 2030 serves as the center of the window. The upper and lower bounds are then calculated by lines 1934, 1936 of the pseudocode 1900, which indicates that position 4 serves as the lower bound and position 2 serves as the upper bound. The result set is thus all of the entities between the upper and lower bounds, or entities 2054, 2052, 2056.

It can be seen that even in the simple example of the scenario 2000 the number of comparisons needed to match all of the entities in the list 2030 requires only half the calculations of typical comparison methods, which would take the Cartesian product of the list 2010 and the list 2030. That is, the Cartesian product requires 60 comparisons (for the 10 entities in the list 2010 and the 6 entities in the list 2030), while using the block by window method only 30 comparisons are needed (for the 10 entities in the list 2010, and 3 candidates for each entity selected from the list 2030).

Example 18—Example Process for Executing Blocking Requests

Figure 21:
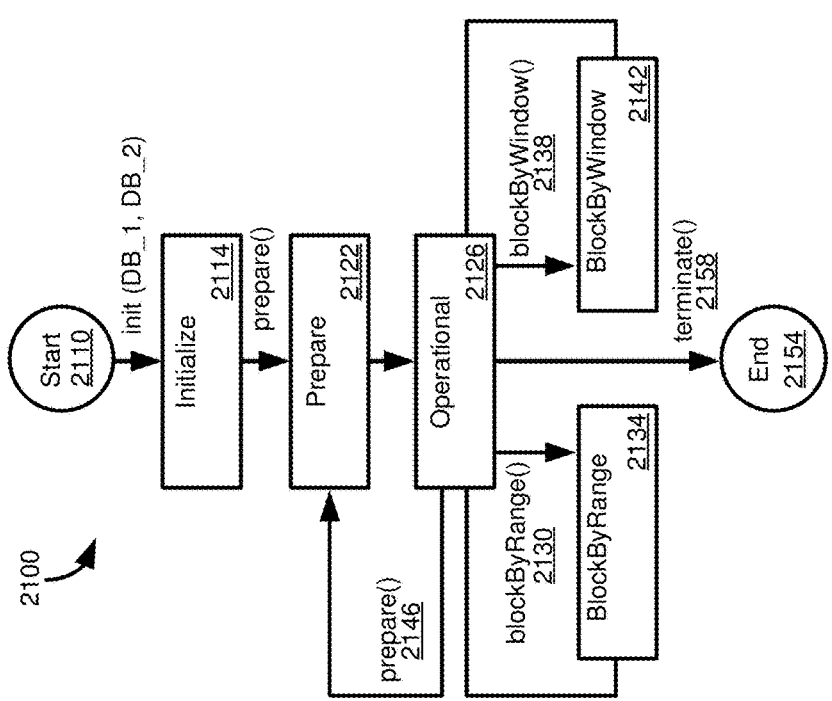
FIG. 21 is a diagram of an example process for preparing to process blocking requests and executing blocking requests using two techniques described in the present disclosure.

FIG. 21 is a flowchart of a single-threaded process 2100 for obtaining candidates for matching an input element with a set of target elements. The process 2100 begins at 2110. An initialization step 2114 is carried out to provide an initialized computing process 2100. The initialization step 2114 provides the process 2100 with access to the source schema, from which the input element is taken, and the target schema. In some cases, at least one data model is provided for one or both of the source schema and the target schema.

A prepare step 2122 provides a prepared process 2100. The prepare step 2122 can include calculating significance metric values for at least a portion of the elements in the source schema and at least a portion of the elements in the target schema. The calculated significance metric values can be maintained in memory for use in the process 2100, but can also, or alternatively, be stored permanently. At least in some cases, significance metric values may be consistent, or relatively consistent, over time. Changes in one or both of the source or target schemas, or new applications or uses of a database associated with a schema, may suggest that significance metric values be recalculated. In the case of changed schemas, recalculating significance metric values can account for new or removed elements, as well as any changes in significance metrics. In the case of changed use cases, the significance metric values may change as a result of the use, such as increasing or decreasing a number of records in a table or increasing or decreasing the number of read or write operations for a table or record.

The process 2100 is operational at 2126, where it is ready to process blocking requests. A blockByRange request 2130 is received, which causes a block by range process to be executed at 2134, and candidates to be returned in response to the request. The block by range process at 2134 can use the pseudocode 1700 of FIG. 17. After returning results, the process 2100 returns to 2126.

If, at 2126, a blockByWindow request 2138 is received, the process 2100 executes a block by window process at 2142, and candidates to be returned in response to the request. The block by window process 2142 can use the technique provided in the pseudocode 1900 of FIG. 19. After returning results, the process 2100 returns to 2126.

When the process 2100 is in an operational state at 2126, a prepare request 2146 can cause the process 2100 to return to 2122, where significance metric values can be recalculated. Optionally, the prepare request 2146 can cause the process 2100 to return to the initialization step 2114, or the prepare request 2146 can determine that the process 2100 should be reinitialized at 2114 (e.g., if a new data model is available, or a new schema is to be specified as the source or target schema).

The process 2100 can optionally end at 2154 in response to a termination request 2158.

Although shown as a single threaded process 2100, similar processes can be carried out in a multithreaded manner. For example, significance values can be calculated concurrently for multiple elements at 2122, or multiple blocking requests can be carried out at 2126.

Example 19—Example Blocking Service

Figure 22:
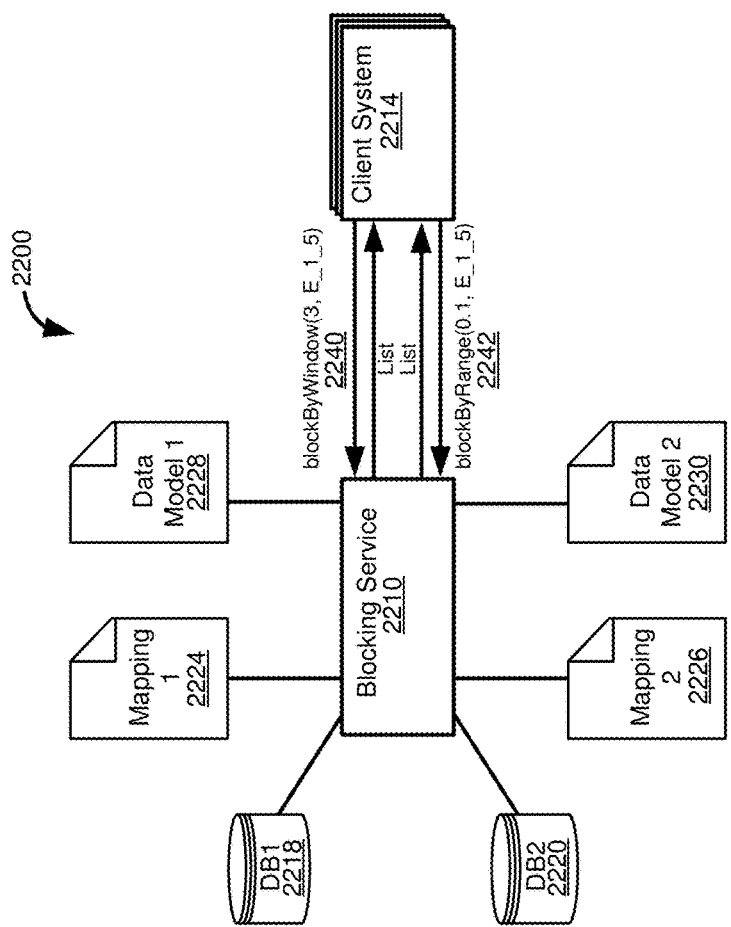
FIG. 22 is a schematic diagram of how blocking can be provided as a service to client systems.

A blocking or candidate selection process can be executed locally, or can be provided as a service, including as a cloud-based service or other remotely accessible service (e.g., using a client-server architecture). FIG. 22 provides an example computing environment 2200 the provides a blocking service 2210 that can be accessed by one or more client systems 2214.

The blocking service 2210 is provided with access to one or more databases 2218, 2220. Access can be provided, in some cases, using a protocol such as OData or JDBC (Java Database Connectivity). The databases 2218, 2220 can provide the blocking service 2210 with one or more types of elements (e.g., tables, views, indexes, records, attributes) for at least two sets of each element type to be used in processing blocking requests. The databases 2218, 2220 also provide values (e.g., number of records in an entity, read/ write access information) that can be used by the blocking service 2210 in calculating significance values. Although two databases 2218, 2220 are shown, the blocking service 2210 can operate with a single database or with more than two databases (provided that at least in some cases comparisons between element sets are made on a pairwise basis, that is, between two sets at a time).

The blocking service 2210 can optionally be provided with additional information for element sets associated with one or both of the databases 2218, 2220, and which can provide more accurate blocking results. For example, if any mappings 2224, 2226 between elements in different element sets are known, that information can be used to more accurately calculate significance values, such as weighting combinations of significance metrics such that results that are known to be correct are more accurately reproduced.

Data models 2228, 2230 can optionally be provided to the blocking service 2210. The data models 2228 can allow client systems 2214 to issue blocking requests 2240, 2242 using entity names in a physical or conceptual data model rather than provide entity names or paths, for example, When a user is able to request blocking information using elements of a conceptual data model, typically the data models 2228 or the mappings 2224 include information mapping the conceptual data model to a physical data model, or mapping the conceptual data model directly to tables in the databases 2218, 2220.

Example 20—Example Blocking Technique Using Significance Metrics

Figure 23:
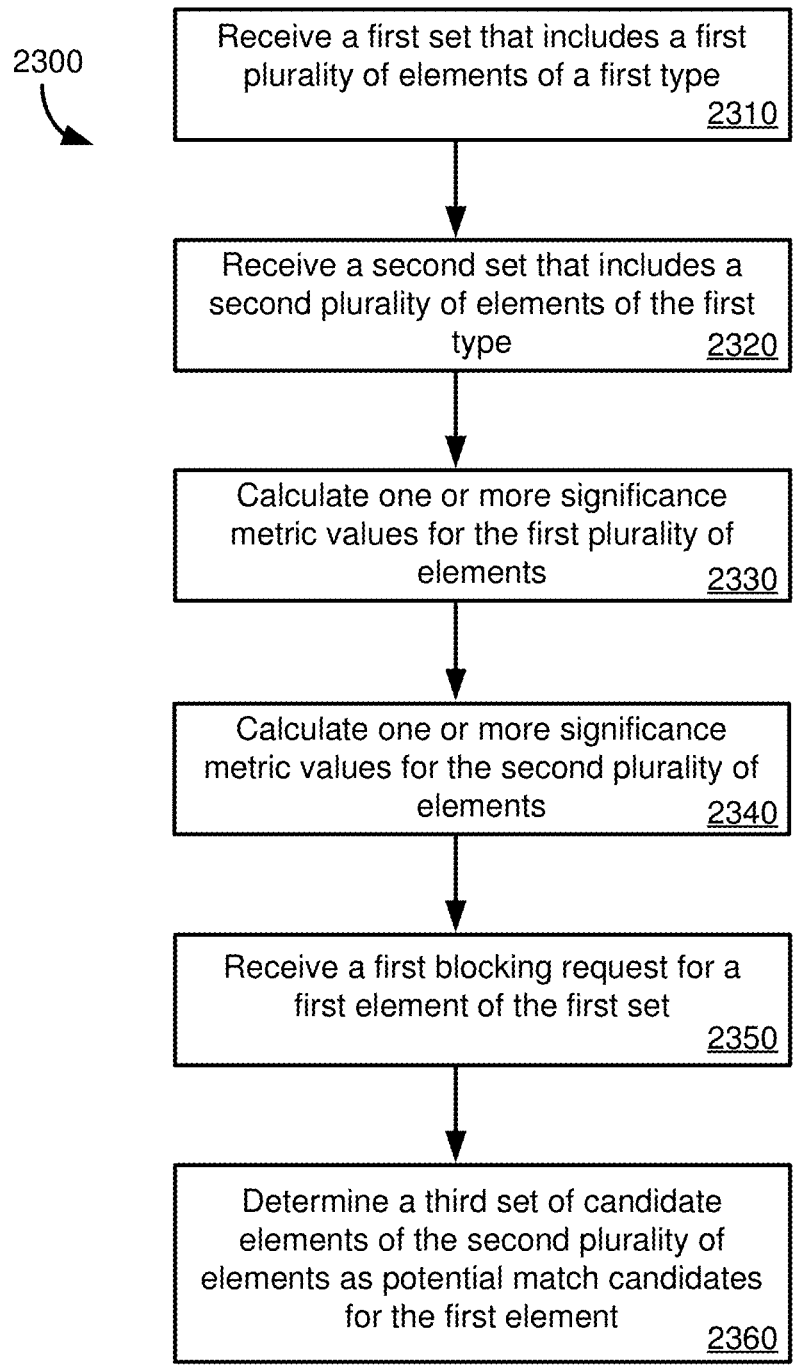
FIG. 23 is a flowchart of an example method for executing a blocking request.

FIG. 23 is a flowchart of an example method 2300 for executing a blocking request using significance value metrics. The method 2300 can implement at least a portion of the processes 1500 of FIG. 15 and 2100 of FIG. 21, and can use pseudocode 1600, 1700, 1900 provided in FIGS. 16, 17, and 19. The method 2300 can be carried out using the computing environment 2200 of FIG. 22.

At 2310, a first set is received, where the first set includes a first plurality of elements of a first type. A second set is received at 2320, where the second set includes a second plurality of elements of the first type. One or more significance metric values are calculated for the first plurality of elements at 2330. At 2340, one or more significance metric values are calculated for the second plurality of elements.

A first blocking request for a first element of the first set is received at 2350. At 2360, based at least in part on a significance metric value for the first element, a third set of candidate elements of the second plurality of elements is determined as potential match candidates for the first element, based at least in part on significance metric values for the second plurality of elements.

Example 21—Computing Systems

Figure 24:
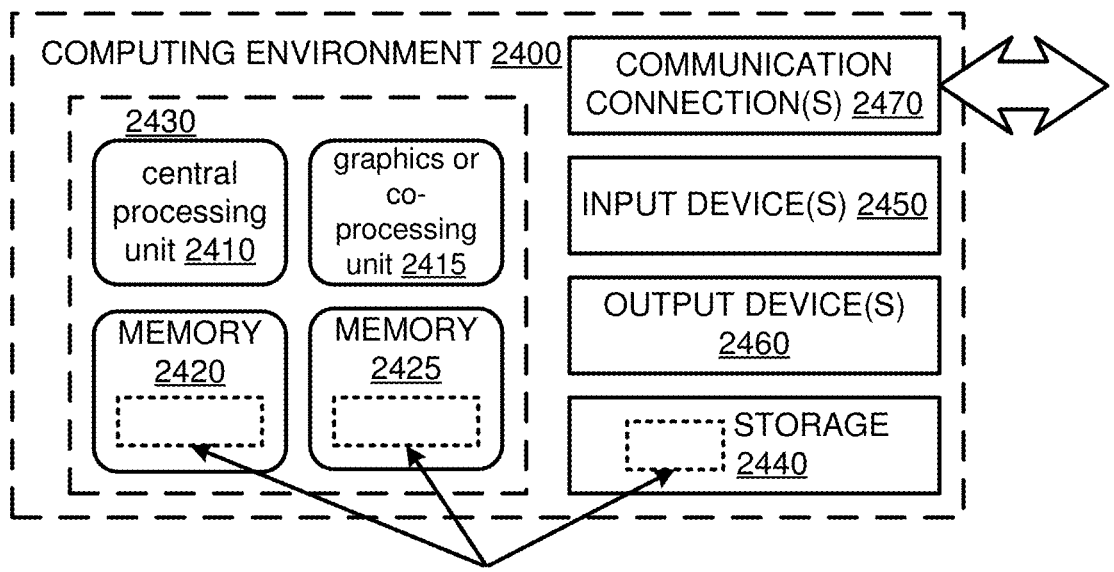
FIG. 24 is a diagram of an example computing system in which described embodiments can be implemented.

FIG. 24 depicts a generalized example of a suitable computing system 2400 in which the described innovations may be implemented. The computing system 2400 is not intended to suggest any limitation as to scope of use or functionality of the present disclosure, as the innovations may be implemented in diverse general-purpose or special-purpose computing systems.

With reference to FIG. 24, the computing system 2400 includes one or more processing units 2410, 2415 and memory 2420, 2425. In FIG. 24, this basic configuration 2430 is included within a dashed line. The processing units 2410, 2415 execute computer-executable instructions, such as for implementing components of the processes of Examples 1-20. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 may be volatile memory (e.g., registers, cache, RAM), non-volatile memory (e.g., ROM, EEPROM, flash memory, etc.), or some combination of the two, accessible by the processing unit(s) 2410, 2415. The memory 2420, 2425 stores software 2480 implementing one or more innovations described herein, in the form of computer-executable instructions suitable for execution by the processing unit(s) 2410, 2415.

A computing system 2400 may have additional features. For example, the computing system 2400 includes storage 2440, one or more input devices 2450, one or more output devices 2460, and one or more communication connections 2470. An interconnection mechanism (not shown) such as a bus, controller, or network interconnects the components of the computing system 2400. Typically, operating system software (not shown) provides an operating environment for other software executing in the computing system 2400, and coordinates activities of the components of the computing system 2400.

The tangible storage 2440 may be removable or non-removable, and includes magnetic disks, magnetic tapes or cassettes, CD-ROMs, DVDs, or any other medium which can be used to store information in a non-transitory way, and which can be accessed within the computing system 2400. The storage 2440 stores instructions for the software 2480 implementing one or more innovations described herein.

The input device(s) 2450 may be a touch input device such as a keyboard, mouse, pen, or trackball, a voice input device, a scanning device, or another device that provides input to the computing system 2400. The output device(s) 2460 may be a display, printer, speaker, CD-writer, or another device that provides output from the computing system 2400.

The communication connection(s) 2470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 22—Cloud Computing Environment

Figure 25:
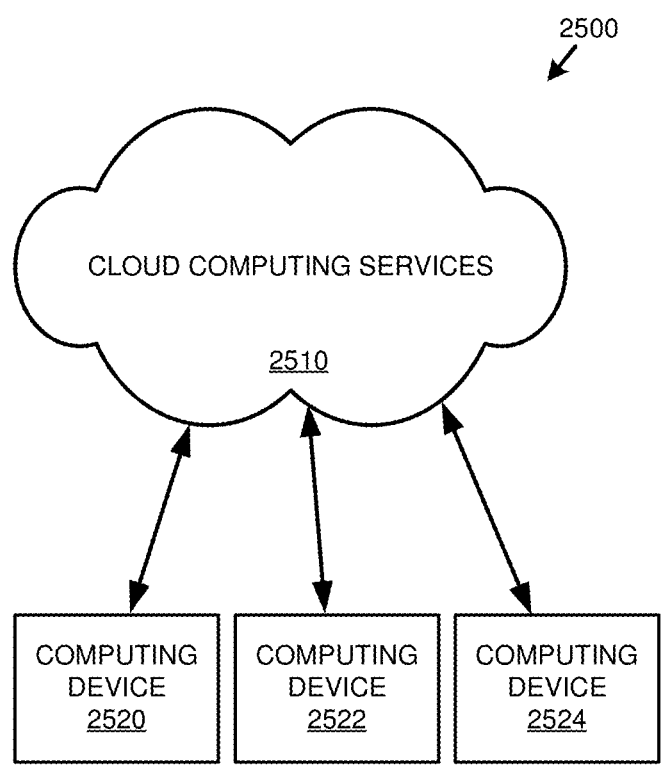
FIG. 25 is an example cloud computing environment that can be used in conjunction with the technologies described herein.

FIG. 25 depicts an example cloud computing environment 2500 in which the described technologies can be implemented. The cloud computing environment 2500 comprises cloud computing services 2510. The cloud computing services 2510 can comprise various types of cloud computing resources, such as computer servers, data storage repositories, networking resources, etc. The cloud computing services 2510 can be centrally located (e.g., provided by a data center of a business or organization) or distributed (e.g., provided by various computing resources located at different locations, such as different data centers and/or located in different cities or countries).

The cloud computing services 2510 are utilized by various types of computing devices (e.g., client computing devices), such as computing devices 2520, 2522, and 2524. For example, the computing devices (e.g., 2520, 2522, and 2524) can be computers (e.g., desktop or laptop computers), mobile devices (e.g., tablet computers or smart phones), or other types of computing devices. For example, the computing devices (e.g., 2520, 2522, and 2524) can utilize the cloud computing services 2510 to perform computing operations (e.g., data processing, data storage, and the like).

Example 23—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 24, computer-readable storage media include memory 2420 and 2425, and storage 2440. The term computer-readable storage media does not include signals and carrier waves. In addition, the term computer-readable storage media does not include communication connections (e.g., 2470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one memory;
at least one hardware processor coupled to the at least one memory; and
one or more computer readable storage media storing instructions that, when executed, cause the computing system to perform operations comprising:
receiving a first set, the first set comprising a first plurality of elements;
receiving a second set, the second set comprising a second plurality of elements;
calculating one or more significance metric values for respective elements of the first plurality of elements, wherein, for respective elements of the first plurality of elements, the significance metric value is calculated at least in part based on a degree to which a respective element of the first plurality of elements is used in a first computing context;
calculating one or more significance metric values for respective element of the second plurality of elements, wherein, for respective elements of the second plurality of elements, the significance metric value is calculated at least in part based on a degree to which a respective element of the second plurality of elements is used in a second computing context, wherein the second computing context differs at least in part from the first computing context;
receiving a first blocking request for at least a first element of the first set, wherein the first blocking request comprises a request to identify a subset of the second plurality of elements to be used in a comparison with the at least a first element;
based at least in part on a significance metric value for the at least a first element and significance metric values for at least a portion of the second plurality of elements, determining a third set of candidate elements of the second plurality of elements as potential match candidates for the at least a first element; and
(1) rendering for display on a user interface at least a portion of candidate elements of the third set of candidate elements of the second plurality of elements; or
(2) creating a schema mapping that maps the first element to a candidate element of the third set of candidate elements, wherein the schema mapping is useable to transfer data values for instances of the at least a first element to instances of the candidate element; or
(3) transferring data values of instances of the at least a first element to instances of the candidate element.

2. The computing system of claim 1, further comprising:
sorting the first plurality of elements based on significance metric values; and
sorting the second plurality of elements based on significance metric values.

3. The computing system of claim 1, further comprising:
normalizing significance values for the first plurality of elements; and
normalizing significance values for the second plurality of elements.

4. The computing system of claim 3, wherein normalizing significance values for the first plurality of elements and normalizing significance values for the second plurality of elements are based at least on part on database size.

5. The computing system of claim 4, wherein database size is calculated as a total number of records in a given database system.

6. The computing system of claim 1, wherein calculating one or more significance values comprising calculating an aggregate significance value from values for a plurality of significance metric value types.

7. The computing system of claim 6, wherein the aggregate significance value is calculated using a weighted combination of the significance metric value types.

8. The computing system of claim 7, wherein weightings for the weighted combination are determined based at least in part using a known correspondence between a first element of the first set and a second element of the second set.

9. The computing system of claim 1, wherein the first blocking request is a block by range request and comprises a range value to be used in determining the third set of candidate records.

10. The computing system of claim 1, wherein the first blocking request is a block by window request and comprises a window size to be used in determining the third set of candidate records.

11. A method, implemented in a computing system comprising at least one hardware processor and at least one memory coupled to the at least one hardware processor, the method comprising:
receiving a first set, the first set comprising a first plurality of elements of a first type;
receiving a second set, the second set comprising a second plurality of elements of the first type;
calculating one or more significance metric values for respective elements of the first plurality of elements, wherein, for respective elements of the first plurality of elements, the significance metric value is calculated at least in part based on a degree to which a respective element of the first plurality of elements is used in a computing context;
calculating one or more significance metric values for respective elements of the second plurality of elements, wherein, for respective elements of the second plurality of elements, the significance metric value is calculated at least in part based on a degree to which a respective element of the second plurality of elements is used in a computing context;
receiving a first blocking request for a first element of the first set, wherein the first blocking request comprises a request to identify a subset of the second plurality of elements to be used in a comparison with the first element; and
based at least in part on a significance metric value for the first element and significance metric values for at least a portion of the second plurality of elements, determining a third set of candidate elements of the second plurality of elements as potential match candidates for the first element; and
(1) rendering for display on a user interface at least a portion of candidate elements of the third set of candidate elements of the second plurality of elements; or
(2) creating a schema mapping that maps the first element to a candidate element of the third set of candidate elements, wherein the schema mapping is useable to transfer data values for instances of the first element to instances of the candidate element; or (3) transferring data values of instances of the first element to instances of the candidate element.

12. The computing system of claim 1, wherein the first plurality of elements and the second plurality of elements are of a first type.

13. The computing system of claim 12, wherein the first type is entities in a database system.

14. The computing system of claim 12, wherein the first type is attributes in a database system.

15. The computing system of claim 12, wherein the first type is records in a database system.

16. The computing system of claim 12, wherein the first type is entities in a database system and a significance value of the one or more significance metric values comprises a number of records in an entity.

17. The computing system of claim 12, wherein the first type is entities in a database system and a significance value of the one or more significance metric values comprises a number read accesses for an entity.

18. The computing system of claim 12, wherein the first type is entities in a database system and a significance value of the one or more significance metric values comprises a number write accesses for an entity.

19. The computing system of claim 12, wherein the first type is records in a database system and a significance value of the one or more significance metric values comprises a number read accesses for a record.

20. The computing system of claim 12, wherein the first type is records in a database system and a significance value of the one or more significance metric values comprises a number write accesses for a record.

21. The method of claim 11, further comprising:
sorting the first plurality of elements based on significance metric values; and
sorting the second plurality of elements based on significance metric values.

22. The method of claim 11, further comprising:
normalizing significance values for the first plurality of elements; and
normalizing significance values for the second plurality of elements.

23. The method of claim 11, wherein calculating one or more significance values comprising calculating an aggregate significance value from values for a plurality of significance metric value types.

24. The method of claim 11, wherein the first blocking request is a block by range request and comprises a range value to be used in determining the third set of candidate records.

25. The method of claim 11, wherein the first blocking request is a block by window request and comprises a window size to be used in determining the third set of candidate records.

26. One or more non-transitory computer-readable storage media comprising:
computer-executable instructions that, when executed by a computing system comprising at least one hardware processor and at least one memory coupled to the at least one hardware processor, cause the computing system to receive a first set, the first set comprising a first plurality of elements of a first type;
computer-executable instructions that, when executed, cause the computing system to receive a second set, the second set comprising a second plurality of elements of the first type;
computer-executable instructions that, when executed, cause the computing system to calculate one or more significance metric values for respective elements of first plurality of elements, wherein, for respective elements of the first plurality of elements, the significance metric value is calculated at least in part based on a degree to which a respective element of the first plurality of elements is used in a computing context;
computer-executable instructions that, when executed, cause the computing system to calculate one or more significance metric values for respective element of the second plurality of elements, wherein, for respective elements of the second plurality of elements, the significance metric value is calculated at least in part based on a degree to which a respective element of the second plurality of elements is used in a computing context;
computer-executable instructions that, when executed, cause the computing system to receive a first blocking request for a first element of the first set, wherein the first blocking request comprises a request to identify a subset of the second plurality of elements to be used in a comparison with the first element; and
computer-executable instructions that, when executed, cause the computing system to, based at least in part on a significance metric value for the first element and significance metric values for at least a portion of the second plurality of elements, determine a third set of candidate elements of the second plurality of elements as potential match candidates for the first element; and, (1) computer-executable instructions that, when executed, cause the computing system to render for display on a user interface at least a portion of candidate elements of the third set of candidate elements of the second plurality of elements; or (2) computer-executable instructions that, when executed, cause the computing system to create a schema mapping that maps the first element to a candidate element of the third set of candidate elements, wherein the schema mapping is useable to transfer data values for instances of the first element to instances of the candidate element; or (3) computer-executable instructions that, when executed, cause the computing system to transfer data values of instances of the first element to instances of the candidate element.

27. The one or more non-transitory computer-readable storage media of claim 26, further comprising:
computer-executable instructions that, when executed, cause the computing system to sort the first plurality of elements based on significance metric values; and
computer-executable instructions that, when executed, cause the computing system to sort the second plurality of elements based on significance metric values.

28. The one or more non-transitory computer-readable storage media of claim 26, further comprising:
computer-executable instructions that, when executed, cause the computing system to normalize significance values for the first plurality of elements; and
computer-executable instructions that, when executed, cause the computing system to normalize significance values for the second plurality of elements.

29. The one or more non-transitory computer-readable storage media of claim 26, wherein calculating one or more significance values comprising calculating an aggregate significance value from values for a plurality of significance metric value types.

30. The one or more non-transitory computer-readable storage media of claim 26, wherein the first blocking request is a block by range request and comprises a range value to be used in determining the third set of candidate records.

31. The one or more non-transitory computer-readable storage media of claim 26, wherein the first blocking request is a block by window request and comprises a window size to be used in determining the third set of candidate records.

\* \* \* \* \*